United States Patent [19]

Marschner et al.

[11] Patent Number: 5,231,171
[45] Date of Patent: Jul. 27, 1993

[54] REACTIVE DYES HAVING AN ALLYLSULFONYL OR PROPARGYLESULFONYL GROUP

[75] Inventors: Claus Marschner, Speyer; Matthias Niedenbrueck; Bernd Siegel, both of Ludwigshafen; Manfred Patsch, Wachenheim; Klaus Pandl, Ludwigshafen, all of Fed. Rep. of Germany

[73] Assignee: BASF Aktiengesellschaft, Ludwigshafen, Fed. Rep. of Germany

[21] Appl. No.: 806,262

[22] Filed: Dec. 13, 1991

[30] Foreign Application Priority Data

Dec. 24, 1990 [DE] Fed. Rep. of Germany ....... 4041729
Dec. 24, 1990 [DE] Fed. Rep. of Germany ....... 4041764

[51] Int. Cl.$^5$ ............... C09B 62/44; C09B 62/505; C09B 62/507; C09B 62/517
[52] U.S. Cl. ...................... 534/618; 534/617; 534/622; 534/629; 534/632; 534/634; 534/635; 534/636; 534/637; 534/638; 534/640; 534/642; 540/126; 540/132; 544/176; 544/189; 552/221
[58] Field of Search .............. 534/642, 629, 618, 640, 534/617, 622, 634, 636, 635, 637, 638; 552/221, 632; 544/189, 176; 540/126, 132

[56] References Cited

U.S. PATENT DOCUMENTS

| | | | |
|---|---|---|---|
| 2,657,205 | 10/1953 | Heyna et al. | 534/642 |
| 3,856,772 | 12/1974 | Dunkelmann et al. | 534/773 |
| 3,907,769 | 9/1975 | Dehnert et al. | 534/773 |
| 4,532,323 | 7/1985 | Jager | 544/75 |
| 4,885,360 | 12/1989 | Scheibli | 534/642 |
| 4,923,988 | 5/1990 | Nahr et al. | 544/74 |

FOREIGN PATENT DOCUMENTS

| | | | |
|---|---|---|---|
| 0141359 | 6/1985 | European Pat. Off. | 544/75 |
| 0311969 | 4/1989 | European Pat. Off. | 544/74 |
| 2202820 | 7/1973 | Fed. Rep. of Germany | 534/773 |
| 2260827 | 7/1974 | Fed. Rep. of Germany | 534/773 |
| 2308663 | 8/1974 | Fed. Rep. of Germany | 534/773 |
| 3119349 | 12/1982 | Fed. Rep. of Germany | 534/773 |
| 1562354 | 4/1969 | France | 534/642 |
| 64-13685 | 5/1966 | Netherlands | 534/642 |
| 302018 | 12/1954 | Switzerland | 534/642 |
| 880886 | 10/1961 | United Kingdom | 534/642 |

OTHER PUBLICATIONS

The Chemistry of Synthetic Dyes, vol. VI, pp. v and vii, K. Venkataraman, I "Reactive Dyes" (1972).
The Chemistry of Synthetic Dyes, vol. III, pp. v–vii, Venkataraman II (1970).
The Chemistry of Synthetic Dyes, vol. II, pp. v–x, K. Venkataraman III (1970).
The Phthalocyanines, vol. II, six (6) pages, F. H. Moser. Venkataraman IV, "The Chemistry of Synthetic Dyes", vol. VI, "Reactive Dyes", p. 53 (1972).

Primary Examiner—Floyd D. Higel
Attorney, Agent, or Firm—Oblon, Spivak, McClelland, Maier & Neustadt

[57] ABSTRACT

Reactive dyes useful for dyeing or printing hydroxyl- or nitrogen-containing substrates have the formula

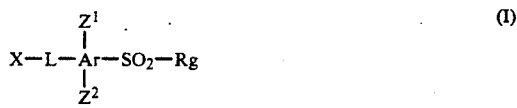

where
Rg is a radical of the formula

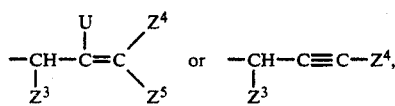

Ar is the radical of a benzene or naphthalene ring,
$Z^1$ and $Z^2$ are each hydrogen, substituted or unsubstituted $C_1$-$C_4$-alkyl, substituted or unsubstituted phenyl, $C_1$-$C_4$-alkoxy, carboxyl, $C_1$-$C_4$-alkoxycarbonyl, cyano, halogen or hydroxysulfonyl,
$Z^3$, $Z^4$ and $Z^5$ are each hydrogen, substituted or unsubstituted $C_1$-$C_4$-alkyl or substituted or unsubstituted phenyl,
U is a group which is detachable under alkaline reaction conditions,
X is in case a) the radical of a chromophore or in case b) the radical of a coupling component to which may additionally be attached, via an azo bridge, the radical of a diazo component and which may have additional reactive groups, and
L is in case a) a bridge member or in case b) an azo bridge.

5 Claims, No Drawings

REACTIVE DYES HAVING AN ALLYLSULFONYL OR PROPARGYLESULFONYL GROUP

The present invention relates to reactive dyes of the formula I

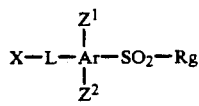  (I)

where
Rg is a radical of the formula

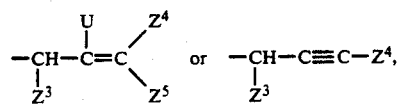

Ar is the radical of a benzene or naphthalene ring,
$Z^1$ and $Z^2$ are identical or different and each is independently of the other hydrogen, unsubstituted or amino- or $C_1$-$C_4$-alkanoylamino-substituted $C_1$-$C_4$-alkyl, substituted or unsubstituted phenyl, $C_1$-$C_4$-alkoxy, carboxy, $C_1$-$C_4$-alkoxycarbonyl, cyano, halogen or hydroxysulfonyl,
$Z^3$, $Z^4$ and $Z^5$ are identical or different and each is independently of the others hydrogen, unsubstituted or hydroxyl- or $C_1$-$C_4$-alkoxy-substituted $C_1$-$C_4$-alkyl or substituted or unsubstituted phenyl,
U is a group which is detachable under alkaline reaction conditions,
X is in case a) the radical of a chromophore with or without further reactive groups which is derived from a metallized or nonmetallized monoazo or diasazo dye, a triphendioxazine, an anthraquinone, a metallized formazan or a metallized phthalocyanine, or in case b) the radical of a coupling component to which may additionally be attached, via an azo bridge, the radical of a diazo component and which may have additional reactive groups, and
L is in case a) a bridge member of the formula

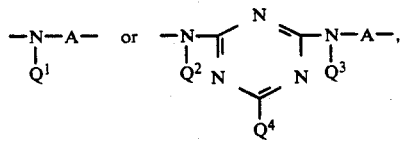

where $Q^1$ is hydrogen or $C_1$-$C_4$-alkyl, $Q^2$ and $Q^3$ are identical or different and each is independently of the other hydrogen or $C_1$-$C_4$-alkyl, $Q^4$ is a leaving group, and A is a chemical bond or $C_1$-$C_4$-alkylene, or in case b) an azo bridge,
and to a process for dyeing or printing hydroxyl- or nitrogen-containing substrates with the novel dyes.

P It is an object of the present invention to make available novel reactive dyes which have advantageous application properties. The novel dyes shall be suitable in particular for the exhaust and cold pad-batch methods and shall in particular be high yielding and give high wet fastness properties and brilliant dyeings. Also, the portions which have not become fixed to the fiber shall be readily washed off.

We have found that this object is achieved by the reactive dyes of the abovementioned formula I.

Any alkyl or alkylene appearing in the above-mentioned formula I may be either straight-chain or branched.

U in the formula I is a group which is detachable under alkaline reaction conditions. Such groups are for example chlorine, bromine, $C_1$-$C_4$-alkylsulfonyl, phenylsulfonyl, $OSO_3H$, $SSO_3H$, $OP(O)(OH)_2$, $C_1$-$C_4$-alkylsulfonyloxy, substituted or unsubstituted phenylsulfonyloxy, $C_1$-$C_4$-alkanoyloxy, $C_1$-$C_4$-dialkylamino or a radical of the formula

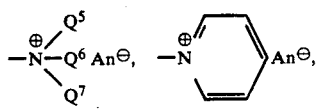

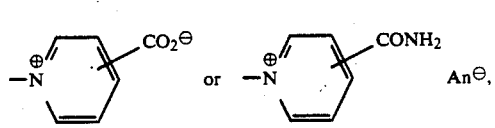

where $Q^5$, $Q^6$ and $Q^7$ are identical or different and each is independently of the others $C_1$-$C_4$-alkyl or benzyl and $An^\ominus$ is in each case an anion. Suitable anions $An^\ominus$ are for example fluoride, chloride, bromide, iodide, mono-, di- or trichloroacetate, methanesulfonate, benzenesulfonate and 2- or 4-methylbenzenesulfonate.

$Q^4$ in the formula I is a leaving group. Such leaving groups are for example fluorine, chlorine, bromine or a radical of the formula

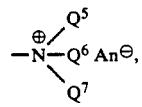

where $Q^5$, $Q^6$, $Q^7$ and $An^\ominus$ are each as defined above. Preferably, $Q^4$ is fluorine, chlorine or bromine.

$Z^1$, $Z^2$, $z^3$, $Z^4$, $Z^5$, $Q^1$, $Q^2$, $Q^3$, $Q^5$, $Q^6$ and $Q^7$ are each for example methyl, ethyl, propyl, isopropyl, butyl, isobutyl or sec-butyl.

$Z^1$, $Z^2$, $z^3$, $z^4$ and $Z^5$ may each also be for example phenyl, 2- or 4-methylphenyl, 2,4-dimethylphenyl, 2- or 4-chlorophenyl, 2,4-dichlorophenyl, 2- or 4-methoxyphenyl or 2,4-dimethoxyphenyl.

$Z^1$ and $Z^2$ may each also be for example fluorine, chlorine, bromine, methoxy, ethoxy, propoxy, isopropoxy, butoxy, isobutoxy, sec-butoxy, aminomethyl, 2-aminoethyl, 2- or 3-aminopropyl, 2- or 4-aminobutyl, formylaminomethyl, acetylaminomethyl, propionylaminomethyl, 2-formylaminoethyl, 2-acetylaminoethyl, 2-propionylaminoethyl, 2- or 3-formylaminopropyl, 2- or 3-acetylaminopropyl, 2- or 3-propionylaminopropyl, 2- or 4-formylaminobutyl, 2-or 4-acetylaminobutyl, 2- or 4-propionylaminobutyl, methoxycarbonyl, ethoxycarbonyl, propoxycarbonyl, isopropoxycarbonyl or butoxycarbonyl.

$Z^3$, $Z^4$ and $Z^5$ may each also be for example hydroxymethyl, 2-hydroxyethyl, 2- or 3-hydroxypropyl, 2- or 4-hydroxybutyl, methoxymethyl, ethoxymethyl, 2-methoxyethyl, 2-ethoxyethyl, 2- or 3-methoxypropyl, 2- or 3-ethoxypropyl, 2- or 4-methoxybutyl or 2- or 4-ethoxybutyl.

A is for example methylene, ethylene, 1,2- or 1,3-propylene or 1,2-, 1,3-, 1,4- or 2,3-butylene.

The fiber-reactive radical of the formula II

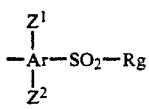 (II)

where AR, $Z^1$, $Z^2$ and Rg are each as defined above, will hereinafter be referred to as "E".

Preference is given to reactive dyes of the formula Ia $$X-L-E^2 \qquad (Ia)$$

where X an dL are each as defined above and $E^1$ is a radical of the formula IIa

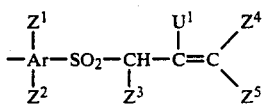 (IIa)

where
$U^1$ is halogen and Ar, $Z^1$, $Z^2$, $Z^3$, $Z^4$ and $Z^{65}$ are each as defined above.

Further preferred reactive dyes are those of the formula Ia.

$$X-L-E^1 \qquad (Ia)$$

where X and L are each as defined above and $E^1$ is a radical of the formula IIB

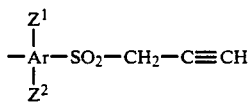 (IIb)

where Ar, $Z^1$ and $Z^2$ are each as defined above.

Of noteworthiness are reactive dyes which conform to the formula Ia $$X-L-E^1 \qquad (Ia)$$

where X and L are each as defined above and $E^1$ is a radical of the formula IIc

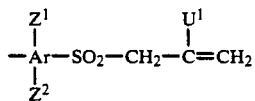 (IIc)

where $U^1$ is halogen and Ar, $Z^1$ and $Z^2$ are each as defined above.

In addition to the reactive system E, the radical X can carry further fiber-reactive radicals. Such radicals are derived for example from triazine, pyrimidine, pyridazinone and alkenylsulfonyl compounds.

X in formula I is form example the radical of a coupling component to which may be additionally attached, via an azo bridge, the radical of a diazo component and which may carry additional reactive groups. In this case, the reactive radical E is attached to the radical X via an azo bridge (—N=N—).

Dyes of this class conform to the formula IVa or IVb $$(E-N=N-)_zK \qquad (IVa)$$

$$E-N=N-K-N=N-D \qquad (IVb)$$

where K is the radical of a coupling component, D is the radical of a diazo component, a is 1 or 2, and E is as as defined above.

Useful dyes of this class are for example water-soluble azo dyes, in particular monoazo dyes of the formula IVa (a=1) or disazo dyes of the formula IVa (a=2) or IVb, which have hydroxysulfonyl and/or carboxyl groups.

Important coupling components HK are derived for example from compounds of the benzene, naphthalene, pyrazolone, pyridone or hydroxypyrimidine series.

Important diazo compounds D-NH₂ are derived for example from compounds of the aniline or aminonaphthalene series.

Particular preference is given to dyes of the formula V $$E^1-N=N-K^1 \qquad (V)$$

where $E^1$ is as defined above and $K^1$ is the radical of a coupling component of the benzene, naphthalene, pyrazole, pyridone or hydroxypyrimidine series which may have further fiber-reactive groups, in particular the group E, a vinylsulfonyl group, a group of the formula U—C₂H₄—SO₂—, where U is as defined above, or those of the halotriazine series.

Of particular utility are dyes of the formula VI

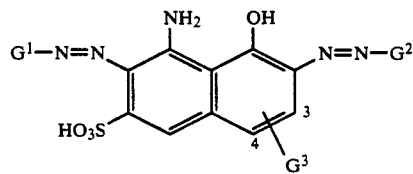 (VI)

where one of the two radicals $G^1$ and $G^2$ has the meaning $E^1$, which is as defined above, and the other has the meaning $D^1$, which is a radical of a diazo component of the aniline or naphthalene series which may have further fiber-reactive groups, in particular the group E, a vinylsulfonyl group, a group of the formula U—C₂H₂—SO₂—, where U is as defined above, or those of the halotriazine series, and $G^3$ is a hydroxysulfonyl in ring position 3 or 4.

X in the formula I may also be for example the metallized or nonmetallized radical of an azo dye. Suitable azo dyes from which such radicals are derived are known per se and have been described in large numbers, for example in K. Venkataraman, The Chemistry of Synthetic Dyes, Vol. VI, Academic Press, New York, London, 1972. The azo dyes conform to the formula VII $$D-N=N-K(-N=N-D)_1 \qquad (VIII)$$

where D is the radical of a diazo component, K is the radical of a coupling component, and 1 is 0 or 1.

Useful dyes from which the radical X is derived are for example water-soluble azo dyes, in particular monoazo dyes of the formula VII (l=0), which may have hydroxysulfonyl and/or carboxyl groups.

Preferably, the radical X is derived from non-metallized azo dyes, in particular from those which contain sulfonic acid and/or carboxyl groups, of which those which have from 1 to 6 sulfonic acid groups are particularly noteworthy. Important azo dyes from which the radical X is derived are for example those of the phenyl-azo-naphthalene, phenyl-azo-(1-phenylpyrazol-5-one), phenyl-azo-benzene, naphthyl-azo-benzene, phenyl-azo-amino-naphthalene, naphthyl-azo-naphthalene, naphthyl-azo-(1-phenylpyrazol-5-one), phenyl-azo-pyridone, phenyl-azoaminopyridine, naphthyl-azo-pyridone, naphthyl-azo-aminopyridine or stilbyl-azo-benzene series.

Of particular preference are reactives dyes of the formula VIII

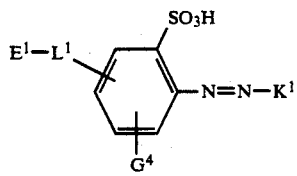

where $E^1$ is as defined above, $L^1$ is the radical of the formula

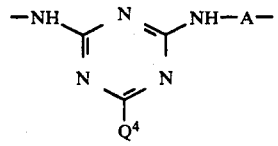

where A and $Q^4$ are each as defined above, $G^4$ is hydrogen, $C_1$-$C_4$-alkyl, $C_1$-$C_4$-alkoxy, chlorine or hydroxysulfonyl, and $K^1$ is the radical of a coupling component of the naphthalene, pyrazolone, pyridine or hydroxypyrimidine series which may contain further fiber-reactive groups, in particular a vinylsulfonyl group, a group of the formula $U-C_2H_4-SO_2-$, where U is as defined above, or those of the halotriazine series.

Particular preference is further given to reactive dyes of the formula IX

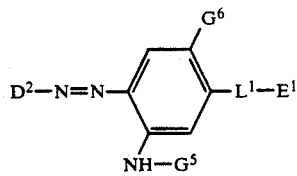

where $E^1$ and $L^1$ are each as defined above, $G^5$ is $C_1$-$C_4$-alkanoyl, carbamoyl, $C_1$-$C_4$-mono- or -dialkylcarbamoyl, phenylcarbamoyl or cyclohexylcarbamoyl, $G^6$ is hydrogen, $C_1$-$C_4$-alkyl, $C_1$-$C_4$-alkoxy, hydroxysylfonyl or chlorine, and $D^2$ is the radical of a diazo component of the aniline or naphthalene series which carries no further fiber-reactive group.

Particular preference is further given to reactive dyes of formula X

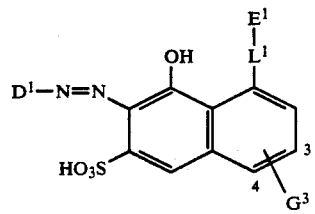

where $D^1$, $E^1$ and $L^1$ are each as defined above and $G^3$ is hydroxysulfonyl in ring position 3 or 4.

Particular preference is further given to reactive dyes of the formula XI

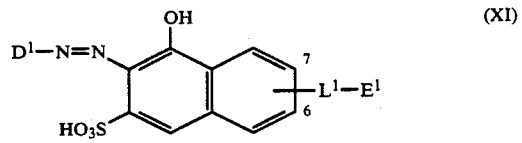

where $D^1$, $e^1$ and $L^1$ are each as defined above and the group $-L-E^1$ is in ring position 6 or 7.

Further useful compounds are those of the formula XII

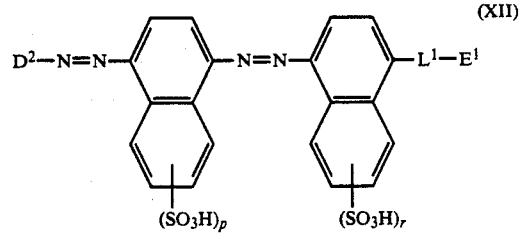

where $D^2$, $E^1$ and $L^1$ are each as defined above and p and r are each independently of the other 0, 1 or 2.

Further useful compounds are those of the formula XIII

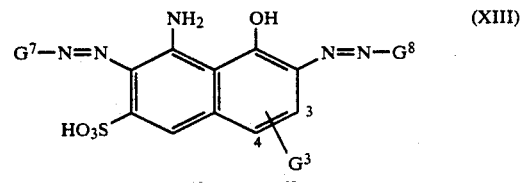

where $G^3$ is defined above and one of the two radicals $G^7$ and $G^8$ has the meaning $D^1$, which is as defined above, and the other has the meaning

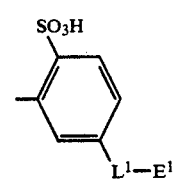

or else $G^7$ and $G^8$ are both the radical

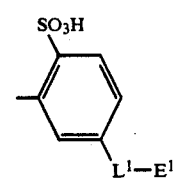

where $L^1$ and $e^2$ are each as defined above.

Those aromatic radicals $D^1$ and $D^2$ of diazo components of the aniline or aminonaphthalene series which carry no fiber-reactive groups are derived for example from amines of the formula XIV a-f

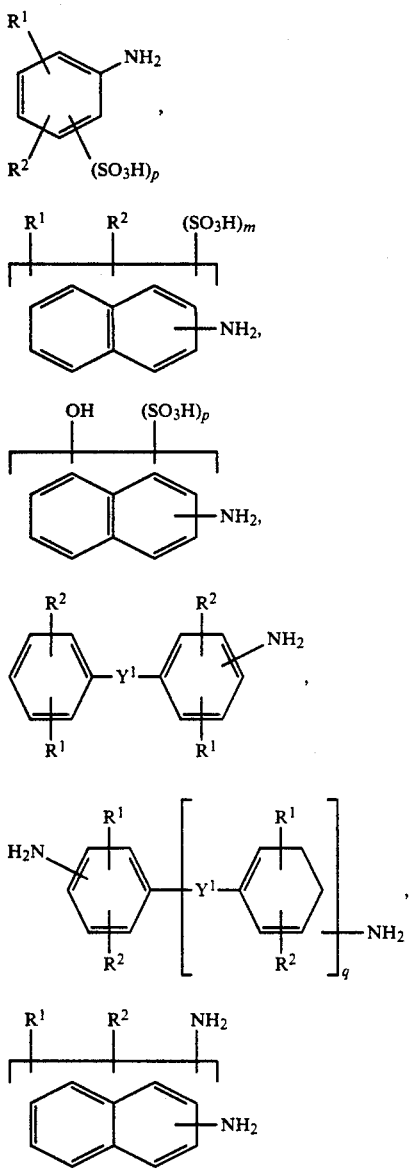

where
m is 0, 1, 2 or 3,
p is 0, 1 or 2,
q is 0 or 1,
$R^1$ is hydrogen, methyl, ethyl, methoxy, ethoxy, acetyl, cyano, carboxy, hydroxysulfonyl, $C_1$–$C_4$-alkoxycarbonyl, hydroxyl, carbamoyl, $C_1$–$C_4$-mono- or -dialkylcarbamoyl, fluorine, chlorine, bromine, hydroxysulfonylmethyl or trifluoromethyl,
$R^2$ is hydrogen, methyl, ethyl, methoxy, ethoxy, cyano, carboxyl, hydroxysulfonyl, acetylamino, methylsulfonylamino, $C_1$–$C_4$-alkoxycarbonyl, carbamoyl, $C_1$–$C_4$-mono- or -dialkylcarbamoyl, fluorine, chlorine, nitro, sulfamoyl, $C_1$–$C_4$-mono- or -dialkylsulfamoyl, which may be sulfato-substituted, $C_1$–$C_4$-alkylsulfonyl, phenylsulfonyl or phenoxy, and
$Y^1$ is a direct bond, oxygen, sulfur or the group —NHCO—, NH—CO—NH, —CONH—, —CO—, —NHSO$_2$—, —SO$_2$NH—, —SO$_2$—, —CH=CH—, —CH$_2$—CH$_2$—, —CH$_2$—, —NH— or —N=N—.

Preference is given to those components in which
$R^1$ is hydrogen, methyl, methoxy, carboxyl, hydroxysulfonyl, hydroxyl or chlorine, $R^2$ is hydrogen, methyl, methoxy, carboxyl, hydroxysulfonyl, acetylamino or chlorine and $Y^1$ is the group —CO—, —SO$_2$—, —CH=CH—, —CH$_2$— or —N=N—.

Aromatic amines which are suitable for use as diazo components and which conform to the formula XIVa, XIVb, XIVc or XIVd are for example aniline, 2-methoxyaniline, 2-methylaniline, 4-chloro-2-aminoanisole, 4-methylaniline, 4-methoxyaniline, 2-methoxy-5-methylaniline, 2,5-dimethoxyaniline, 2,5-dimethylaniline, 2,4-dimethylaniline, 2,5-diethoxyaniline, 2-chloroaniline, 3-chloroaniline, 4-chloroaniline, 2,5-dichloroaniline, 4-chloro-2-nitroaniline, 4-chloro-2-methylaniline, 3-chloro-2-methylaniline, 4-chloro-2-aminotoluene, 4-phenylsulfonylaniline, 2-ethoxy-1-naphthylamine, 1-naphthylamine, 2-naphthylamine, 4-methylsulfonylaniline, 2,4-dichloroaniline-5-carboxylic acid, 2-aminobenzoic acid, 4-aminobenzoic acid, 3-aminobenzoic acid, 3-chloroaniline-6-carboxylic acid, aniline-2- or -3- or -4-sulfonic acid, aniline-2,5-disulfonic acid, aniline-2,4-disulfonic acid, aniline-3,5-disulfonic acid, 2-aminotoluene-4-sulfonic acid, 2-aminoanisole-4-sulfonic acid, 2-aminoanisole-5-sulfonic acid, 2-ethoxyaniline-5-sulfonic acid, 2-ethoxyaniline-4-sulfonic acid, 4-hydroxysulfonyl-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3-, or -4-sulfonic acid, 3-acetylamino-6-sulfonic acid, 4-acetylamino-2-hydroxysulfonylaniline, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphaminonaphthalene-3,6,8-trisulfonic acid, 1-aminonaphthalene-4,6,8-trisulfonic acid, 2-naphthylamine-5-sulfonic acid or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1sulfonic acid, 2-aminonaphthalene-1,5-disulfonic acid, 2-aminonaphthalene-3,6-disulfonic acid, 2-aminonaphthalene-4,8-disulfonic acid, 2-aminophenol-4-sulfonic acid, 2-aminophenol-5-sulfonic acid, 3-aminophenol-6-sulfonic acid, 1-hydroxy-2-aminonaphthalene-5,8- or -4,6-disulfonic acid, 4-aminodiphenylamine, 4-amino-4'-methoxydiphenylamine, 4-amino-4'-methoxydiphenylamine-3-sulfonic acid, 4-(2'-methylphenylazo)-2-methylaniline, 4-aminoazobenzene, 4'-nitrophenylazo-1-aminonaphthalene, 4-(6'-hydroxysulfonylnaphthylazo)-1-aminonaphthalene, 4-(2',5'-dihydroxysulfonylphenylazo)aminonaphthalene, 4-(2',5'-dihydroxysulfonylphenylazo)-1-aminonaphthalene, 4'-amino-3'-methyl-3-nitrobenzophenone, 4-aminobenzophenone, 4-(4'-aminophenylazo)benzenesulfonic acid, (4-(4'-amino-3'-methoxyphenylazo)benzenesulfonic acid or 2-ethoxy-1-naphthylamine-6-sulfonic acid.

Aromatic diamines which are suitable for use as tetraazo components and which conform to the formula XIVe or XIVf are for example 1,3-diaminobenzene, 1,3-diaminobenzene-4-sulfonic acid, 1,4-diaminobenzene, 1,4-diaminobenzene-2-sulfonic acid, 1,4-diamino-2-methylbenzene, 1,4-diamino-2-methoxybenzene, 1,3-diamino-4-methylbenzene, 1,3-diaminobenzene-5-sulfonic acid, 1,3-diamino-5-methylbenzene, 1,6-diaminonaphthalene-4-sulfonic acid, 2,6-diaminonaphthalene-4,8-disulfonic acid, 3,3'-diaminodiphenyl sulfone, 4,4'-diaminodiphenyl sulfone, 4,4'-diaminostilbene-2,2'-disulfonic acid, 2,7'-diaminodiphenyl sulfone, 2,7'-diamino-4,5-disulfodiphenyl sulfone, 4,4'-diaminobenzophenone, 4,4'-diamino-3,3'-dinitrobenzophenone, 3,3'-diamino-4,4'-dichlorobenzophenone, 4,4'- or 3,3'-diaminobiphenyl, 4,4'-diamino-3,3'-dichlorobiphenyl, 4,4'-diamino-3,3'-dimethoxy- or -3,3'-dimethyl- or -2,2'-dimethyl- or -2,2'-dichloro- or -3,3'-diethoxybipheny, 4,4'-diamino-3,3'-dimethyl-6,6'-dinitrobiphenyl, 4,4'-diaminobiphenyl-2,2'- or -3,3'-disulfonic acid, 4,4'-diamino-3,3'-dimethyl- or -3,3 -dimethoxy or -2,2'-dimethoxy-6,6'-disulfobiphenyl, 4,4'-diamino-2,2',5,5'-tetrachlorobiphenyl, 4,4'-diamino-3,3'-dinitrobiphenyl, 4,4'-diamino-2,2'-dichloro-5,5'-dimethoxybiphenyl, 4,4'-diamino-2,2'- or -3,3'-dicarboxylbiphenyl, 4,4'-diamino-3,3'-dimethyl-5,5'-disulfobiphenyl, 4,4'-diamino-2-nitrobiphenyl, 4,4'-diamino-3-ethoxy- or -3-hydroxysulfonylbiphenyl, 4,4'-diamino-3,3'-dimethyl-5-sulfobiphenyl, 4,4'-diaminodiphenylmethane, 4,4'-diamino-3,3'-dimethyldiphenylmethane, 4,4'-diamino-2,2',3,3'-tetramethyldiphenylmethane, 4,4'-diaminodiphenylethane, 4,4'-diaminostilbene and 4,4'-diaminodiphenylmethane-3,3'-dicarboxylic acid.

Those aromatic radicals $D^1$ of diazo components of the aniline or aminonaphthalene series which can carry further fiber-reactive radicals are derived for example from amines of the formula XVa-c

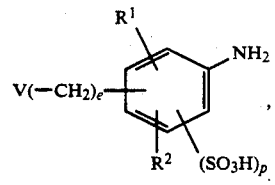

(XVa)

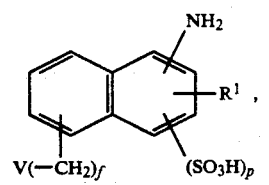

(XVb)

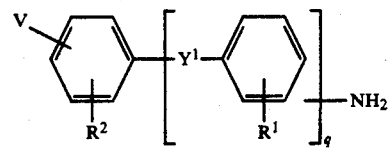

(XVc)

where $R^1$, $R^2$, p, q and $Y^1$ are each as defined above, e and f are identical or different and each is independently of the other 0 or 1, and V is a fiber-reactive radical.

Fiber-reactive radicals V are derived for e and f are identical or different and each is independently of the other 0 or 1, and V is a fiber-reactive radical.

Fiber-reactive radicals V are derived for example from the radical E or, as mentioned earlier, for example from triazine, pyrimidine, pyridazinone or alkenylsulfonyl compounds.

In particular, the fiber-reactive radicals V conform to the formula

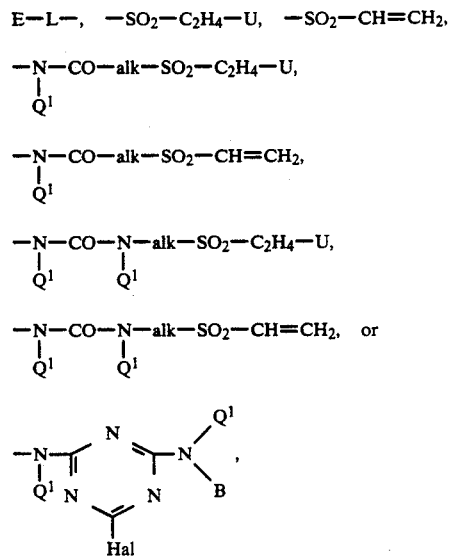

where
E, L, U and $Q^1$ are each as defined above,
alk is $C_1-C_4$-alkylene,
Hal is fluorine, chlorine or bromine, and
B is $C_1-C_4$-alkoxy which may be interrupted by 1 or 2 oxygen atoms or is a radical of the formula

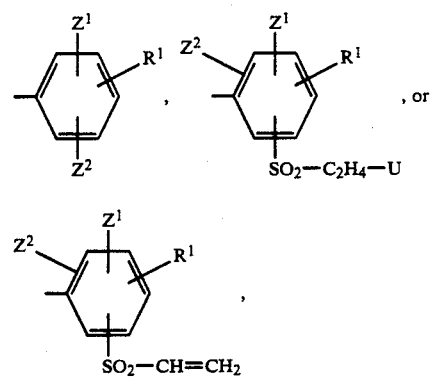

where $Z^1$, $Z^2$, $R^1$ and U are each as defined above.

Aromatic amines from which the derivatives of the formula XVa, XVb or XVc with the fiber-reactive radical V are derived are for example 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid, 1,5-diamino-4-methoxybenzene-2-sulfonic acid, 1,6-diaminonaphth-2-ol-4-sulfonic acid, 1,6-diaminonaphthalene-4-sulfonic acid, 2,6-diaminonaphthalene-4,8-disulfonic acid, 2,6-diminonaphth-1-ol-4,8-disulfonic acid, 1,3-diaminobenzene-5-sulfonic acid, 1,3-diamino5-methylbenzene, 2,6-diaminophenol-4-sulfonic acid, 5-(aminomethyl)-2-aminonaphthalene-1-sulfonic acid, 5-(N- methylaminomethyl)-2-aminonaphthalene-1-sulfonic acid, 4,4'-diaminostilbene-3,3-dicarboxylic acid, 4-(N-methylaminomethyl)aniline-2-sulfonic acid or 3-(N-methylaminomethyl)aniline-6-sulfonic acid.

The radicals K of the coupling component are preferably members of the benzene, naphthalene, pyrazole, pyridine, pyrimidine, indole or acylacetarylide series and may also carry fiber-reactive groups.

Coupling components of the aniline or naphthalene series which are free of fiber-reactive groups correspond for example to the compounds of the formula XVIa-g

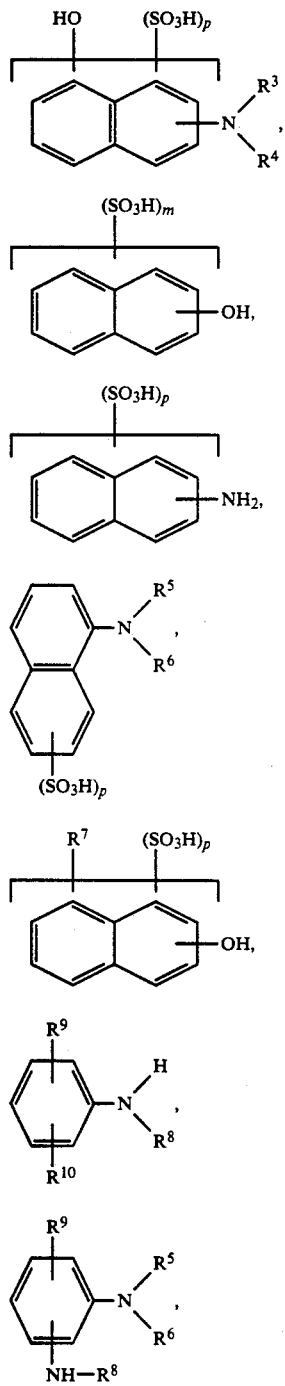

where $R^3$ is hydrogen or $C_1$-$C_4$-alkyl, $R^4$ is hydrogen, $C_1$-$C_4$-alkyl or phenyl which may be monosubstituted or disubstituted by $C_1$-$C_4$-alkyl, $C_1$-$C_4$-alkoxy, chlorine, bromine or hydroxysulfonyl, $R^5$ is hydrogen or $C_1$-$C_4$-alkyl which may be substituted by hydroxyl, cyano, carboxyl, hydroxysulfonyl, sulfato, methoxycarbonyl, ethoxycarbonyl or acetoxy, $R^6$ is hydrogen, $C_1$-$C_4$-alkyl which may be hydroxyl-, cyano, carboxyl-, hydroxysulfonyl-, sulfato-, methoxycarbonyl-, ethoxycarbonyl- or acetoxy-substituted, benzyl or phenyl which may be substituted by $C_1$-$C_4$-alkyl, $C_1$-$C_4$-alkoxy, chlorine or hydroxysulfonyl, $R^7$ is $C_1$-$C_6$-alkylureido, phenylureido which may be chlorine-, methyl-, methoxy-, nitro-, hydroxysulfonyl0 or carboxyl-substituted, $C_1$-$C_6$-alkanoylamino which may be hydroxysulfonyl- or chlorine-substituted, cyclohexanoylamino, benzoylamino which may be chlorine-, methyl-, methoxy-, nitro-, hydroxysulfonyl- or carboxy-substituted, or hydroxyl, $R^8$ is nitrogen, $C_1$-$C_6$-alkyl, in particular $C_1$-$C_4$-alkyl, which may in either case be phenyl-, $C_1$-$C_4$-alkoxy-, hydroxyl-, phenoxy- or $C_1$-$C_4$-alkanoyloxy-substituted, $C_5$-$C_7$-cycloalkyl, hydroxysulfonylphenyl, $C_1$-$C_4$-alkanoyl, carbamoyl, $C_1$-$C_4$-mono- or -dialkylcarbamoyl, phenylcarbamoyl or cyclohexylcarbamoyl, $R^9$ is methoxy, ethoxy, chlorine, bromine, hydroxysulfonyl, acetylamino, amino, ureido, methylsulfonylamino, ethylsulfonylamino, diemthylaminosulfonylamino, methylamino, ethylamino, dimethylamino or diethylamino, $R^{10}$ is hydrogen, methyl, ethyl, ethoxy, ethoxy, hydroxysulfonyl, chlorine or bromine, and p and m are each as defined above.

Specific examples are o- or m-toluidine, o- or m-anisidine, cresidine, 2,5-dimethylaniline, 2,5-dimethoxyaniline, m-aminoacetanilide, 3-amino-4-methoxyacetanilide, 3-amino-4-methylacetanilide, m-aminophenylurea, N-methylaniline, N-methyl-m-toluidine, N-ethylaniline, N-ethyl-m-toluidine, N-(2-hydroxyethyl)aniline and N-(2-hydroxyethyl)-m-toluidine.

Naphtholsulfonic acids are for example 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1,8-dihydroxynaphthalene-3,6-disulfonic acid, 2,6-dihydroxynaphthalene-8-sulfonic acid and 2,8-dihydroxynaphthalene-6-sulfonic acid.

Further specific examples are 1-naphthylamine, N-phenyl-1-naphthylamine, N-ethyl-1-naphthylamine, N-phenyl-2-naphthylamine, 1-naphthol, 2-naphthol, 1,5-dihydroxynaphthalene, 1,6-dihydroxynaphthalene, 1,7-dihydroxynaphthalene and 2,7-dihydroxynaphthalene.

Aminonaphthalenesulfonic acids are for example 1-naphthylamine-6-sulfonic acid, 1-naphthylamine-7-sulfonic acid, 1-naphthylamine-8-sulfonic acid, 2-naphthylamine-3,6-disulfonic acid, 2-naphthylamine-5,7-disulfonic acid and 2-naphthylamine-6,8-disulfonic acid. and 2-naphthylamine-6,8-disulfonic acid.

Suitable aminonaphtholsulfonic acids are for example 1-amino-5-hydroxynaphthalene-7-sulfonic acid, 1- amino-8-hydroxynaphthalene-4-sulfonic acid, 1-amino-8-hydroxynaphthalene-2,4-disulfonic acid, 1-amino-8-hydroxynaphthalene-3,6-disulfonic acid, 1-amino-8-hydroxynaphthalene-4,6-disulfonic acid, 2-amino-5-hydroxynaphthalene-7-sulfonic acid, 2-amino-8-hydroxynaphthalene-6-sulfonic acid, 2-amino-8-hydroxynaphthalene-3,6-disulfonic acid, 2-amino-5-hydroxynaphthalene-1,7-disulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 1-acetylamino-5-hydroxynaphthalene-7-sulfonic acid, 2-methylamino-8-hydroxynaphthalene-6-sulfonic acid, 2-methylamino-8-hydroxynaphthalene-6-sulfonic acid and 2-(3'- or 4'-hydroxysulfonylphenyl)-amino-8-hydroxynaphthalene-6-sulfonic acid.

Of particular importance are coupling components which have sulfonic acid and/or carboxyl groups and which couple ortho or para to a hydroxyl and/or amino group.

Examples of such coupling components are 2-acetylamino-5-hydroxynaphthalene-7-sulfonic acid, 2-actylamino-8-hydroxynaphthalene-6-sulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid and 1-benzoylamino-8-hydroxynaphthalene-4,6-disulfonic acid.

Coupling components of the other series are for example: pyrazolones, aminopyrazoles, 2,6-diaminopyridines, pyridones, hydroxypyrimidines, aminopyrimidines, indoles and acetoacetarylides.

Coupling components of this series which contain no fiber-reactive groups conform for example to the formula XVIIa-f

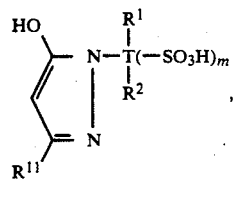 (XVII a)

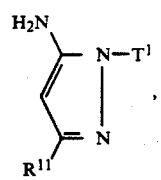 (XVII b)

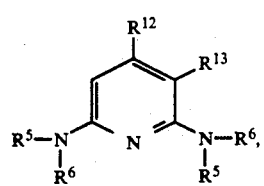 (XVII c)

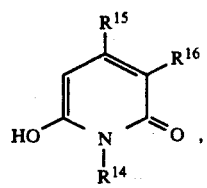 (XVII d)

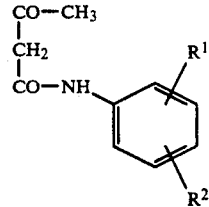 (XVII e)

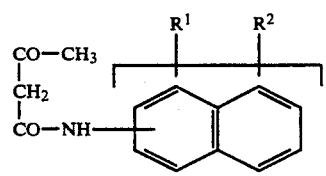 (XVII f)

where
T is the radical of a benzene or naphthalene ring,
$T^1$ is $C_1$-$C_4$-alkyl, cyclohexyl, benzyl or phenyl which is monosubstituted or polysubstituted by fluorine, chlorine, bromine, methyl, methoxy, nitro, hydroxysulfonyl, carboxyl, acetyl, actylamino, methylsulfonyl, sulfamoyl or carbamoyl,
$R^{11}$ is methyl, carboxyl, $C_1$-$C_4$-alkoxycarbonyl or phenyl,
$R^{12}$ is hydrogen or $C_1$-$C_4$-alkyl which may be substituted by methoxy, ethoxy or cyano,
$R^{13}$ is hydrogen, methyl, hydroxysulfonylmethyl, hydroxysulfonyl, cyano or carbamoyl,
$R^{14}$ is hydrogen, $C_1$-$C_4$-alkyl which may be phenyl-, hydroxysulfonylphenyl-, hydroxyl-, amino-, methoxy-, ethoxy-, carboxyl-, hydroxysulfonyl-, acetylamino-, benzoylamino- or cyano-substituted, cyclohexyl, phenyl which may be carboxyl-, hydroxysulfonyl-, benzoylamino-, acetylamino-, methyl-, methoxy-, cyano- or chlorine-substituted, or amino which is substituted by phenyl, $C_1$-$C_4$-alkyl, acetyl or benzoyl,
$R^{15}$ is $C_1$-$C_4$-alkyl, phenyl, hydroxyl, cyano, acetyl, benzoyl, carboxyl, methoxycarbonyl, carbamoyl or hydroxysulfonylmethyl, and
$R^{16}$ is hydrogen, chlorine, bromine, acetylamino, amino, nitro, hydroxysulfonyl, sulfamoyl, methylsulfonyl, phenylsulfonyl, carboxyl, methoxycarbonyl, acetyl, benzoyl, carbamoyl, cyano or hydroxysulfonylmethyl, and $R^1$, $R^2$, $R^5$, $R^6$ and m are each as defined above.

Suitable pyrazolone coupling components are for example 3-methyl-, 3-carboxyl- or 3-($C_1$-$C_4$-alkoxycarbonyl)-pyrazol-5-ones which may carry in the 1-position hydrogen, unsubstituted or methyl-, ethyl-, fluorine-, chlorine-, bromine-, trifluoromethyl-, methoxy-, ethoxy-, cyano-, phenoxy-, phenylsulfonyl-, methylsulfonyl-, hydroxysulfonyl-, acetylamino-, nitro-, hydroxyl-, carboxyl-, carbamoyl- or sulfamoyl-substituted phenyl or hydroxysulfonyl-substituted 1- or 2-naphthyl, Examples are 1-phenyl-, 1-(2'-chlorophenyl)-, 1-(2'-methoxyphenyl)-, 1-(2'-methylphenyl)-, 1-(1',5'-dichlorophenyl)-, 1-(2'6'-dichlorophenyl)-, 1-(2'-methyl-6'-chlorophenyl)-, 1-(2'-methoxy-5'-methylphenyl)-, 1-(2'-methoxy-5'-hydroxysulfonylphenyl)-, 1-(2'5'-dichloro-4'-hydroxysulfonylphen)-, 1-(2',5'-dihydroxysulfonylphenyl)-, 1-(2'-carboxyphenyl)-, 1-(3'-hydroxysulfonylphenyl)-, 1-(4'-hydroxysulfonylphenyl)- or 1-(3'-(sulfamoylphenyl)-3-carboxylpyrazol-5-one, 1-(3'- or 4'-hydroxysulfonylphenyl)-, 1-(2'-chloro-4'- or -5'- hydroxysulfonylphenyl)-, 1-(2'-methyl-4'-hydroxysulfonylphenyl)-, 1-(2',5'-dichlorophenyl)-, 1-(4',8'-dihydroxysulfonyl-1-naphthyl)-, 1-(6'-hydroxysulfonyl-1-naphthyl)-3-methylpyrazol-5-one, ethyl 1-phenylpyrazol-5-one-3-carboxylate, ethyl pyrazol-5-one-3-carboxylate and pyrazol-5-one-3-carboxylic acid.

Other pyrazole type coupling components are for example 1-methyl-, 1-ethyl-, 1-propyl-, 1-butyl-, 1-cyclohexyl-, 1-benzyl- or 1-phenyl-5-aminopyrazole, 1-(4'-chlorophenyl)- or 1-(4'-methylphenyl)-5-aminopyrazole and 1-phenyl-3-methyl-5-aminopyrazole.

Acetoacetanilides are in particular acetoacetanilide or derivatives thereof which are monosubstituted or polysubstituted in the phenyl nucleus by chlorine, methyl, ethyl, methoxy, ethoxy, acetylamino, hydroxysulfonyl, carboxyl, carbamoyl or sulfamoyl.

Pyridine type coupling components are for example the derivatives described in DE-A-2 260 827.

Suitable pyrimidine type coupling components are for example the compounds mentioned in De-A 2 202 820, DE-A-2 308 663 or DE-A-3 119 349. Other possibilities are barbituric acid and N-substitution products thereof. Suitable N-substituents here are in particular $C_1$-$C_4$-alkyl and substituted or unsubstituted phenyl.

Suitable indole type coupling components are for example 2-methylindole, 2-phenylindole, 2-phenylindole-5-sulfonic acid, 1-methyl-2-phenylindole, 1-(2'-hydroxyethyl)-, 1-(2'-carboxyethyl)- or 1-(2'-carbamoylethyl)-2-methylindole or -2-phenylindole.

Suitable pyridone type coupling components are for example 1-ethyl-2-hydroxy-4-methyl-5-carbamoylpyrid-6one, 1-(2-hydroxyethyl)-2-hydroxy-4-methyl-5-carbamoylpyrid-6-one, 1-phenyl-2-hydroxy-4-methyl-6-carbamoylpyrid-6-one, 1-ethyl-2-hydroxy-4-methyl-5-cyanopyrid-6-one, 1-ethyl-2-hydroxy-4-methyl-5-hydroxysulfonylmethylpyrid-6one, 1-methyl-2-hydroxy-4-methyl-5-cyanopyrid-6-one, 1-methyl-2-hydroxy-5-acetylpyrid-6-one, 1,4-dimethyl-2-hydroxy-5-cyanopyrid-6one, 1,4-dimethyl-5-carbamoylpyrid-6one, 2,6-dihydroxy-4-ethyl-5-cyanopyridine, 2,6-dihydroxy-4-ethyl-5-carbamoylpyridine, 1-ethyl-2-hydroxy-4-methyl-5-hydroxysulfonylmethylpyrid-6-one, 1-methyl-2-hydroxy-4-methyl-5-methylsulfonylpyrid-6-one and 1-carboxymethyl-2-hydroxy-4-ethyl-5-phenylsulfonylpyrid6-one.

Coupling components K of the benzene or naphthalene series which contain fiber-reactive groups are for example compounds of the formula XVIII a–f:

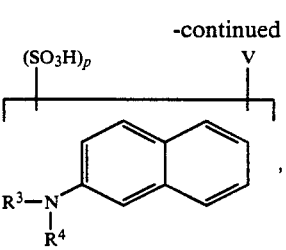 (XVIII a)

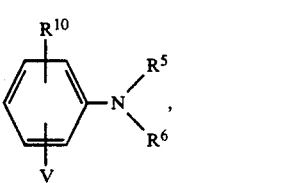 (XVIII b)

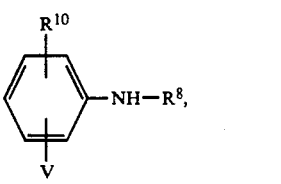 (XVIII c)

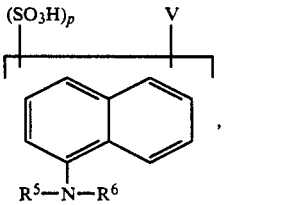 (XVIII d)

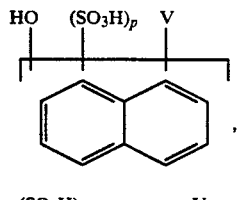 (XVIII e)

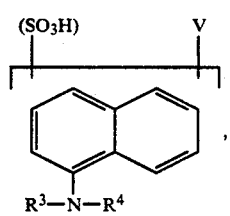 (XVIII f)

where $R^3$, $R^4$, $R^5$, $R^6$, $R^8$, $R^{10}$, V and p are each as defined above.

Coupling components of the pyrazolone, aminopyrazole, 2,6-diaminopyridine, pyridone, hydroxypyrimidine, aminopyrimidine, indole or acetoacetarylide series which contain fiber-reactive groups conform for example to the formula XIXa–f.

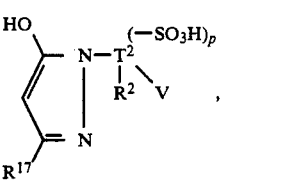 (XIX a)

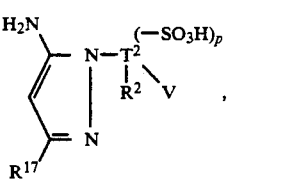 (XIX b)

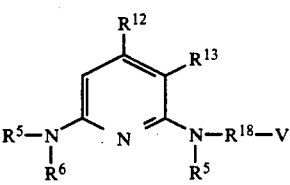 (XIX c)

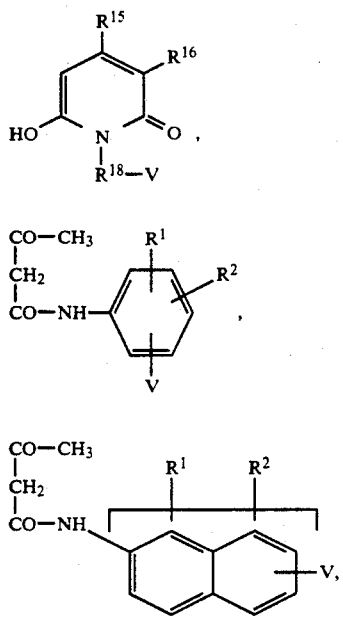
(XIX d)

(XIX e)

(XIX f)

where
T² is the radical of a benzene or naphthalene ring,
R¹⁷ is methyl, carboxyl, $C_1$-$C_4$-alkoxycarbonyl or phenyl,
R¹⁸ is $C_1$-$C_6$-alkylene, and
H¹, R², R⁵, R⁶, R¹², R¹³, R¹⁵, R¹⁶, p and V are each as defined above.

Pyrazolone coupling components which carry fiber-reactive radicals V are derived for example from the following pyrazolones: 1-(3'- or 4'-aminophenyl)-, 1-(2'-hydroxysulfonyl-5'-aminophenyl)- or 1-(2'-methoxy-5'-aminophenyl)-3-carboxypyrazol-5-one or 1-(3'- or 4'-aminophenyl)- or 1-(6'-amino-4',8'-dihydroxysulfonyl-naphth-2'-yl)-3-carboxypyrazol-5-one.

Instead of azo dye radicals the dyes of the formula I may also contain the corresponding metal complex dye radicals. Suitable complexing metals for this purpose are in particular copper, cobalt, chromium, nickel and iron, of which copper, cobalt and chromium are preferred.

When the metal complex dye is in question, the metallized groups are preferably each ortho to the azo group, for example in the form of o,o'-dihydroxy-, o-hydroxy-o'-carboxy-, o-carboxy-o'-amino- or o-hydroxy-o'-amino-azo groups.

X in the formula I may further be for example the radical of a metallized formazan dye, in which case in particular copper formazans are suitable. Copper formazans are known per se and described for example in K. Venkataraman, The Chemistry of Synthetic Dyes, Vol. III, Academic Press, new York, London, 1970.

Particular preference is given to copper formazan dyes of the formula XX

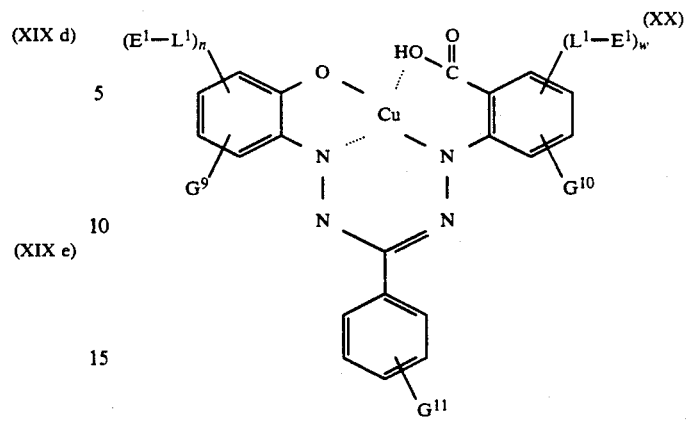

where
G⁹, G¹⁰ and g¹¹ are identical or different and each is independently of the others hydrogen or hydroxysulfonyl,
n is 0 or 1,
w is 0 or 1, and
E¹ and L¹ are each as defined above, with the proviso that n and w are not both 0 at one and the same time.

A method for preparing the formazans from which these dyes are derived is described for example in EP-A-315 046.

X in the formula I may further be for example the radical of an anthraquinone dye. Anthraquinones are known per se and described for example in K. Venkataraman, The Chemistry of Synthetic Dyes, Vol. II, Academic Press, New York, 1952.

Particular preference is given to anthraquinone dyes of the formula XXI

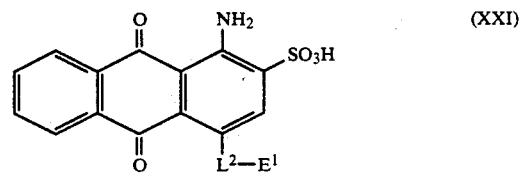

where
L² is the radical

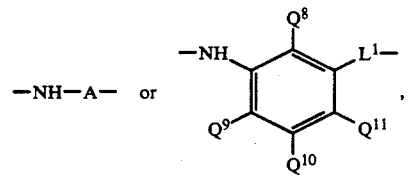

where A and L¹ are each as defined above, Q⁸ and Q⁹ are identical or different and each is independent of the other hydrogen or methyl, and one of the two radicals Q¹⁰ and Q¹¹ is hydrogen or methyl and the other is hydroxysulfonyl, with E¹ being as defined above.

X in the formula I may further be for example the radical of a triphendioxazine dye. Triphendioxazines are known per se and described for example in EP-A-141 359 or EP-A-311 969.

Particular preference is given to triphendioxazine dyes of the formula

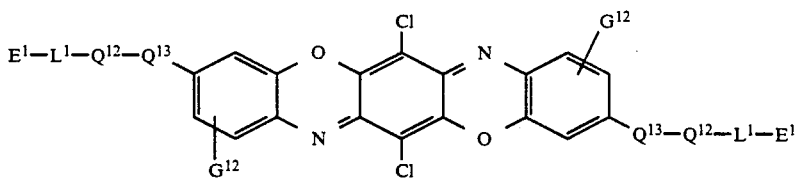

(XXII)

where
E$^1$ and L$^1$ are each as defined above,
G$^{12}$ is hydroxysulfonyl or the radical SO$_2$—C$_2$H$_4$—OSO$_3$H,
Q$^{13}$ is oxygen, imino or C$_1$-C$_4$-alkylimino, and
Q$^{12}$ is straight-chain or branched C$_2$-C$_4$-alkylene or phenylene.

X in the formula I may further be for example the radical of a metallized phthalocyanine dye. Phthalocyanines are known per se and described for example in F.H. Moser, D.L. Thomas, The Phthalocyanines, Vol. Ii, CRC Press, Boca Raton, Fla., 1983.

Particular preference is given to phthalocyanine dyes of the formula XXIII

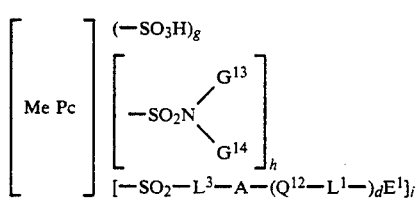

(XXIII)

where
Pc is the phthalocyanine radical,
G$^{13}$ and g$^{14}$ are identical or different and each is independently of the other hydrogen or C$_1$-C$_4$-alkyl
L$^3$ is imino or C$_1$-C$_4$-alkylimino,
d is 0, 1, 2 or 3,
Me is copper or nickel,
g is 0, 1 or 2,
h is 0, 1 or 2,
i is 1 or 2, and A, L$^1$, E$^1$ and Q$^{12}$ are each as defined above.

The reactive dyes of the formula I are prepared for example by reacting a suitable organic dye or a suitable dye precursor and the fiber-reactive compound of the formula XXXVII

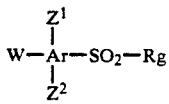

(XXVII)

where Ar, Z$^1$, Z$^2$ and Rg are each as defined above and W is the radical

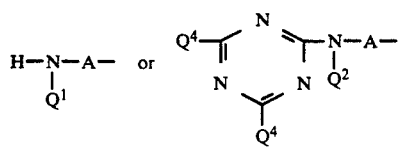

where A, Q$^1$, Q$^2$ and Q$^4$ are each as defined above, and, if dye precursors were used, converting the resulting intermediate compounds into the desired dyes in a conventional manner.

When the compound X-H is a coupling component, the dyes of the present invention are obtained for example on subjecting the fiber-reactive system of the formula XXXVIII

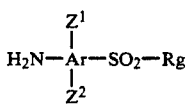

(XXVIII)

where Ar, Z$^1$, Z$^2$ and Rg are each as defined above, to conventional diazotization and coupling to the coupling component X—H.

The preparation of the fiber-reactive compound of the formula XXXVIII is known per se and described for example in earlier German Patent Application P 40 38 200.1.

The novel reactive dyes of the formula I are highly advantageous for dyeing or printing hydroxyl- or nitrogen-containing organic substrates. Such substrates are for example leather or fiber material which predominantly contains natural or synthetic polyamides or natural or regenerated cellulose. The novel dyes are preferably suitable for dyeing and printing textile material based on wool or in particular cotton.

Depending on the nature of the reactive group, the novel reactive dyes of the formula I interact with the particular substrate groups as follows.

a) In the course of the dyeing, first the novel reactive dyes of the formula I are converted into the corresponding allene compounds, which then react with the particular substrate groups, for example the hydroxyl groups of cellulose, by an addition mechanism, as it is depicted for example in the following scheme:

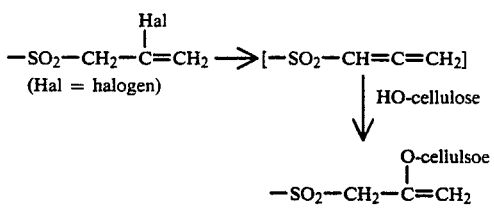

b) In the course of the dyeing, the novel reactive dyes of the formula I react with the particular substrate groups, for example the hydroxyl groups of cellulose, by an addition mechanism, as it is depicted, for example, in the following scheme:

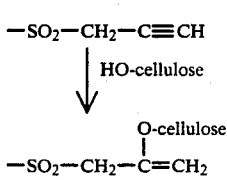

Suitable dyeing methods are the known reactive dyeing methods, in particular exhaust dyeing at from 30° to 80° C. and cold pad-batch dyeing with a batching time of from 2 to 48 hours. The novel dyes are notable for a high yield and high wet fastness properties, in particular a high fastness to soda boiling. They product brilliant dyeings.

The Examples which follow will further illustrate the invention. Percentages are by weight, unless otherwise stated.

In the Table Examples, the abbreviations E-1 to E-11 have the following meanings:

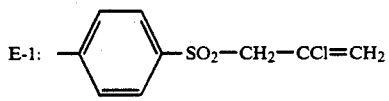

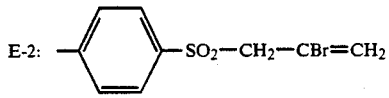

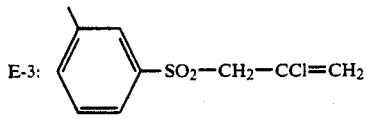

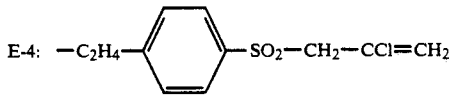

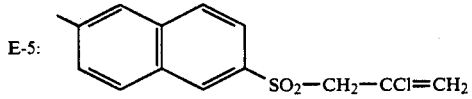

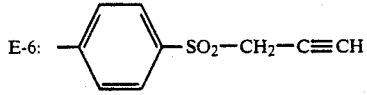

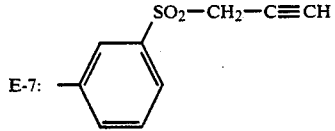

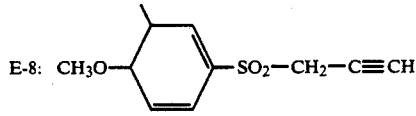

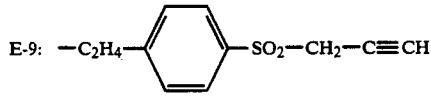

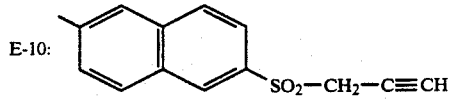

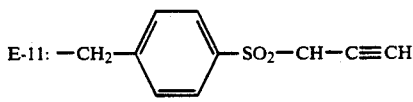

EXAMPLE 1

A solution of 14.5 g of 4-(2-chloroprop-2-enylsulfonyl)aniline hydrochloride in 400 ml of 1:1 v/v acetone/water was diazotized at from 0° to 5° C. with 15 ml of 36% strength by weight hydrochloric acid and 14 ml of 3.33N sodium nitrite solution and mixed with a neutral aqueous solution of 24.1 g of 1-hydroxynaphthalene-3,6-disulfonic acid. Saturated sodium acetate solution was added to adjust the pH to 4.5. After the coupling had ended, the dye was salted out with sodium chloride and freeze dried. It dyes cotton in a fast orange shade and conforms to the formula

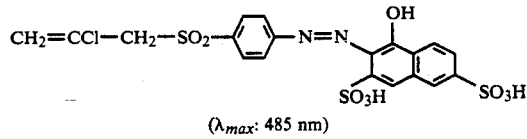

($\lambda_{max}$: 485 nm)

Further dyes of the present invention which are obtained in a similar manner are listed in Table 1:

TABLE 1

| | | E—N=N—K | |
|---|---|---|---|
| Example No. | E | K | Hue on cotton |
| 2 | E-1 | (pyridone with CH₃, CH₂SO₃H, OH, N-C₂H₅) | greenish yellow |
| 3 | E-1 | (pyridone with CH₃, CONH₂, OH, N-C₂H₅) | greenish yellow |
| 4 | E-1 | (pyridone with CH₃, OH, N-CH₃) | greenish yellow |
| 5 | E-1 | (pyrazolone with H₃C, CH₃, HO, N-aryl-SO₃H) | yellow |

TABLE 1-continued

E—N=N—K

| Example No. | E | K | Hue on cotton |
|---|---|---|---|
| 6 | E-3 | pyrazolone with HO2C, CH3, OH, and phenyl-SO3H substituents | yellow |
| 7 | E-1 | benzene with SO3H, NH2, and NH—CO—CH3 | yellowish orange |
| 8 | E-2 | benzene with SO3H, NH2, and NH—CO—NH2 | yellowish orange |
| 9 | E-1 | benzene with SO3H, NH2, and NH—CO—NH2 | yellowish orange |
| 10 | E-3 | benzene with SO3H, NH2, and NH—CO—CH3 | yellowish orange |
| 11 | E-2 | naphthalene with HO, CH3, HO3S, SO3H | orange |
| 12 | E-1 | naphthalene with HO, SO3H, CH3, SO3H | orange |
| 13 | E-5 | naphthalene with HO, SO3H, CH3, HO3S | orange |

| Example No. | E | K | Hue on cotton |
|---|---|---|---|
| 14 | E-3 | naphthalene with HO, CH3, SO3H | reddish orange |
| 15 | E-1 | benzene with NH2, CH3, NH—CONHC2H4SO2C2H4OSO3H | yellowish orange |
| 16 | E-1 | naphthalene with HO, CH3, SO3H | reddish orange |
| 17 | E-1 | pyrimidine with HO, CH3, N, OH, N, HO | greenish yellow |
| 18 | E-2 | pyrimidine with H2N, N, morpholine, N, HO, CH3 | yellow |
| 19 | E-1 | pyridine with CO2H, CH3, HO, N, OH | greenish yellow |
| 20 | E-1 | naphthalene with H2N, CH3, SO3H, HO3S | reddish orange |
| 21 | E-1 | phenyl with CH3, N(C2H4OSO3H)2, Cl | orange |

TABLE 1-continued

E—N=N—K

| Example No. | E | K | Hue on cotton |
|---|---|---|---|
| 22 | E-1 | 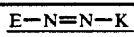 —NC₂H₄SO₂C₂H₄OSO₃H, with C₂H₅ branch, on a phenyl ring bearing CH₃ and Cl | orange |

EXAMPLE 23

12.0 g of 4-(2-chloroprop-2-enylsulfonyl)aniline hydrochloride in 400 ml of 1:1 v/v acetone/water were diazotized at from 0° to 5° C. with hydrochloric acid and admixed with a neutral aqueous solution of 16.2 g of 1-acetylamino-8-hydroxynaphthalene-3,6-disulfonic acid. The coupling was completed at pH 4.5 with saturated sodium acetate solution and the dye formed was precipitated with saturated sodium chloride solution and freeze dried. It dyes cotton in a brilliant red shade having good fastness properties and conforms to the formula

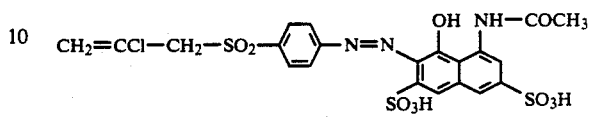

($\lambda_{max}$: 501 nm)

Further dyes which are obtained in a similar manner are listed in Table 2.

TABLE 2

E—N=N—K

| Example No. | E | K | Hue on cotton |
|---|---|---|---|
| 24 | E-3 | naphthalene with HO, NH—COCH₃, HO₃S, SO₃H | red |
| 25 | E-1 | naphthalene with HO, NH—COC₆H₅, HO₃S, SO₃H | red |
| 26 | E-1 | naphthalene with HO, NH—CO—NH—C₆H₅, HO₃S, SO₃H | bluish red |
| 27 | E-1 | naphthalene with HO, NH—CO—CH₂—Cl, HO₃S, SO₃H | red |
| 28 | E-1 | naphthalene with HO, NH—CO—C₂H₄—SO₂—CH=CH₂, HO₃S, SO₃H | red |
| 29 | E-2 | naphthalene with HO, NH—CO—C₂H₅, HO₃S, SO₃H | red |
| 30 | E-1 | naphthalene with HO, HO₃S, NH—CO—CH₂—CH₂—Cl | orange |

TABLE 2-continued

E—N=N—K

| Example No. | E | K | Hue on cotton |
|---|---|---|---|
| 31 | E-2 | ![structure: 1-hydroxy-2-methyl-naphthalene with HO3S and NH—COCH3] | orange |
| 32 | E-5 | ![structure: 1-hydroxy-2-methyl-naphthalene with HO3S and NH—COCH2CH2SO3H] | orange |

EXAMPLE 33

A solution of 14.1 g of 4-(2-chloroprop-2-enylsulfonyl)aniline hydrochloride in 400 ml of 1:1 v/v water-/acetone was diazotized at from 0° to 5° C. with hydrochloric acid and then admixed with a solution of 22.4 g of the condensation product of 1-amino-8-hydroxynaphthalene-3,6-disulfonic acid and cyanuric chloride in 380 ml of water. To complete the coupling, the pH was adjusted to 4.5 with saturated sodium acetate solution. An aqueous solution of 26 g of 4-(2-sulfatoethylsulfonyl)aniline, adjusted to pH 4.5, was added and the mixture was heated at from 40° to 45° C. for 3.5 hours. The dye formed was salted out with sodium chloride and freeze dried. It dyes cotton in a bluish erd shade having good fastness properties and has the formula

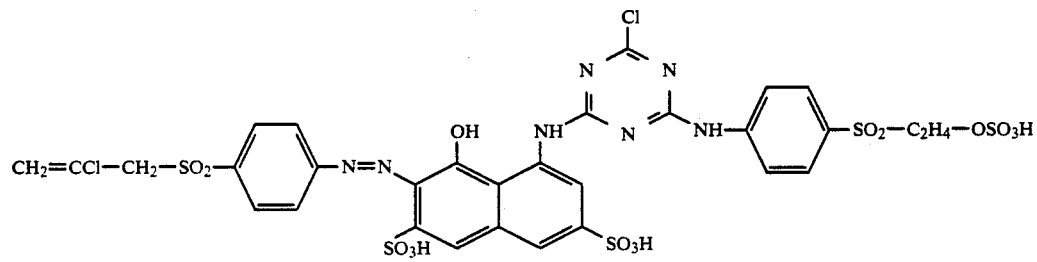

($\lambda_{max}$: 523 nm)

Further dyes of the present invention which are obtained in a similar manner are listed in Table 3.

TABLE 3

E—N=N—K—[triazine with N, X, R substituents]

| Example No. | E | K | X | R | Hue on cotton |
|---|---|---|---|---|---|
| 34 | E-1 | ![1-hydroxy-8-amino-2-methyl naphthalene with HO3S and SO3H] | Cl | OCH3 | red |
| 35 | E-1 | ![1-hydroxy-8-amino-2-methyl naphthalene with HO3S and SO3H] | F | ![NH-phenyl-SO3H] | red |
| 36 | E-1 | ![1-hydroxy-8-amino-2-methyl naphthalene with HO3S and SO3H] | Cl | OCH2CH2OCH3 | red |

TABLE 3-continued $$E-N=N-K\underset{N}{\overset{N}{\rightleftarrows}}\underset{R}{\overset{X}{\rightleftarrows}}$$

| Example No. | E | K | X | R | Hue on cotton |
|---|---|---|---|---|---|
| 37 | E-1 | 1-hydroxy-3-methyl-6-sulfo-7-amino naphthyl | Cl | 3-sulfophenylamino | orange |
| 38 | E-1 | 3-carboxy-4-methyl-5-hydroxy-1-(2-sulfo-5-amino phenyl)pyrazolyl | Cl | 3-sulfophenylamino | yellow |
| 39 | E-2 | 3-carboxy-4-methyl-5-hydroxy-1-(3-amino phenyl)pyrazolyl | Cl | 3-sulfophenylamino | yellow |
| 40 | E-1 | 3-carboxy-4-methyl-5-hydroxy-1-(3-amino phenyl)pyrazolyl | F | 3-sulfophenylamino | yellow |
| 41 | E-1 | 4-methyl-5-methyl-3-carbamoyl-6-hydroxy-2-oxo-1-(3-aminopropyl)pyridyl | Cl | 3-sulfophenylamino | greenish yellow |
| 42 | E-1 | 2-sulfo-5-methyl-3-amino-4-amino phenyl | Cl | 4-sulfophenylamino | yellowish orange |
| 43 | E-1 | 2-sulfo-5-methyl-3-amino-4-amino phenyl | F | 4-sulfophenylamino | yellowish orange |

TABLE 3-continued $$E-N=N-K\underset{\underset{R}{\overset{N}{\underset{\|}{\diagdown}}}}{\overset{N}{\underset{\|}{\diagup}}}\underset{N}{\overset{X}{\diagdown}}$$

| Example No. | E | K | X | R | Hue on cotton |
|---|---|---|---|---|---|
| 44 | E-2 | ![benzene with SO₃H, NH₂, CH₃, NH-] (SO₃H, NH₂, NH— on methylbenzene) | Cl | NH—phenyl—SO₃H (meta) | yellowish orange |
| 45 | E-1 | HO, NH—, CH₃, HO₃S, SO₃H on naphthalene | Cl | NH—phenyl—SO₂C₂H₄OSO₃H (meta) | red |
| 46 | E-3 | HO, NH—, CH₃, HO₃S, SO₃H on naphthalene | Cl | NH—phenyl—SO₂C₂H₄OSO₃H (para) | red |
| 47 | E-2 | OH, NH—, CH₃, HO₃S, SO₃H on naphthalene | Cl | NH—phenyl—SO₂—CH₂—CH=CH₂ | red |
| 48 | E-1 | OH, NH—, CH₃, HO₃S, SO₃H on naphthalene | Cl | NH—phenyl with CH₂SO₃H and SO₂C₂H₄Cl | red |
| 49 | E-1 | OH, NH—, CH₃, HO₃S, SO₃H on naphthalene | F | NHCH₂CH₂SO₂—CH=CH₂ | red |
| 50 | E-1 | benzene with NH₂, HN— (meta) | Cl | NH—phenyl—SO₂C₂H₄OSO₃H (meta) | yellowish orange |

EXAMPLE 51

A neutral aqueous solution of 26.8 g of 4-(2-chloroprop-2-enysulfonyl)aniline hydrochloride in 400 ml of water and 100 ml of acetone was admixed with a suspension of 19.3 g of cyanuric chloride in 250 ml of ice-water, and the mixture was stirred at from 0° to 5° C. for 2.5 hours, during which the pH of from 5 to 6 was maintained with sodium bicarbonate. After filtration, the suspension was added to a solution of 16.9 g of 1,3-diaminobenzene-4-sulfonic acid in 100 ml of water being stirred at 40° C. and pH 5–6, and the mixture was maintained at from 35° to 40° C. and pH 3–4 for 2 hours.

After the reaction had ended, the product was diazotized at from 0° to 5° C. with 30 ml of 3.33N aqueous sodium nitrite solution and 60 ml of 5N hydrochloric acid and coupled onto 27.6 g of 1,4-dimethyl-3-hydroxysulfonylmethyl-6-hydroxypyrid-2-one. The dye obtained was salted out with sodium chloride and gently dried under reduced pressure. It dyes cotton in a brilliant, fast, greenish yellow shade and conforms to the formula

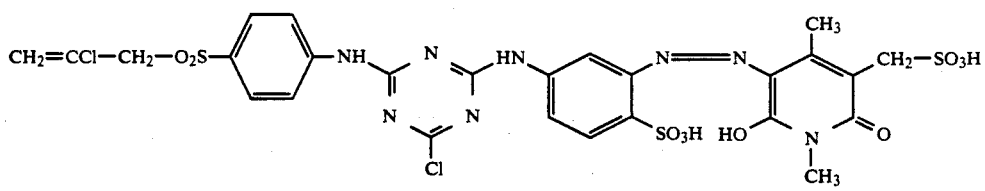

EXAMPLE 52

33 g of the sodium salt of the dye of formula

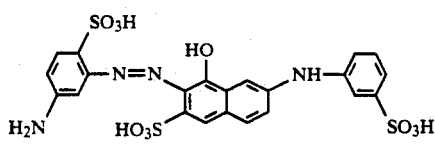

were dissolved in water at pH 6 and 40° C. and admixed with 26 g of the condensation product of cyanuric chloride and 4-(2-chloroprop-2-enylsulfonyl)aniline hydrochloride dissolved in 1,000 ml of water and the mixture was stirred at 40° C. for a further 2 hours during which the pH of from 5 to 6 was maintained with sodium bicarbonate. The dye was precipitated with potassium chloride and gently dried. It dyes cotton in a brown shade and conforms to the formula

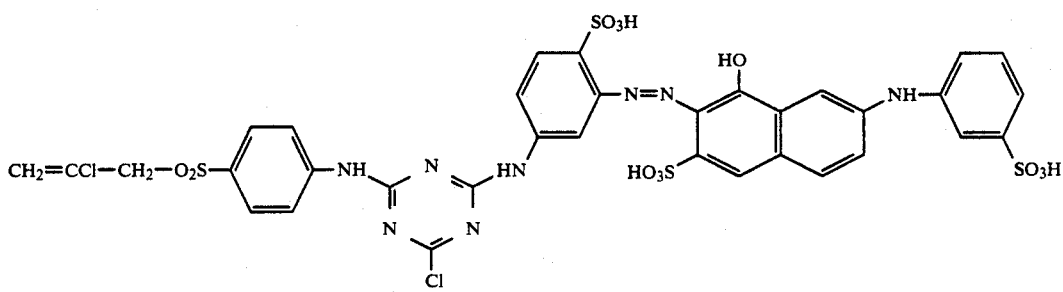

The dyes described in Table 4 are obtained in a similar manner.

TABLE 4

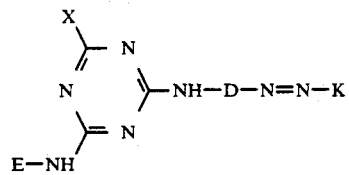

| Example No. | E | X | D | K | Hue on cotton |
|---|---|---|---|---|---|
| 53 | E-1 | Cl | 2,4-disubstituted benzene with SO$_3$H | naphthalene with HO, NH—COC$_6$H$_5$, HO$_3$S, SO$_3$H | red |
| 54 | E-1 | F | 2,4-disubstituted benzene with SO$_3$H | naphthalene with HO, NH—COC$_6$H$_5$, HO$_3$S, SO$_3$H | red |
| 55 | E-1 | Cl | 2,4-disubstituted benzene with SO$_3$H | naphthalene with HO, NH—COCH$_3$, HO$_3$S, SO$_3$H | red |

TABLE 4-continued
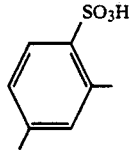
| Example No. | E | X | D | K | Hue on cotton |
|---|---|---|---|---|---|
| 56 | E-1 | Cl | 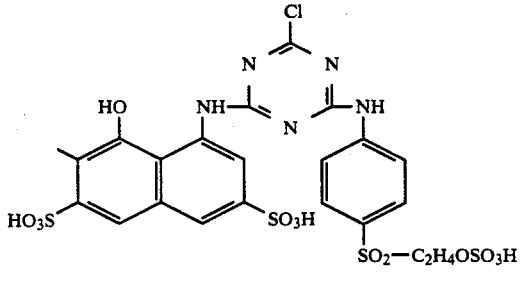 | 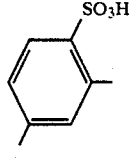 | red |
| 57 | E-1 | Cl | 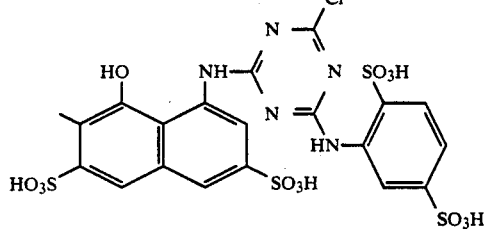 | 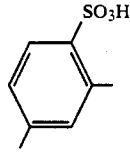 | red |
| 58 | E-1 | Cl | 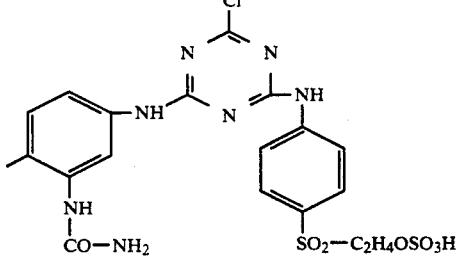 | 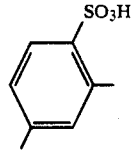 | yellow |
| 59 | E-1 | Cl | 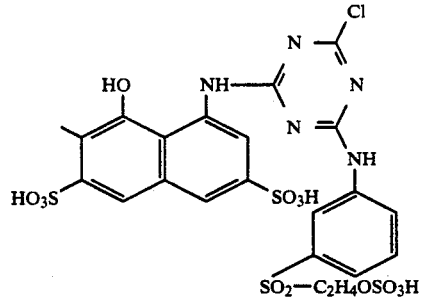 | 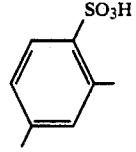 | red |
| 60 | E-2 | Cl | | 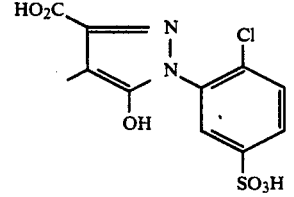 | yellow |

TABLE 4-continued
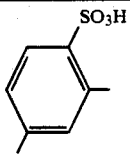
| Example No. | E | X | D | K | Hue on cotton |
|---|---|---|---|---|---|
| 61 | E-3 | Cl | 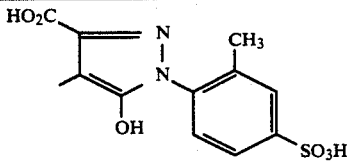 | 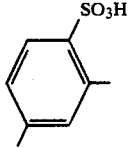 | yellow |
| 62 | E-5 | Cl | 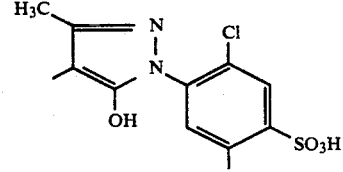 | 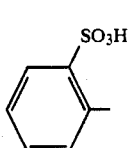 | yellow |
| 63 | E-1 | Cl | 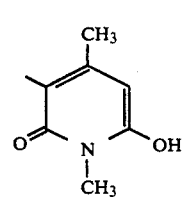 | 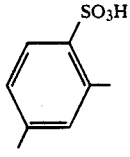 | greenish yellow |
| 64 | E-1 | Cl | 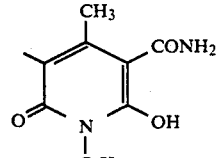 | 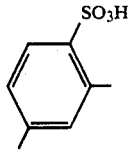 | greenish yellow |
| 65 | E-1 | Cl | 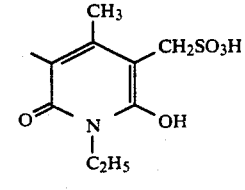 | 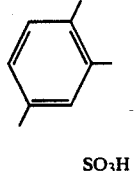 | greenish yellow |
| 66 | E-1 | Cl | 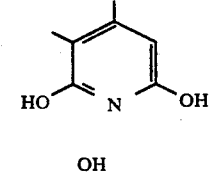 | 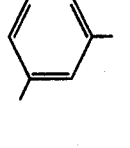 | greenish yellow |
| 67 | E-2 | Cl | 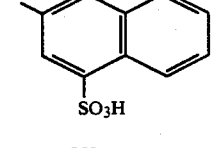 | 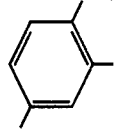 | reddish orange |
| 68 | E-1 | Cl | | 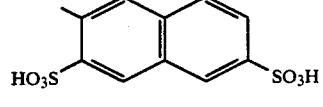 | orange |

TABLE 4-continued
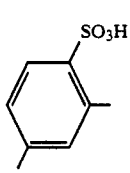
| Example No. | E | X | D | K | Hue on cotton |
|---|---|---|---|---|---|
| 69 | E-1 | F | 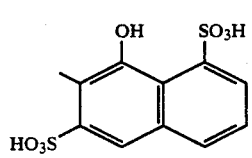 | 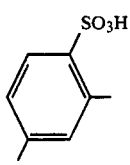 | orange |
| 70 | E-5 | Cl | 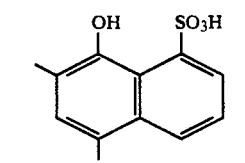 | 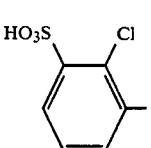 | reddish orange |
| 71 | E-1 | Cl | 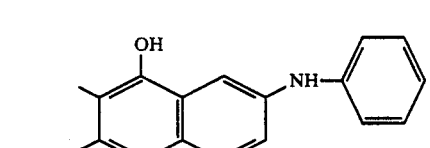 | 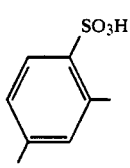 | brown |
| 72 | E-3 | Cl | 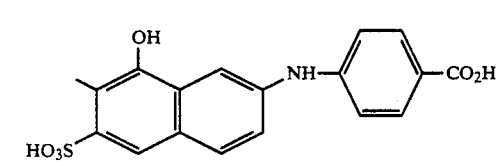 | 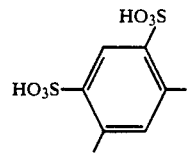 | brown |
| 73 | E-1 | Cl | 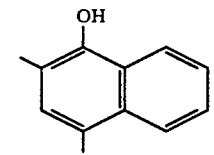 | 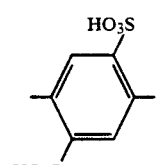 | reddish orange |
| 74 | E-1 | Cl | 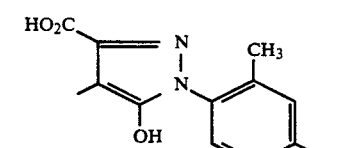 | 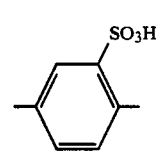 | yellowish orange |
| 75 | E-2 | Cl | 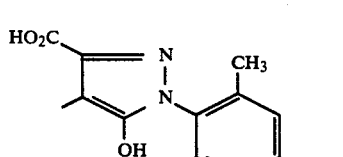 | 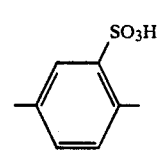 | yellowish orange |
| 76 | E-1 | Cl | 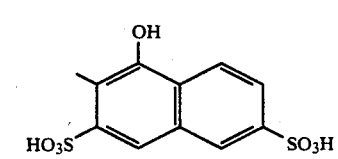 | | red |

TABLE 4-continued
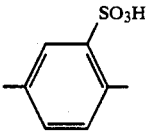
| Example No. | E | X | D | K | Hue on cotton |
|---|---|---|---|---|---|
| 77 | E-1 | Cl | 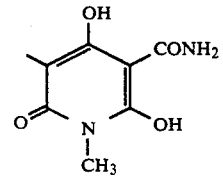 | 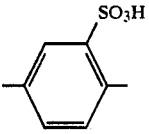 | yellowish orange |
| 78 | E-3 | Cl | 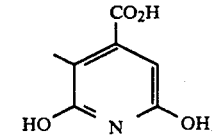 | 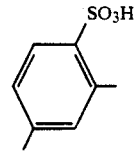 | yellowish orange |
| 79 | E-3 | Cl | 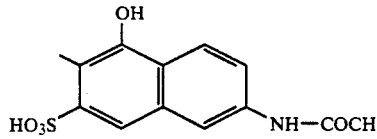 | 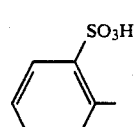 | orange |
| 80 | E-3 | F | 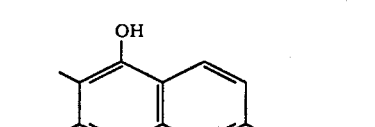 | 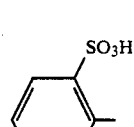 | orange |
| 81 | E-1 | Cl | 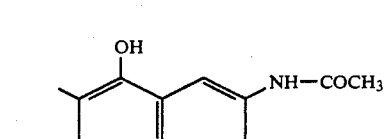 | 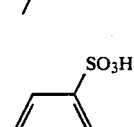 | orange |
| 82 | E-1 | Cl | 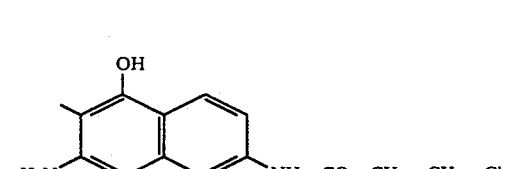 | 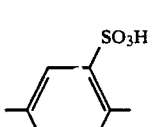 | orange |
| 83 | E-4 | Cl | 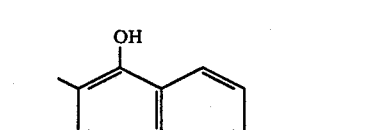 | 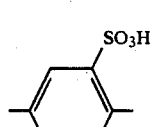 | red |
| 84 | E-2 | Cl | 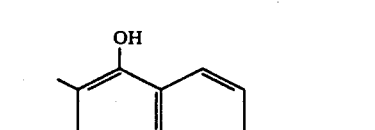 |  | red |

TABLE 4-continued

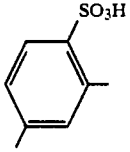

| Example No. | E | X | D | K | Hue on cotton |
|---|---|---|---|---|---|
| 85 | E-1 | Cl | 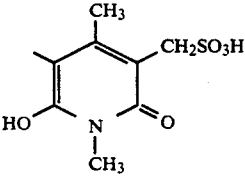 | 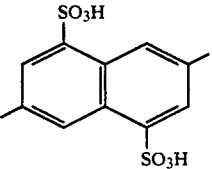 | greenish yellow |
| 86 | E-1 | Cl | 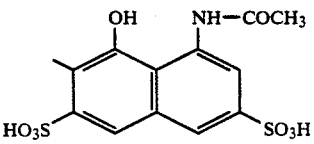 | 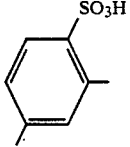 | bluish red |
| 87 | E-1 | Cl | 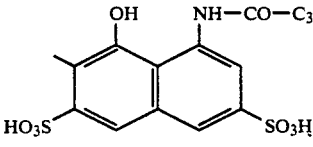 | 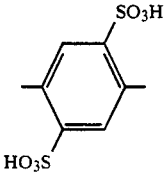 | bluish red |
| 88 | E-1 | Cl | 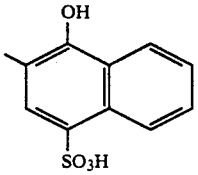 | 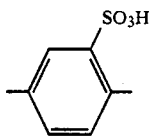 | red |
| 89 | E-2 | Cl | 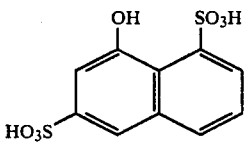 | 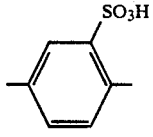 | red |
| 90 | E-1 | Cl | 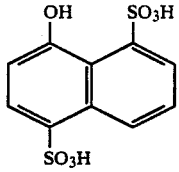 |  | red |

EXAMPLE 91

A neutral solution of 16.1 g of 1-amino-8-hydroxynaphthalene-3,6-disulfonic acid was admixed at 10° C. with a suspension of 9.3 g of cyanuric chloride in 80 ml of ice-water while the pH was maintained at less than 2 with concentrated hydrochloric acid. This solution was added at from 0° to 5° C. to the hydrochloric acid diazotization product of 8.7 g of aniline-2-sulfonic acid in 100 ml of water. THe coupling was completed at pH 4–4.5 with saturated sodium acetate solution. Then a solution of 12 g of 4-(2-chloroprop-2-enylsulfonyl)aniline hydrochloride in 300 ml of 1:1 v/v water/acetone, adjusted to pH 4.5, was then added, followed by 500 ml of water for dilution. To complete the reaction the mixtures was heated at 40° to 50° C. for 1.5 hours, during which the pH was maintained at from 4 to 4.5 with sodium bicarbonate.

The dye formed dyes cotton in a fast brilliant red shade and has the structural formula

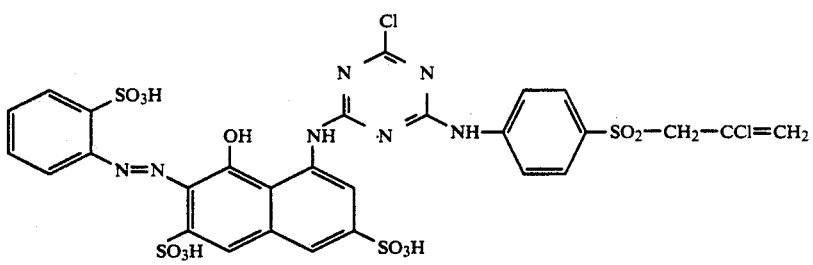

($\lambda_{max}$: 514/534 nm)

EXAMPLE 92

31.9 g (0.1 mol) of 1-amino-8-hydroxynaphthalene-3,6-disulfonic acid were dissolved in 150 g of water under neutral conditions and cooled down to 0°-5° C. At the temperature a suspension of 18.2 g (0.1 mol) of cyanuric chloride and 200 g of ice was added, and the mixture was stirred until the reaction had ended. Then 23.2 g (0.1 mol) of 3-(2-chloroprop-2-enylsulfonyl)aniline, dissolved in 150 ml of 1:1 v/v water/acetone, were added, the pH was adjusted to 5.5-6 with 2N sodium hydroxide solution, and the temperature was raised to 20°-25° C. in the course of 2-3 hours.

After the reaction had ended, the reaction mixture was cooled down to 0°-10° C. and coupled to 17.3 g of diazotized aniline-2-sulfonic acid at pH 5.5. AFter the coupling had ended, the dye was isolated by salting out. It dyes cotton in a red shade and conforms to the formula

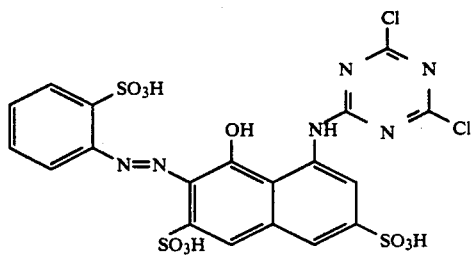

described in Example 91 was added at pH 4-4.5 a solution of 11.7 g of 4-(2-bromoprop-2-enylsulfonyl)aniline hydrochloride in 300 ml of 1:1 v/v water/acetone. To complete the reaction, the mixture was heated to 40°-50° C. for 1 hour. After cooling to 20° C., the dye obtained was salted out with sodium chloride and freeze dried. It dyes cotton in a fast brilliant red shade and conforms to the formula

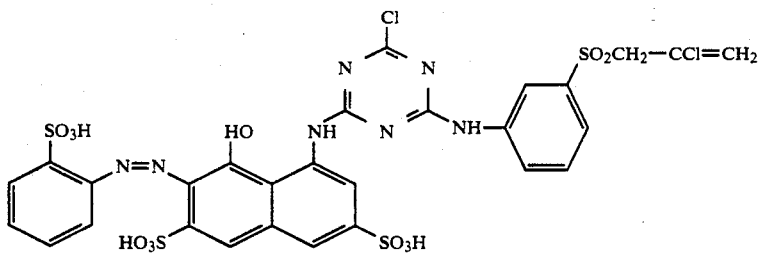

($\lambda_{max}$: 513/534 nm)

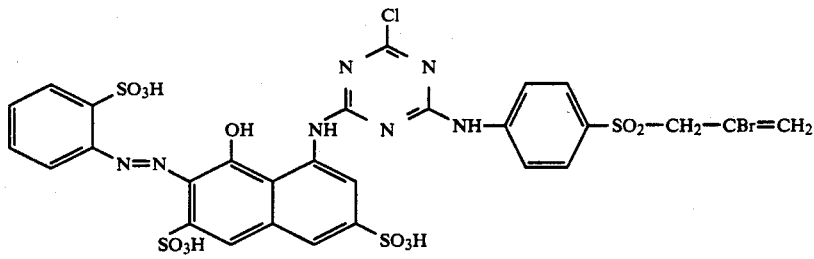

($\lambda_{max}$: 515/534 nm)

EXAMPLE 93

To an aqueous solution, adjusted to pH 4.5, of 19.5 g of the azo dye of the formula

EXAMPLE 94

32.8 g of the azo dye obtained by coupling diazotized 2-aminonaphthalene-3,6,8-trisulfonic acid with 3-aminophenylurea were dissolved in 150 ml of water under neutral conditions and admixed at from 15° to 20° C. with a suspension of 11.1 g of cyanuric chloride in 100 ml of ice water acidified with hydrochloric acid, and the pH was maintained at 7 with 20% strength by weight sodium hydroxide solution. After stirring at 20° C. for 1 hour, the mixture had added to it a solution of 29 g of 4-(2-chloroprop-2-enylsulfonyl)aniline hydrochloride in 400 ml of 1:1 v/v water/acetone and the pH was adjusted to 6.5 with 20% strength by weight sodium hydroxide solution. To complete the reaction, the mixture was heated at 40° to 45° C. for 5 hours. After cooling down to 20° C., the dye obtained was salted out with isopropanol and freeze dried. It dyes cotton in a yellowish orange shade having good fastness properties and conforms to the formula then admixed with 18 g of 4-(2-chloroprop-2-enylsulfonyl)-aniline hydrochloride, dissolved in 300 ml of 1:1 v/v water/acetone. After stirring at pH 4.5 for 2 hours the reaction was complete. The dye obtained was then salted out with sodium chloride and freeze dried. It dyes cotton in a bluish red shade having good fastness properties and conforms to the formula

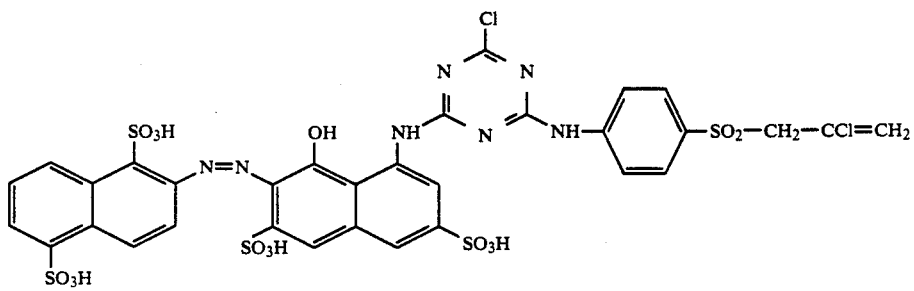

($\lambda_{max}$: 518/542 nm)

EXAMPLE 96

14.2 g of 4-(2-sulfatoethylsulfonyl)aniline were diazotized in 200 ml of water at from 0° to 5° C. with hydrochloric acid and then added to a solution, acidified with hydrochloric acid, of 23.5 g of the condensation product of 1-amino-8-hydroxynaphthalene-3,6-disulfonic acid and cyanuric chloride described in Example 91. The pH was adjusted to 4.5 with saturated sodium acetate solution, and after 30 minutes' stirring at 30° C. a solution of 16 g of 4-(2-chloroprop-2-enylsulfonyl)aniline hydrochloride in 250 ml of 1:1 v/v water/acetone was added. To complete the reaction the solution was heated at from 40° to 45° C. for 1.5 hours. The dye formed was salted with sodium chloride and freeze dried. It dyes cotton in a bluish red shade having good fastness properties and has the formula

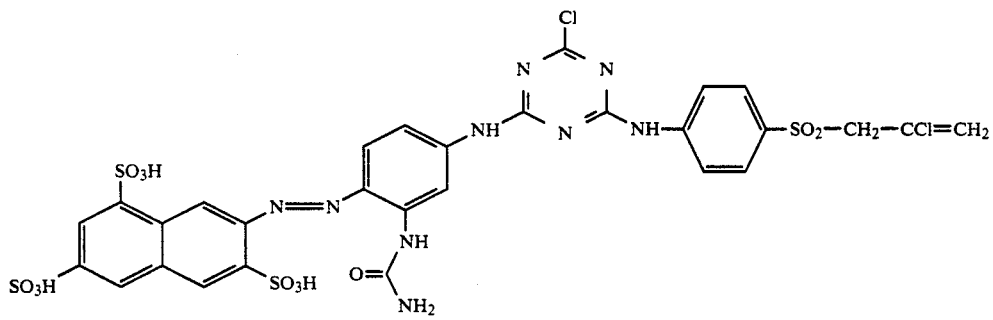

($\lambda_{max}$: 417 nm)

EXAMPLE 95

28.6 of 2-aminonaphthalene-1,5-disulfonic acid were diazotized in 400 ml of water at from 0° to 5° C. with hydrochloric acid. Then a solution of 23.5 g of the condensation product of 1-amino-8-hydroxynaphthalene-3,6-disulfonic acid and cyanuric chloride described in Example 91, the solution having been acidified with hydrochloric acid, was added. The pH was brought to 4.5 with saturated sodium acetate solution, and the solution was subsequently stirred at 20° C. for 1 hour and

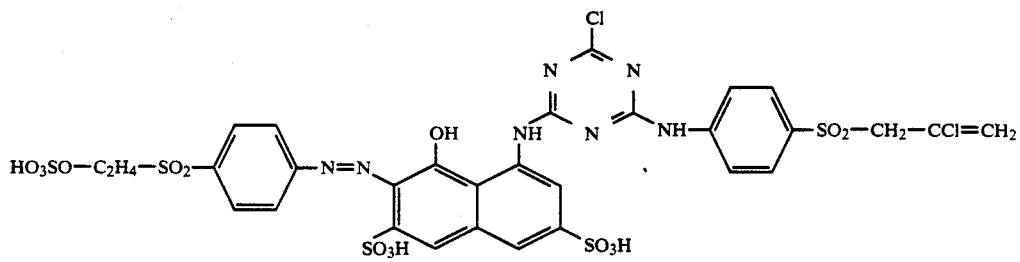

($\lambda_{max}$: 530 nm)

EXAMPLE 97

A neutral solution of 15.9 g of 1-amino-8-hydroxynaphthalene-3,6-disulfonic acid was admixed at 10° C. with a suspension of 9.3 g of cyanuric chloride in 80 ml of ice-water while the pH was maintained at less than 2 with concentrated hydrochloric acid. This solution was added at from 0° to 5° C. t the hydrochloric acid diazotization product of 9 g of aniline-2-sulfonic acid in 100 ml of water. The coupling was completed with saturated sodium acetate solution at pH 4–4.5. A solution, adjusted to pH 4.5, of 23 g of 2-[4-(2-chloroprop-2-enylsulfonyl)phenyl]ethylamine hydrochloride in 300 ml of 1:1 v/v water/acetone was added. After dilution with 500 ml of water the reaction mixture was heated at from 40° to 50° C. for two hours to complete the reaction. The dye formed was precipitated with sodium chloride and freeze dried. It dyes cotton in a fast brilliant red shade and has the structural formula

EXAMPLE 98

14.2 g of 4-(2-sulfatoethylsulfonyl)aniline were diazotized in 200 ml of water at from 0° to 5° C. with hydrochloric acid and then added to a solution, acidified with hydrochloric acid, of 23.5 g of the condensation product of 1-amino-8-hydroxynaphthalene-3,6-disulfonic acid and cyanuric chloride described in Example 91. The pH was adjusted to 4.5 with saturated sodium acetate solution. Then a solution of 31 g of 2-[4-(2-chloroprop-2-enylsulfonyl)phenyl]ethylamine hydrochloride in 400 ml of 1:1 v/v water/acetone was added. To complete the reaction the solution was heated at from 40° to 45° C. for 7.5 hours. The dye formed was salted out with sodium chloride and freeze dried. It dyes cotton in a bluish red shade having good fastness properties and has the formula

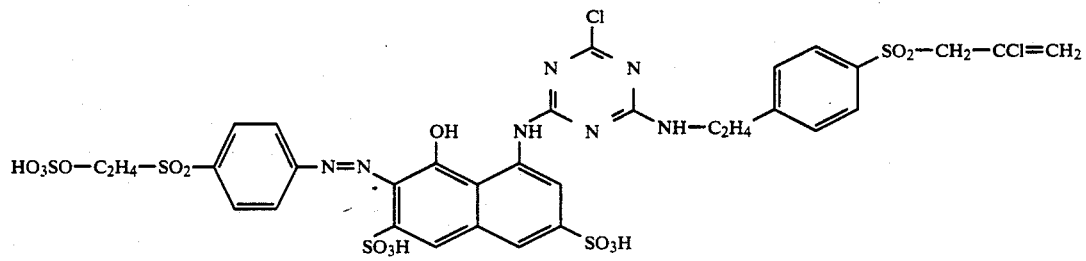

($\lambda_{max}$: 514 nm)

The dyes listed in Table 5 are obtained in a similar manner.

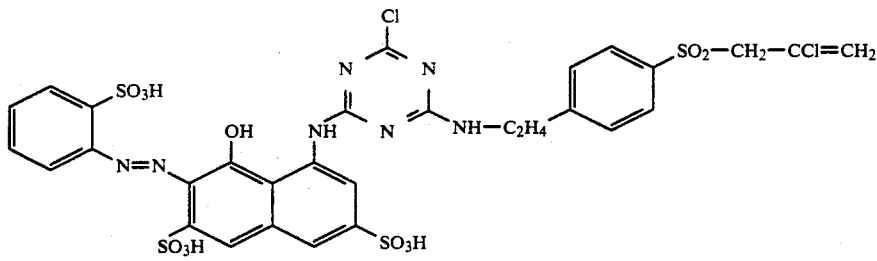

($\lambda_{max}$: 509/531 nm)

TABLE 5

D—N=N—K—<triazine with X and N—E—R substituents>

| Example No. | D | R | K | X | E | Hue on cotton |
|---|---|---|---|---|---|---|
| 99 | 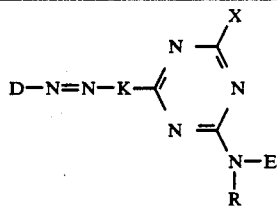 (o-SO₃H phenyl) | H | HO / NH— naphthalene with HO₃S and SO₃H | F | E-3 | red |

TABLE 5-continued

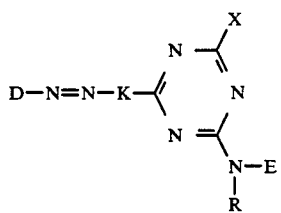

| Example No. | D | R | K | X | E | Hue on cotton |
|---|---|---|---|---|---|---|
| 100 | 2-methylbenzenesulfonic acid | H | 8-hydroxy-7-methyl-3,6-disulfo-naphthalen-1-yl-amino | F | E-1 | red |
| 101 | 4-methoxy-2-methylbenzene-1-sulfonic acid (with SO₃H) | H | 8-hydroxy-7-methyl-3,6-disulfo-naphthalen-1-yl-amino | Cl | E-1 | bordeaux |
| 102 | 2-methyl-1,4-benzenedisulfonic acid | H | 8-hydroxy-7-methyl-3,6-disulfo-naphthalen-1-yl-amino | Cl | E-1 | bluish red |
| 103 | 2-methyl-1,3-benzenedisulfonic acid | H | 8-hydroxy-7-methyl-3,6-disulfo-naphthalen-1-yl-amino | Cl | E-1 | bluish red |
| 104 | CH₂=CH—CH₂—SO₂—(4-methylphenyl) | H | 8-hydroxy-7-methyl-3,6-disulfo-naphthalen-1-yl-amino | Cl | E-1 | red |
| 105 | HO₃SO—CH₂—CH₂—SO₂—(4-methylphenyl) | H | 8-hydroxy-7-methyl-3,6-disulfo-naphthalen-1-yl-amino | Cl | E-3 | red |
| 106 | HO₃SO—CH₂—CH₂—SO₂—(3-methylphenyl) | H | 8-hydroxy-7-methyl-3,6-disulfo-naphthalen-1-yl-amino | F | E-1 | red |
| 107 | 2-methyl-1,5-naphthalenedisulfonic acid | H | 8-hydroxy-7-methyl-3,6-disulfo-naphthalen-1-yl-amino | Cl | E-3 | bluish red |

TABLE 5-continued

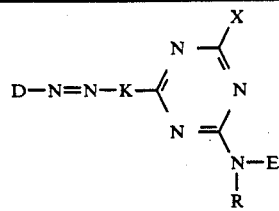

| Example No. | D | R | K | X | E | Hue on cotton |
|---|---|---|---|---|---|---|
| 108 | 2-methyl-1,5-naphthalenedisulfonic acid (1-SO₃H, 5-SO₃H, 2-CH₃) | CH₃ | 8-amino-1-hydroxy-2-methyl-3,6-naphthalenedisulfonic acid | Cl | E-1 | bluish red |
| 109 | 2-methylbenzenesulfonic acid (1-SO₃H, 2-CH₃) | H | 4-amino-5-hydroxy-6-methyl-3,8-naphthalenedisulfonic acid... (4-NH—, 5-OH, 6-CH₃, 3-SO₃H, 8-SO₃H) | Cl | E-1 | red |
| 110 | 2-methylbenzenesulfonic acid | H | 6-amino-1-hydroxy-2-methyl-3-naphthalenesulfonic acid | Cl | E-1 | orange |
| 111 | 4-methoxy-2-methylbenzenesulfonic acid | H | 6-amino-1-hydroxy-2-methyl-3-naphthalenesulfonic acid | Cl | E-1 | orange |
| 112 | 2,5-dimethylbenzene-1,4-disulfonic acid | H | 6-amino-1-hydroxy-2-methyl-3-naphthalenesulfonic acid | Cl | E-1 | orange |
| 113 | 4-methoxy-2-methylbenzene-1,5-disulfonic acid | H | 6-amino-1-hydroxy-2-methyl-3-naphthalenesulfonic acid | Cl | E-1 | orange |
| 114 | 2-methyl-1,5-naphthalenedisulfonic acid | H | 6-amino-1-hydroxy-2-methyl-3-naphthalenesulfonic acid | Cl | E-1 | orange |
| 115 | 2-methyl-1,5-naphthalenedisulfonic acid | H | 7-amino-1-hydroxy-2-methyl-3-naphthalenesulfonic acid | Cl | E-1 | yellowish red |

TABLE 5-continued

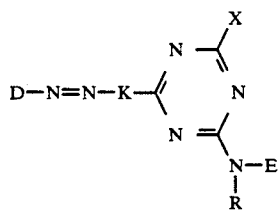

| Example No. | D | R | K | X | E | Hue on cotton |
|---|---|---|---|---|---|---|
| 116 | 4-methyl-2,5-disulfophenyl (CH₃ at 4, HO₃S at 1 and 5) | H | 1-hydroxy-2-methyl-7-amino-3-sulfonaphthalene | Cl | E-1 | yellowish red |
| 117 | 5-methoxy-2-methyl-1,4-disulfophenyl | H | 1-hydroxy-2-methyl-7-amino-3-sulfonaphthalene | Cl | E-1 | yellowish red |
| 118 | 4-acetamido-2-methyl-phenyl-SO₃H | H | 1-hydroxy-2-methyl-6-amino-3-sulfonaphthalene | Cl | E-1 | red |
| 119 | 3-methyl-1,5,7-trisulfonaphthyl | H | 5-hydroxy-6-methyl-4-amino-2,7-disulfonaphthalene | Cl | E-1 | bordeaux |
| 120 | 4-[(4-chloro-6-(4-sulfoethylsulfonyl-phenylamino)-1,3,5-triazin-2-yl)amino]-2-methyl-phenyl (with SO₂—C₂H₄OSO₃H) | H | 5-hydroxy-6-methyl-4-amino-2,7-disulfonaphthalene | Cl | E-1 | red |
| 121 | 4-[(4-chloro-6-(3-sulfophenylamino)-1,3,5-triazin-2-yl)amino]-2-methyl-phenyl-SO₃H | H | 5-hydroxy-6-methyl-4-amino-2,7-disulfonaphthalene | Cl | E-1 | red |

TABLE 5-continued

Structure:
D—N=N—K with triazine ring bearing X and N—E(R)

| Example No. | D | R | K | X | E | Hue on cotton |
|---|---|---|---|---|---|---|
| 122 | 4-sulfo-2-methylphenyl with NH linked to triazine (Cl, NH-E¹) | H | 1-hydroxy-2-methyl-3,6-disulfo-8-amino-naphthyl | Cl | E-1 | red |
| 123 | 4-sulfo-2-methylphenyl; NH-triazine(Cl)-NH-(3-SO₂C₂H₄OSO₃H-phenyl) | H | 1-hydroxy-2-methyl-3-sulfo-6-amino-naphthyl | Cl | E-1 | red |
| 124 | 2-methyl-3,6-disulfophenyl; NH-triazine(Cl)-NH-(4-sulfophenyl) | H | 1-hydroxy-2-methyl-3-sulfo-6-amino-naphthyl | Cl | E-1 | red |
| 125 | 3-methyl-naphthalene-1,5,7-trisulfonyl | H | 4-methyl-3-acetamido-phenyl-NH— | Cl | E-1 | yellowish orange |
| 126 | 3-methyl-naphthalene-1,5,7-trisulfonyl | H | 4-methyl-3-acetamido-phenyl-NH— | F | E-1 | yellowish orange |
| 127 | 3-methyl-naphthalene-1,5,7-trisulfonyl | H | 4-methyl-3-ureido-phenyl-NH— | F | E-1 | yellowish orange |
| 128 | 3-methyl-naphthalene-1,5,7-trisulfonyl | CH₃ | 4-methyl-3-ureido-phenyl-NH— | Cl | E-1 | yellowish orange |

TABLE 5-continued

Structure: D—N=N—K—[triazine with X, N—E, and N—R substituents]

| Example No. | D | R | K | X | E | Hue on cotton |
|---|---|---|---|---|---|---|
| 129 | naphthalene with SO₃H (1-position), HO₃S (3-position, lower left), SO₃H (6-position), CH₃ (7-position) | H | phenyl with NH— and NH—CONH₂ | Cl | E-3 | yellowish orange |
| 130 | naphthalene with SO₃H, HO₃S, SO₃H, CH₃ (same as 129) | H | phenyl with NH— and NH—CO—NH—C₆H₅ | Cl | E-1 | yellowish orange |
| 131 | benzene with SO₃H, HO₃S, CH₃ | H | phenyl with NH— and NH—CONH₂ | Cl | E-1 | yellow |
| 132 | benzene with SO₃H, HO₃S, CH₃ | H | phenyl with NH— and NH—CO—NH—C₆H₅ | Cl | E-1 | yellow |
| 133 | benzene with SO₃H, HO₃S (para) | H | phenyl with NH— and NH—CO—NH—C₆H₅ | Cl | E-1 | yellow |
| 134 | benzene with SO₃H, HO₃S (para) | H | phenyl with OCH₃, NH—, NH—CO—CH₃ | Cl | E-1 | yellowish orange |
| 135 | benzene with SO₃H, HO₃S, CH₃ | H | phenyl with OCH₃, NH—, H₃C | Cl | E-1 | yellowish orange |
| 136 | benzene with SO₃H, HO₃S | H | phenyl with OCH₃, NH—, NH—COCH₃ | Cl | E-1 | yellowish orange |

TABLE 5-continued $$D-N=N-K\begin{matrix} N\diagup \overset{X}{\underset{\diagdown}{}}  \\ \diagdown N \\ N\diagdown \diagup \\ N-E \\ | \\ R \end{matrix}$$

| Example No. | D | R | K | X | E | Hue on cotton |
|---|---|---|---|---|---|---|
| 137 | ![SO3H naphthalene with SO3H and methyl] | H | ![phenyl-NH with NH-COCH3] | Cl | E-1 | yellowish orange |
| 138 | ![SO3H naphthalene with SO3H and methyl] | H | ![phenyl-NH with NH-COCH3] | F | E-1 | yellowish orange |
| 139 | ![SO3H naphthalene with SO3H and methyl] | H | ![phenyl with OCH3, NH, NH-CO-CH3] | Cl | E-4 | yellowish orange |
| 140 | E-1 | H | ![naphthalene with HO, NH, HO3S, SO3H, methyl] | Cl | E-3 | red |
| 141 | E-1 | H | ![naphthalene with HO, HO3S, NH, methyl] | Cl | E-1 | red |

EXAMPLE 142

15.9 g of 1-amino-8-hydroxynaphthalene-3,6-disulfonic acid were suspended at from 0° to 5° C. in 210 ml of 10% strength by weight hydrochloric acid and admixed over 35 minutes with a similarly ice-cooled solution of the hydrochloric acid diazotization product of 14 g of 4-(2-sulfateothylsulfonyl)aniline. The solution was warmed to 25° C. over 14 hours with stirring and then admixed at 20° C. with a solution of the hydrochloric diazotization product of 13.7 g of 4-(2-chloroprop-2-enylsulfonyl)aniline hydrochloride. To complete the coupling, the pH was adjusted to 4.5. After stirring for 1 hour the dye formed was precipitated with isopropanol and dried. It dyes cotton in a navy shade having good fastness properties and conforms to the formula

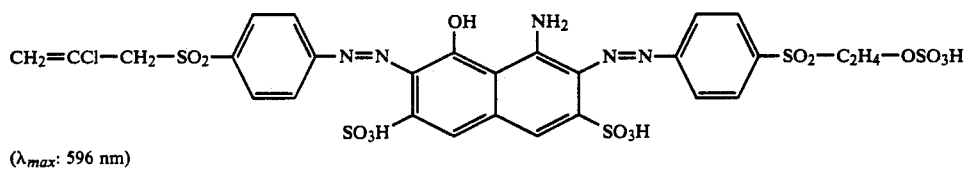

($\lambda_{max}$: 596 nm)

EXAMPLE 143

15.9 g of 1-amino-8-hydroxynaphthalene-3,6-disulfonic acid were suspended at from 0° to 5° C. in 210 ml of 10% strength by weight hydrochloric acid and admixed over 35 minutes with a similarly ice-cooled solution of the hydrochloric acid diazotization product of 13.4 g of 4-(2-sulfatoethylsulfonyl)aniline. The solution was warmed to 25° C. over 14 hours with stirring and then admixed at 20° C. with a solution of the hydrochloric diazotization product of 14.5 g of 4-(2-chloroprop-2-enylsulfonyl)aniline hydrochloride. To complete the coupling, the pH was adjusted to 4.5 with saturated sodium acetate solution. After stirring for 1 hour the reaction was complete and the dye formed was precipitated with isopropanol and dried. It dyes cotton in a navy shade having good fastness properties and conforms to the formula

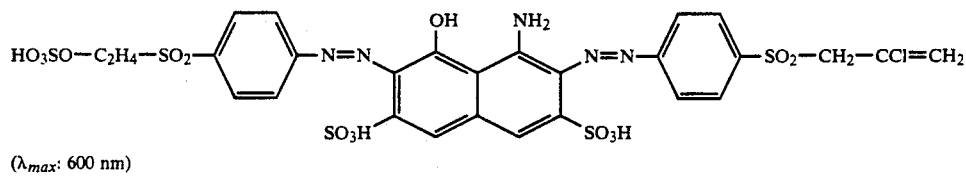

($\lambda_{max}$: 600 nm)

Further dyes according to the present invention are given in Table 6.

TABLE 6

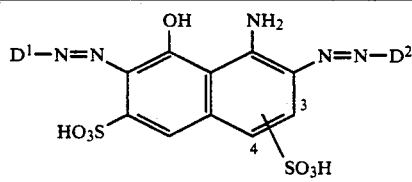

| Example No. | $D^1$ | $D^2$ | Position 3 or 4 | Hue on cotton |
|---|---|---|---|---|
| 144 | HO₃S—⌬— | E-1 | 3 | navy |
| 145 | SO₃ / HO₃S (disubstituted phenyl) | E-2 | 3 | navy |
| 146 | SO₃H / SO₃H (naphthyl) | E-1 | 4 | navy |
| 147 | E-1 | E-1 | 3 | navy |
| 148 | E-1 | E-2 | 3 | navy |
| 149 | E-1 | HO₃S—⌬—NH—triazine(Cl)—NH—⌬—SO₃H | 3 | navy |

TABLE 6-continued

[Structure: naphthalene with OH at one position, NH2 adjacent, D¹—N=N— group on one side, —N=N—D² on other side, HO3S and SO3H substituents, positions 3 and 4 labeled]

| Example No. | D¹ | D² | Position 3 or 4 | Hue on cotton |
|---|---|---|---|---|
| 150 | E-1 | [4-sulfo-3-methylphenyl-NH- connected to 2,5,6-trichloropyrimidin-4-yl] | 3 | navy |
| 151 | E-1 | [5-methyl-2-(2-chloroethylsulfonyl)phenyl with CH2SO3H] | 3 | navy |
| 152 | E-1 | [4-sulfo-3-methylphenyl-NH-triazine(F)-NH-(3-sulfophenyl)] | 3 | navy |
| 153 | E-1 | [4-methylphenyl-SO3H] | 3 | navy |
| 154 | E-1 | [3-methylnaphthalene-1,5-disulfonic acid] | 4 | navy |
| 155 | E-1 | [4-methylphenyl-SO2—CH2—CH=CH2] | 3 | navy |
| 156 | E-1 | [4-methylphenyl-SO2—C2H4—OSO3H] | 3 | navy |

TABLE 6-continued

Structure: D¹—N=N— attached to naphthalene bearing OH, NH₂, HO₃S (position 7), and SO₃H (position 3 or 4), with —N=N—D² at the other position.

| Example No. | D¹ | D² | Position 3 or 4 | Hue on cotton |
|---|---|---|---|---|
| 157 | E-1 | 2-chloro-4-(3-methylphenyl)-pyrimidin-... (m-tolyl substituted dichloropyrimidine) | 3 | navy |
| 158 | E-2 | 4-[(2-chloro-5-fluoro-6-...)-pyrimidinylamino]-3-methyl-benzenesulfonic acid (HO₃S–C₆H₃(CH₃)–NH–pyrimidine with Cl, F, F) | 3 | navy |
| 159 | E-1 | HO₃S–C₆H₃(CH₃)–NH–CO–C₆H₄–N(dichloropyridazinone) | 3 | navy |
| 160 | 4-chloro-2-methyl-5-sulfo-benzenesulfonic acid group (HO₃S, Cl, SO₃H substituted) | E-1 | 3 | reddish navy |
| 161 | CH₂=CH—CH₂O₂S—C₆H₄— | E-1 | 3 | navy |
| 162 | HO₃SOH₄C₂O₂S—C₆H₄— | E-2 | 3 | navy |
| 163 | 2-SO₃H–C₆H₄— | E-1 | 3 | navy |

TABLE 6-continued

[Structure: naphthalene core with OH, NH₂, HO₃S, SO₃H substituents and D¹—N=N— and —N=N—D² groups at positions 3 or 4]

| Example No. | D¹ | D² | Position 3 or 4 | Hue on cotton |
|---|---|---|---|---|
| 164 | HO₃SOH₄C₂HNO₂S—⟨phenyl⟩— | E-1 | 3 | navy |
| 165 | E-1 | —⟨phenyl⟩—SO₂NHC₂H₄OSO₃H | 3 | navy |
| 166 | HO₃S—CH₂ and ClC₂H₄O₂S— on ⟨phenyl⟩— | E-1 | 3 | navy |

EXAMPLE 167

8.7 g of sulfanilic acid were diazotized in 250 ml of water with hydrochloric acid. A suspension of 13.7 g of 1-amino-8-hydroxynaphthalene-3,6-disulfonic acid in 100 ml of water was added dropwise, and the mixture was stirred at room temperature and pH 1.5 for 12 hours. It was then cooled down 10° C. and admixed with a diazo component obtained by hydrochloric acid diazotization of 55.4 g of the secondary condensation product of 4-(2chloroprop-2-enylsulfonyl)aniline, cyanuric chloride and 1,3-phenylenediamine-4-sulfonic acid in 750 ml of water.

The reaction was then completed overnight at pH 5.5–6 by addition of sodium bicarbonate. The dye was salted out with 200 g of sodium chloride and dried. It has the formula

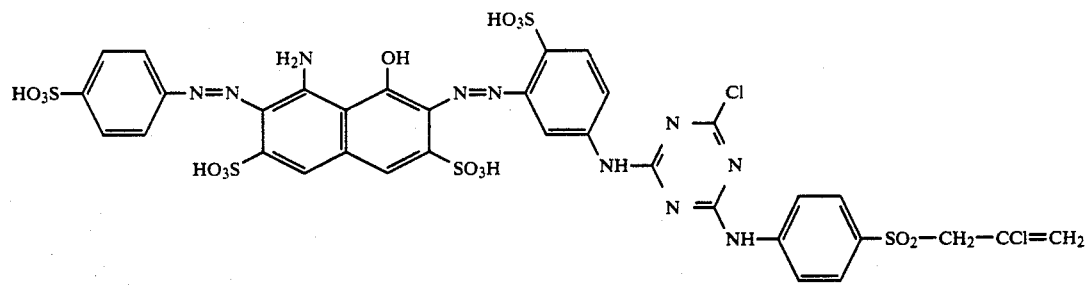

and dyes cotton in a fast navy shade.

EXAMPLE 168

EXAMPLE 167 was repeated, except that 1-amino-8-hydroxynaphthalene-3,6-disulfonic acid was replaced by 1-amino-8-hydroxynaphthalene-4,6-disulfonic acid, affording a dye having similar properties.

Table 7 contains further examples of dyes obtained similarly to Example 167.

TABLE 7

Structure: D¹—N=N— on naphthalene with OH, NH₂, HO₃S, SO₃H substituents (positions 3 and 4), —N=N—D²—C linked to triazine ring bearing N—E, N—R, and X substituent.

| Example No. | D¹ | R | Position 3 or 4 | D² | X | E | Hue on cotton |
|---|---|---|---|---|---|---|---|
| 169 | 4-(HO₃S)C₆H₄— | H | 3 | 4-(HO₃S)-3-(—NH—)C₆H₃— | F | E-1 | navy |
| 170 | 2-methyl-1,5-disulfonaphth-... (naphthalene with 1-SO₃H, 5-SO₃H, 2-CH₃ substitution) | H | 3 | 4-(HO₃S)-3-(—NH—)C₆H₃— | Cl | E-1 | navy |
| 171 | CH₂=CH—CH₂—SO₂—C₆H₄— | H | 4 | 4-(HO₃S)-3-(—NH—)C₆H₃— | Cl | E-1 | navy |
| 172 | HO₃SO—CH₂CH₂—SO₂—C₆H₄— | H | 3 | 4-(HO₃S)-3-(—NH—)C₆H₃— | Cl | E-3 | navy |
| 173 | HO₃SO—CH₂CH₂—SO₂—C₆H₄— | H | 3 | 4-(HO₃S)-3-(—NH—)C₆H₃— | Cl | E-4 | navy |
| 174 | 2-(HO₃SH₂C)-5-(Cl—CH₂CH₂—SO₂)C₆H₃— | H | 3 | 4-(HO₃S)-3-(—NH—)C₆H₃— | Cl | E-1 | navy |
| 175 | 2-(HO₃SH₂C)-5-(Cl—CH₂CH₂—SO₂)C₆H₃— | CH₃ | 3 | 4-(HO₃S)-3-(—NH—)C₆H₃— | Cl | E-1 | navy |

TABLE 7-continued

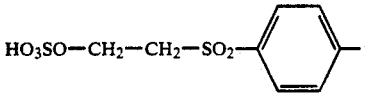

| Example No. | D¹ | R | Position 3 or 4 | D² | X | E | Hue on cotton |
|---|---|---|---|---|---|---|---|
| 176 | HO₃SO—CH₂—CH₂—SO₂—C₆H₄— | H | 3 | HO₃S-C₆H₃(-NH—) | Cl | E-1 | navy |
| 177 | (3,4-dichloro-6-oxo-pyridazinyl)-N-C₆H₄-C(O)NH-C₆H₃(SO₃H)— | H | 3 | HO₃S-C₆H₃(-NH—) | Cl | E-1 | navy |
| 178 | CH₃—O₂S—NH-C₆H₃(SO₃H)— | H | 3 | HO₃S-C₆H₃(-NH—) | Cl | E-1 | navy |
| 179 | HO₂C-C₆H₄— | H | 3 | HO₃S-C₆H₃(-NH—) | Cl | E-1 | navy |
| 180 | 2-HO₃S-C₆H₄— | H | 3 | HO₃S-C₆H₃(-NH—) | Cl | E-1 | navy |
| 181 | 3-HO₃S-C₆H₄— | H | 3 | HO₃S-C₆H₃(-NH—) | Cl | E-1 | navy |

EXAMPLE 182

To the solution of 28.2 g of the diazotized secondary condensation product of 1,3-phenylenediamine-4-sulfonic acid, cyanuric chloride and 4-(2-chloroprop-2-enylsulfonyl)aniline in 750 ml of water was added at from 0° to 5° C. 15.9 g of 1-amino-8-hydroxynaphthalene-3,6-disulfonic acid, suspended in 100 ml of water. A pH of 2.5-3 was maintained with sodium formate. The mixture was stirred at room temperature for 12 hours and then admixed at 10° C. with the hydrochloric diazotization product of 8.7 g of aniline-4-sulfonic acid, dissolved in 200 ml of water, and the pH was maintained at from 6 to 6.5 with sodium bicarbonate. The dye was salted out with sodium chloride. It has the formula

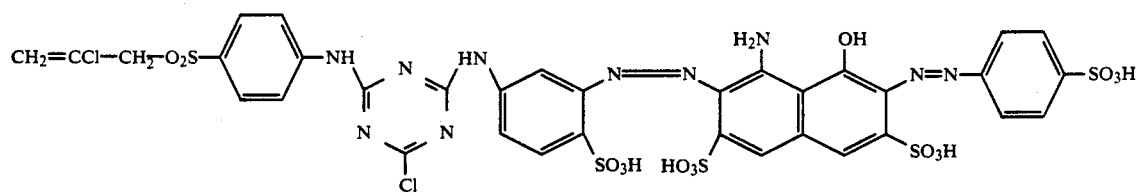
The dyes listed in Table 8 are obtained in a similar manner.
TABLE 8
| Example no. | E | X | D¹ | Position 3/4 | D² | R | Hue on cotton |
|---|---|---|---|---|---|---|---|
| 183 | E-1 | Cl | –NH–C₆H₃(SO₃H)– | 3 | –C₆H₃(SO₃H)–NH–C(=N)–N=C(Cl)–N=C–NH–(E-1) (triazine) | H | navy blue |
| 184 | E-1 | Cl | –NH–C₆H₃(SO₃H)– | 3 | –C₆H₄(SO₃H) | H | navy blue |
| 185 | E-1 | Cl | –NH–C₆H₃(SO₃H)– | 3 | –C₆H₄(SO₃H) | CH₃ | navy blue |
| 186 | E-1 | Cl | –NH–C₆H₃(SO₃H)– | 4 | –C₆H₄(SO₃H) | H | navy blue |
| 187 | E-2 | Cl | –NH–C₆H₃(SO₃H)– | 3 | –C₆H₃(SO₃H)–NH–C(=N)–N=C(Cl)–N=C–NH–(E-2) (triazine) | H | navy blue |

TABLE 8-continued

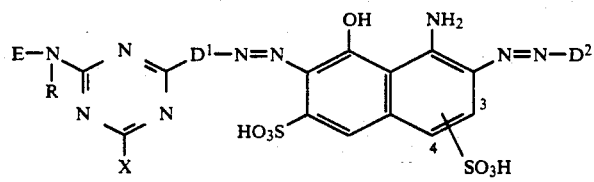

| Example no. | E | X | D¹ | Position 3/4 | D² | R | Hue on cotton |
|---|---|---|---|---|---|---|---|
| 188 | E-1 | Cl | 2-methyl-4-amino-benzenesulfonic acid (SO₃H, -NH) | 3 | bis-anilino triazine with Cl, one ring -SO₂C₂H₄OSO₃H | H | navy blue |
| 189 | E-1 | Cl | 2-methyl-4-amino-benzenesulfonic acid | 4 | -C₆H₄-SO₃H | H | navy blue |
| 190 | E-1 | Cl | 2-methyl-4-amino-benzenesulfonic acid | 3 | -C₆H₄-SO₂-CH₂-CH=CH₂ | H | navy blue |
| 191 | E-1 | Cl | 2-methyl-4-amino-benzenesulfonic acid | 4 | -C₆H₄-SO₂-C₂H₄-OSO₃H | H | navy blue |
| 192 | E-1 | Cl | 2-methyl-4-amino-benzenesulfonic acid | 3 | -C₆H₃(CH₂SO₃H)-SO₂-C₂H₄-Cl | H | navy blue |

EXAMPLE 193

38.6 g of the known dye of the formula

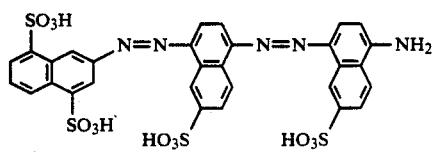

were introduced at pH 7 in 400 ml of water at 40° C. and admixed with 21.4 g of the primary condensation product of cyanuric chloride and 4-(2-chloroprop-2-enylsulfonyl)aniline prepared as descried in Example 51 in 500 ml of water. The mixture was stirred at 40° C. and pH 5-6 until there were no longer any free amino groups detectable by thin layer chromatography. The dye obtained on salting out with potassium chloride conforms to the formula

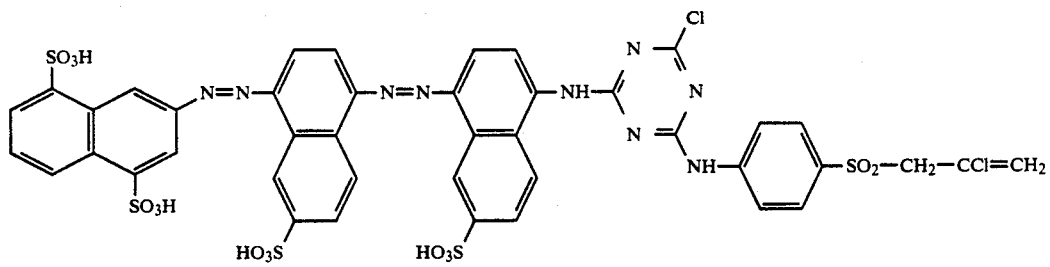

and dyes cotton in a reddish brown shade.

Table 9 contains dyes obtained in a similar manner.

TABLE 9

D—N=N—K$^1$—N=N—K$^2$—NH–[triazine with N–E/R substituent and X]

| Ex. No. | D | K$^1$ | K$^2$ | R | X | E | Hue on cotton |
|---|---|---|---|---|---|---|---|
| 194 | 2,5-disulfophenyl (SO$_3$H, HO$_3$S) | 6-sulfo-naphthylene (HO$_3$S) | 6-sulfo-naphthylene (HO$_3$S) | H | Cl | E-1 | reddish brown |
| 195 | 2,5-disulfophenyl | 6-sulfo-naphthylene (HO$_3$S) | 5-sulfo-naphthylene (SO$_3$H) | H | Cl | E-1 | reddish brown |
| 196 | trisulfo-naphthyl (SO$_3$H, HO$_3$S, SO$_3$H) | naphthylene | 5-sulfo-naphthylene (SO$_3$H) | H | Cl | E-1 | reddish brown |
| 197 | trisulfo-naphthyl (SO$_3$H, HO$_3$S, SO$_3$H) | 2,5-dimethylphenyl (CH$_3$, H$_3$C) | 6-sulfo-naphthylene (HO$_3$S) | H | Cl | E-1 | yellowish brown |

TABLE 9-continued $$D-N=N-K^1-N=N-K^2-NH-C(=N)-N=C(N)-N=C(X)-N=C-N(R)-E$$

| Ex. No. | D | K¹ | K² | R | X | E | Hue on cotton |
|---|---|---|---|---|---|---|---|
| 198 | 1,5-naphthalene-disulfonic acid (3-methyl) | 2,5-dimethyl phenyl | naphthyl-SO₃H | H | Cl | E-2 | yellowish brown |
| 199 | 1,5-naphthalene-disulfonic acid (3-methyl) | 2,5-dimethyl phenyl | naphthyl-SO₃H | CH₃ | Cl | E-1 | yellowish brown |
| 200 | naphthalene-1,3,5-trisulfonic acid (7-methyl) | naphthyl-SO₃H | 2,5-dimethyl phenyl | H | F | E-1 | yellowish brown |
| 201 | naphthalene-1,3,5-trisulfonic acid (7-methyl) | naphthyl | naphthyl-SO₃H | H | Cl | E-1 | reddish brown |
| 202 | E-1 | naphthyl-SO₃H | naphthyl-SO₃H | H | Cl | 2-methyl-4-sulfophenyl | reddish brown |
| 203 | 2-methyl-4-sulfophenyl | naphthyl-SO₃H | naphthyl-SO₃H | H | Cl | E-1 | reddish brown |

TABLE 9-continued

D—N=N—K¹—N=N—K²—NH—C(=N)—N=C(X)—N=C(NRE)
(schematic triazine structure as shown)

| Ex. No. | D | K¹ | K² | R | X | E | Hue on cotton |
|---|---|---|---|---|---|---|---|
| 204 | 1-SO₃H, 3-HO₃S, 7-methyl naphthalene | 2,6-naphthalene (HO₃S) | 2,6-naphthalene (HO₃S) | H | Cl | E-1 | reddish brown |
| 205 | 2-SO₃H, 4-CH₃SO₂NH phenyl | 2,6-naphthalene (HO₃S) | 2,6-naphthalene (HO₃S) | H | Cl | E-1 | reddish brown |

EXAMPLE 206

43.4 g of 88% strength 1-amino-4-bromoanthraquinone-2-sulfonic acid, 29.5 g of the hydrochloride of the formula

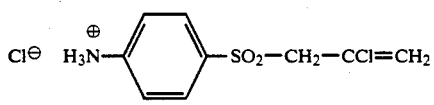

1.5 g of copper powder, 0.75 g of cupric sulfate and 50.4 of sodium bicarbonate were heated at from 65° to 70° C. for 48 hours. After the reaction had ended (thin layer chromatography), the mixture was filtered hot and the filtrate was adjusted to pH 1 with concentrated hydrochloric acid. The oily residue was crystallized at from 0° to 5° C. by stirring with 100 ml of ethanol, and the crystalline product was isolated, washed with ethanol and dried. It amounted to 45 g of a compound of the formula

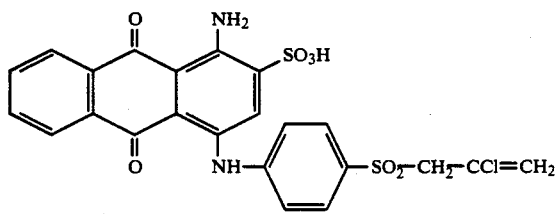

The compounds of the formula

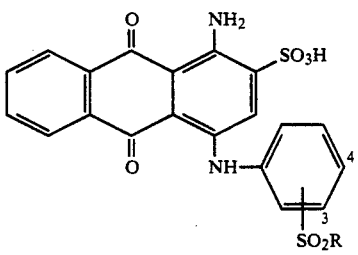

listed in Table 10 are obtained in a similar manner

TABLE 10

| Example No. | R | Position |
|---|---|---|
| 207 | CH₂—CBr=CH₂ | 4 |
| 208 | CH₂—CCl=CH₂ | 3 |

EXAMPLE 209

24.1 g of 1-amino-4-(3-amino-4-hydroxysulfonylphenylamino)-2-hydroxysulfonylanthraquinone were stirred into 1,000 ml of water and a pH of 6.5 was set with sodium hydroxide solution. To this solution was added at from 0° to 5° C. a suspension of 9.2 g of cyanuric chloride in 100 g of ice-water. The mixture was stirred at from 0° to 5° C. and pH 6 until the reaction had ended, which took about 2 hours.

After the addition of 16.9 g of 4-(2-chloroprop-2-enylsulfonyl)aniline hydrochloride, the temperature was raised to 40° C. and the mixture was stirred at that temperature for 2 hours.

After cooling down to room temperature, the dye was precipitated with 150 g of sodium chloride, filtered off with suction and dried.

It dyes cotton in a blue shade having good fastness properties and conforms to the formula

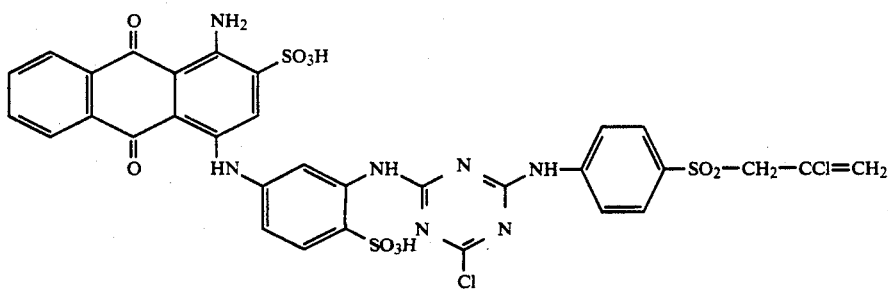

($\lambda_{max}$: 604 nm)

A dye having similar properties is obtained on replacing the 4-(2-chloroprop-2-enylsulfonyl)aniline hydrochloride by 16.1 g of 3-(2-chloroprop-2-enylsulfonyl)aniline hydrochloride.

Said dye conforms to the formula

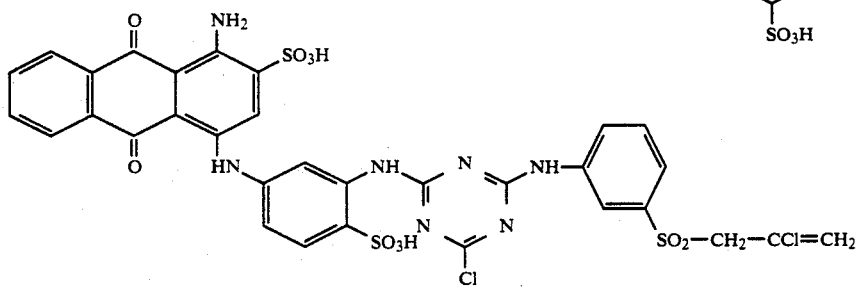

($\lambda_{max}$: 604 nm)

The compounds of the formula

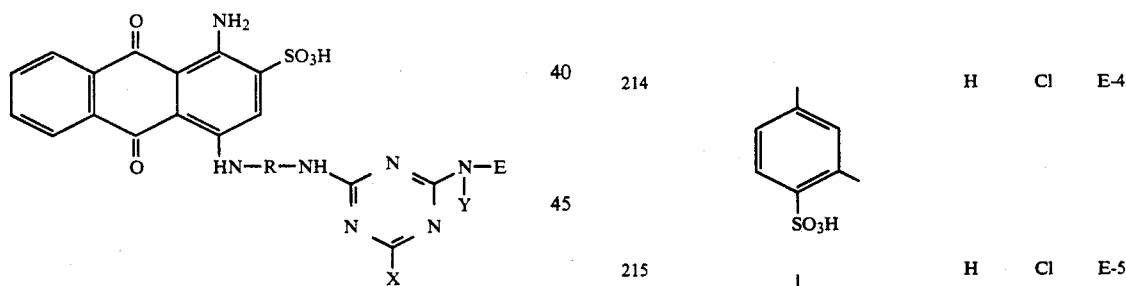

listed below in Table 11 are obtained in a similar manner.

TABLE 11

| Ex. No. | R | Y | X | E |
|---------|---|---|---|---|
| 211 |  | H | Cl | E-2 |
| 212 |  | H | F | E-1 |
| 213 |  | H | F | E-3 |
| 214 |  | H | Cl | E-4 |
| 215 | 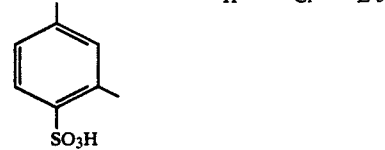 | H | Cl | E-5 |
| 216 | 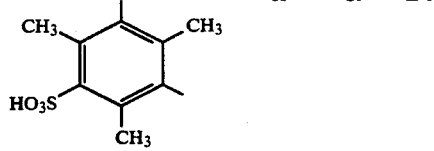 | H | Cl | E-1 |
| 217 | 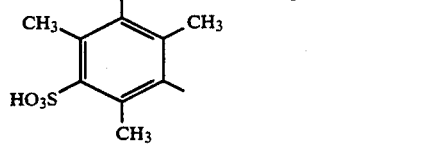 | CH$_3$ | Cl | E-1 |

TABLE 11-continued

| Ex. No. | R | Y | X | E |
|---|---|---|---|---|
| 218 | 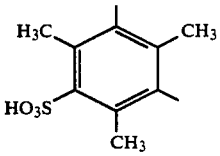 | H | F | E-3 |
| 219 | 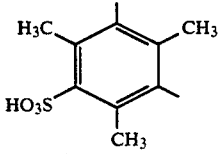 | H | Cl | E-2 |

EXAMPLE 220

64.8 g of the known chromophore of the formula

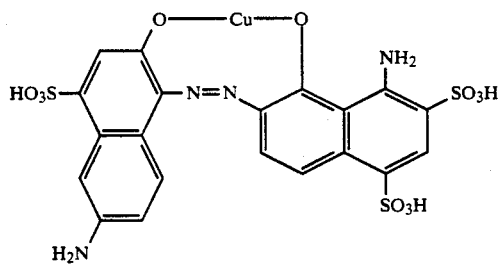

were suspended in 700 ml of water. 17.6 g of the primary condensation product of cyanuric chloride and 4-(2-chloroprop-2-enylsulfonyl)aniline described in Example 51 were added dissolved in 600 of water at pH 5.5–6 and 40° C. over 2 hours and the mixture was held at pH 5.5–6 and 40°–45° C. for a further 30 minutes. After the reaction had ended, the dye was salted out with sodium chloride, filtered off and dried under reduced pressure. It conforms to the formula

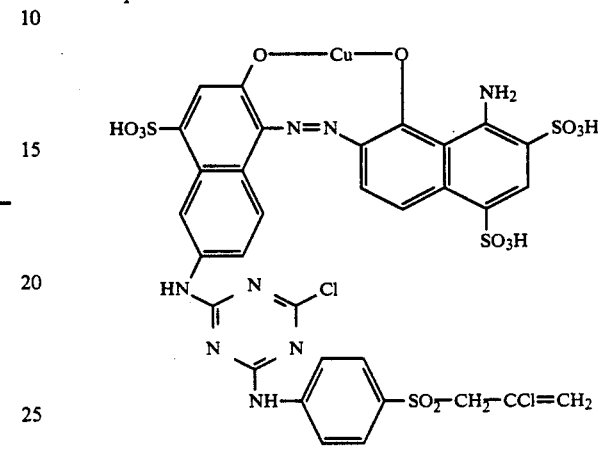

and dyes cotton in a fast blue shade.

Using the method of Example 220 it is possible, starting from known chromophores, to synthesize the following copper and nickel phthalocyanine and copper formazan dyes:

TABLE 12

| Example No. | Dye | Hue on cotton |
|---|---|---|
| 221 | 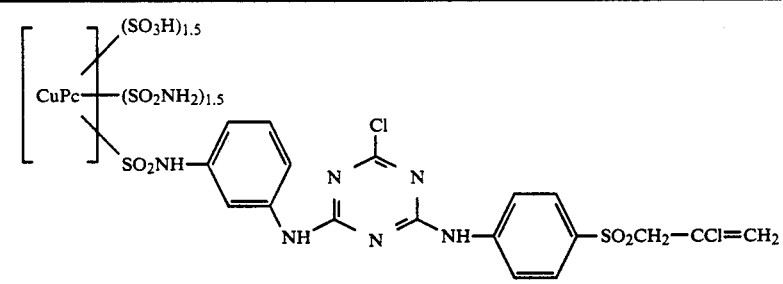 | greenish blue |
| 222 | 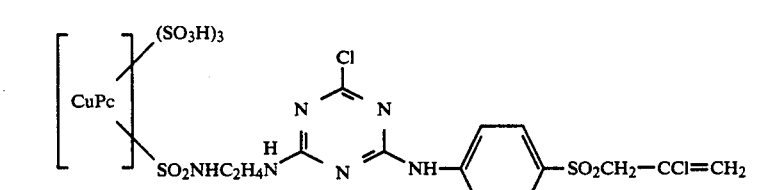 | greenish blue |
| 223 | 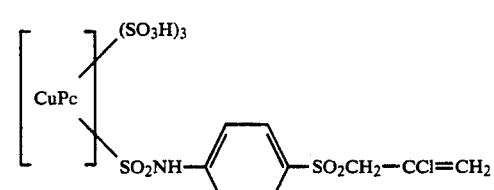 | greenish blue |

TABLE 12-continued

| Example No. | Dye | Hue on cotton |
|---|---|---|
| 224 | [NiPc—(SO$_3$H / SO$_2$NH$_2$)]$_{\sim 2.8}$ —SO$_2$NH—(m-C$_6$H$_4$)—NH—(4-Cl-triazinyl)—NH—(m-C$_6$H$_4$)—SO$_2$CH$_2$—CCl=CH$_2$ | greenish blue |
| 225 | [CuPc—((SO$_3$H)$_{1.5}$ / (SO$_2$NH$_2$)$_{1.5}$)]—SO$_2$NH—(m-C$_6$H$_4$)—NH—(4-Cl-triazinyl)—N(CH$_3$)—(p-C$_6$H$_4$)—SO$_2$CH$_2$—CCl=CH$_2$ | greenish blue |
| 226 | H$_2$C=CCl—CH$_2$—O$_2$S—(C$_6$H$_4$)—NH—(4-Cl-triazinyl)—NH—[Cu-formazan complex with SO$_3$H groups and phenyl, carboxy-sulfo-phenyl substituents] | blue |
| 227 | H$_2$C=CCl—H$_2$C—O$_2$S—(C$_6$H$_4$)—NH—(4-Cl-triazinyl)—NH—[Cu-formazan complex with SO$_3$H groups and phenyl, carboxy-sulfo-phenyl substituents] | blue |

TABLE 12-continued

| Example No. | Dye | Hue on cotton |
|---|---|---|
| 228 | 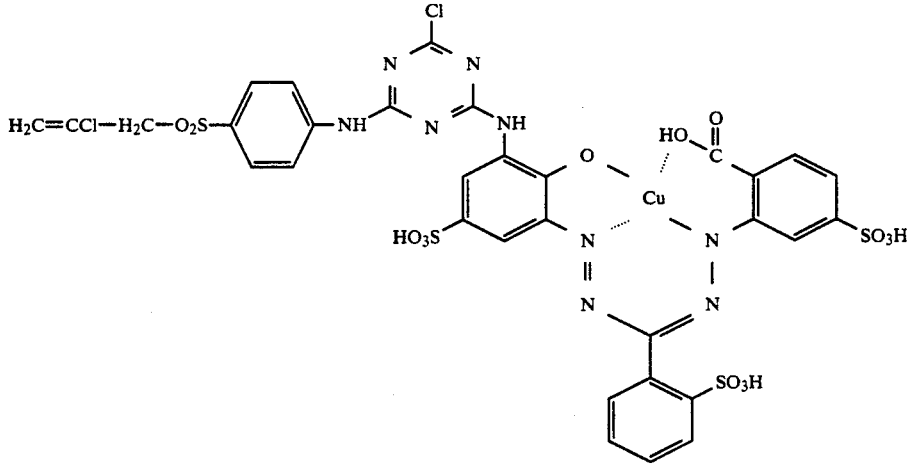 | blue |
| 229 | 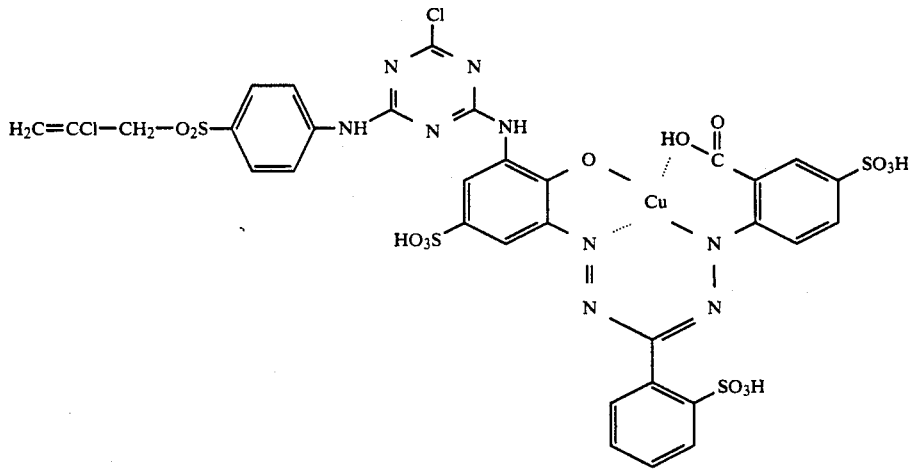 | blue |

EXAMPLE 230

19.1 g of the compound of the formula

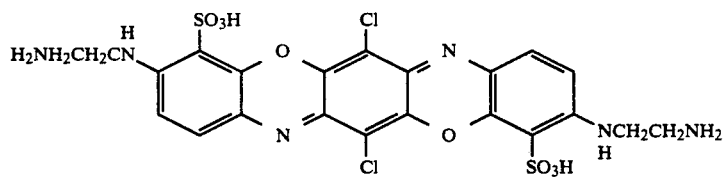

were stirred into 1,000 g of water and adjusted to pH 10 with sodium hydroxide solution. This solution was added dropwise to a 40°–50° C. solution adjusted to pH 6–8 of the condensation product of 11. 1 g of cyanuric chloride with 16.4 g of 4-(2-chloroprop-2-enylsulfonyl-)aniline hydrochloride. The mixture was stirred at a pH maintained at from 6.5 to 7 at 60° C. until the reaction had ended, which took about 2 hours. After cooling down to room temperature, the dye was salted out with 500 g of sodium chloride, filtered off with suction and dried. It dyes cotton in a brilliant blue shade having good fastness properties and conforms to the formula

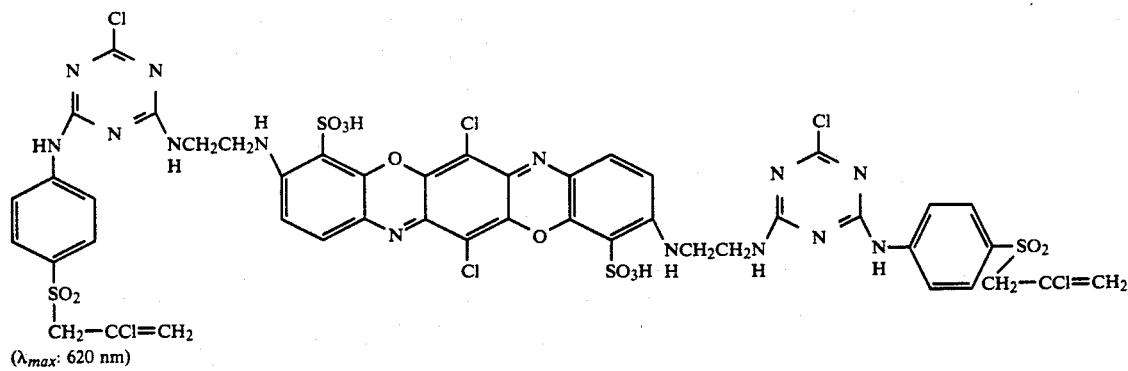
($\lambda_{max}$: 620 nm)
Further dyes which are obtained in a similar manner are listed in Table 13.
TABLE 13
| Example No. | Y | R | E | Hue on cotton |
|---|---|---|---|---|
| 231 | HN-CH(CH₃)-CH₂-NH | Cl | E-1 | blue |
| 232 | HN-CH₂CH₂-NH | F | E-1 | blue |
| 233 | HN-(CH₂)₃-NH | Cl | E-1 | blue |
| 234 | HN-C₆H₄-NH | Cl | E-1 | blue |
| 235 | O-CH₂CH₂-NH | Cl | E-1 | red |
| 236 | O-C₆H₄-NH | Cl | E-1 | red |
| 237 | HN-CH₂CH₂-NH | Cl | E-2 | blue |
| 238 | HN-CH₂CH₂-NH | F | E-2 | blue |
| 239 | HN-CH(CH₃)-CH₂-NH | Cl | E-2 | blue |
| 240 | HN-(CH₂)₃-NH | Cl | E-2 | blue |
| 241 | HN-C₆H₄-NH | Cl | E-2 | blue |
| 242 | O-CH₂CH₂-NH | Cl | E-2 | red |

TABLE 13-continued

| Example No. | Y | R | E | Hue on cotton |
|---|---|---|---|---|
| 243 | O-C6H4-NH (para) | Cl | E-2 | red |
| 244 | HN-CH2CH2-NH | Cl | E-3 | blue |
| 245 | HN-CH2CH2-NH | F | E-3 | blue |
| 246 | HN-CH2-CH(CH3)-NH | Cl | E-3 | blue |
| 247 | HN-CH2CH2CH2-NH | Cl | E-3 | blue |
| 248 | HN-C6H4-NH | Cl | E-3 | blue |
| 249 | O-CH2CH2-NH | Cl | E-3 | red |
| 250 | O-C6H4-NH | Cl | E-3 | red |
| 251 | HN-CH2CH2-NH | Cl | E-4 | blue |
| 252 | HN-CH2CH2-NH | F | E-4 | blue |
| 253 | HN-CH2-CH(CH3)-NH | Cl | E-4 | blue |
| 254 | HN-CH2CH2CH2-NH | Cl | E-4 | blue |
| 255 | HN-C6H4-NH | Cl | E-4 | blue |
| 256 | O-CH2CH2-NH | Cl | E-4 | red |
| 257 | O-C6H4-NH | Cl | E-4 | red |

EXAMPLE 258

11.6 g of 4-(prop-2-ynylsulfonyl)aniline hydrochloride ml of water were diazotized at from 0° to 5° C. with hydrochloric acid and admixed with a neutral aqueous solution pb 24.1 g of 1-hydroxynaphthalene-3,6-disulfonic acid. Saturated sodium acetate solution were added to adjust the pH to 4.5. After the coupling had ended, the dye was salted out with sodium chloride and freeze dried. It dyes cotton in a soft orange shade and conforms to formula

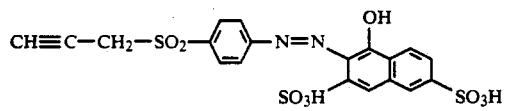

($\lambda_{max}$: 483 nm)

Further dyes according to the present invention which are obtained in a similar manner are listed in Table 14:

TABLE 14

E—N=N—K

| Example No. | E | K | Hue on cotton |
|---|---|---|---|
| 259 | E-6 | (pyridone with CH$_3$, CH$_2$SO$_3$H, OH, =O, N-C$_2$H$_5$) | greenish yellow |
| 260 | E-6 | (pyridone with CH$_3$, CONH$_2$, OH, =O, N-C$_2$H$_5$) | greenish yellow |
| 261 | E-6 | (pyridone with CH$_3$, OH, =O, N-CH$_3$) | greenish yellow |
| 262 | E-6 | (pyrazole with H$_3$C, CH$_3$, HO, N-N-aryl-CH$_3$, SO$_3$H) | yellow |
| 263 | E-6 | (pyrazole with HO$_2$C, HO, N-N-aryl-SO$_3$H) | yellow |
| 264 | E-6 | (benzene with SO$_3$H, NH$_2$, NH—CO—CH$_3$) | yellowish orange |
| 265 | E-7 | (benzene with SO$_3$H, NH$_2$, NH—CO—NH$_2$) | yellowish orange |

TABLE 14-continued $$E-N=N-K$$

| Example No. | E | K | Hue on cotton |
|---|---|---|---|
| 266 | E-6 | 2-amino-5-ureido-4-methylbenzenesulfonic acid (SO$_3$H, NH$_2$, NH—CO—NH$_2$ substituents) | yellowish orange |
| 267 | E-8 | 2-amino-5-acetamido-4-methylbenzenesulfonic acid (SO$_3$H, NH$_2$, NH—CO—CH$_3$ substituents) | yellowish orange |
| 268 | E-7 | 1-hydroxy-2-methyl-naphthalene-3,6-disulfonic acid (HO, HO$_3$S, SO$_3$H) | orange |
| 269 | E-6 | 1-hydroxy-2-methyl-naphthalene-5,8-disulfonic acid (HO, SO$_3$H, SO$_3$H) | orange |
| 270 | E-6 | 1-hydroxy-2-methyl-naphthalene-6,8-disulfonic acid (HO, SO$_3$H, HO$_3$S) | orange |
| 271 | E-7 | 1-hydroxy-2-methyl-naphthalene-4-sulfonic acid (HO, SO$_3$H) | reddish orange |
| 272 | E-6 | phenylenediamine derivative, NH—CONHC$_2$H$_4$SO$_2$C$_2$H$_4$OSO$_3$H, NH$_2$, CH$_3$ | goldgelb |
| 273 | E-6 | 1-hydroxy-2-methyl-naphthalene-4-sulfonic acid (HO, SO$_3$H) | reddish orange |
| 274 | E-6 | dihydroxy-pyrimidine derivative (HO, N, OH, N, HO) | greenish yellow |

TABLE 14-continued

E—N=N—K

| Example No. | E | K | Hue on cotton |
|---|---|---|---|
| 275 | E-7 | (H2N, N, morpholine, HO, N structure) | yellow |
| 276 | E-6 | (CO2H, HO, N, OH pyridine structure) | greenish yellow |
| 277 | E-6 | (H2N, naphthalene, SO3H, HO3S) | reddish orange |
| 278 | E-6 | (methyl, Cl, —N(C2H4OSO3H)2 phenyl) | orange |
| 279 | E-6 | (methyl, Cl, —N(C2H4SO2C2H4OSO3H)2 phenyl) | orange |

EXAMPLE 280

11.6 g of 4-(prop-2-ynylsulfonyl)aniline hydrochloride in 150 ml of water were diazotized at from 0° to 5° C. with hydrochloric acid and admixed with a neutral aqueous solution of 16.2 g of 1-acetylamino-8-hydroxynaphthalene-3,6-disulfonic acid. The coupling was completed at pH 4.5 with saturated sodium acetate solution and the dye formed was precipitated with saturated sodium chloride solution and freeze dried. It dyes cotton in a brilliant red shade having good fastness properties and conforms to the formula

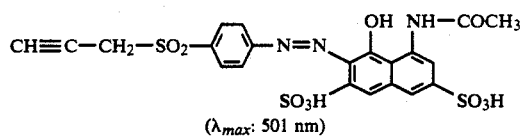

($\lambda_{max}$: 501 nm)

Further dyes which are obtained in a similar manner are listed in Table 15.

TABLE 15

E—N=N—K

| Example No. | E | K | Hue on cotton |
|---|---|---|---|
| 281 | E-10 | (HO, NH—COCH3, naphthalene, HO3S, SO3H) | red |

TABLE 15-continued $$E-N=N-K$$

| Example No. | E | K | Hue on cotton |
|---|---|---|---|
| 282 | E-6 | 4-benzamido-5-hydroxy-6-methyl-naphthalene-3,7-disulfonic acid coupler (HO, NH—COC$_6$H$_5$, HO$_3$S, SO$_3$H, methyl) | red |
| 283 | E-6 | 4-(phenylureido)-5-hydroxy-6-methyl-naphthalene-3,7-disulfonic acid (HO, NH—CO—NH—C$_6$H$_5$, HO$_3$S, SO$_3$H, methyl) | bluish red |
| 284 | E-6 | 4-(chloroacetamido)-5-hydroxy-6-methyl-naphthalene-3,7-disulfonic acid (HO, NH—CO—CH$_2$—Cl, HO$_3$S, SO$_3$H) | red |
| 285 | E-6 | (HO, NH—CO—C$_2$H$_4$—SO$_2$—CH=CH$_2$, HO$_3$S, SO$_3$H) | red |
| 286 | E-7 | (HO, NH—CO—C$_2$H$_5$, HO$_3$S, SO$_3$H) | red |
| 287 | E-6 | (HO, HO$_3$S, NH—CO—CH$_2$—CH$_2$—Cl) | orange |
| 288 | E-7 | (HO, HO$_3$S, NH—COCH$_3$) | orange |
| 289 | E-10 | (HO, HO$_3$S, SO$_3$H) | orange |

EXAMPLE 290

A solution of 11.6 g of 4-(prop-2-ynylsulfonyl)aniline hydrochloride in 150 ml of water was diazotized at from 0° to 5° C. with hydrochloric acid and then admixed with a solution of 23.4 g of the condensation product of 1-amino-8-hydroxynaphthalene-3,6-disulfonic acid and cyanuric chloride in 380 ml of water. To complete the coupling, the pH was adjusted to 4.5 with saturated sodium acetate solution. An aqueous solution of 12.5 g of 4-(2-sulfatoethylsulfonyl)aniline, adjusted to pH 4.5, was added and the mixture was heated at from 40° to 45° C. for 5 hours. The dye formed was salted out with sodium chloride and freeze dried. It dyes cotton in a bluish red shade having good fastness properties and has the formula

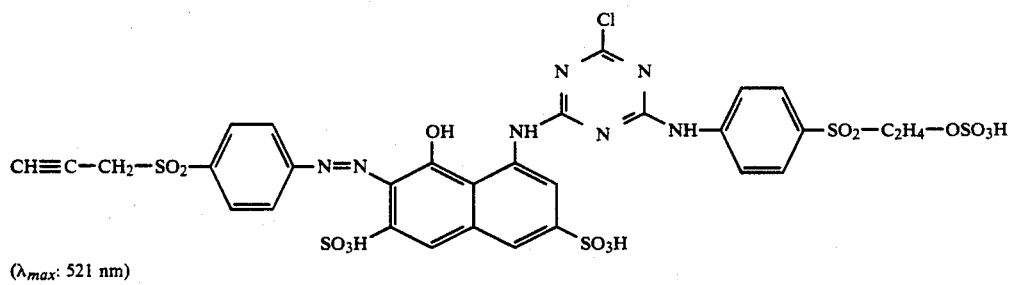

(λ$_{max}$: 521 nm)

Further dyes of the present invention which are obtained in a similar manner are listed in Table 16.

TABLE 16

E—N=N—K, with triazine ring bearing X and R

| Example No. | E | K | X | R | Hue on cotton |
|---|---|---|---|---|---|
| 291 | E-6 | 8-amino-1-hydroxy-naphthalene-3,6-disulfonic acid, methyl | Cl | OCH$_3$ | red |
| 292 | E-6 | 8-amino-1-hydroxy-naphthalene-3,6-disulfonic acid, methyl | Cl | NH-phenyl-SO$_3$H (meta) | red |
| 293 | E-8 | 8-amino-1-hydroxy-naphthalene-3,6-disulfonic acid, methyl | Cl | N(C$_2$H$_5$)-phenyl | red |
| 294 | E-6 | 6-amino-1-hydroxy-naphthalene-3-sulfonic acid, methyl | Cl | NH-phenyl-SO$_3$H (meta) | orange |
| 295 | E-6 | HO$_2$C-pyrazolone coupled to 2,4-diamino-benzenesulfonic acid | Cl | NH-phenyl-SO$_3$H (meta) | yellow |
| 296 | E-7 | HO$_2$C-pyrazolone coupled to 3-amino-phenyl | Cl | NH-phenyl-SO$_3$H (meta) | yellow |

TABLE 16-continued $$E-N=N-K \quad \text{(triazine with X, R substituents)}$$

| Example No. | E | K | X | R | Hue on cotton |
|---|---|---|---|---|---|
| 297 | E-6 | HO₂C-C(=N-N-Ph-NH—)-C(CH₃)=C(OH)- (pyrazolone with m-NH-phenyl) | F | m-HN-C₆H₄-SO₃H | yellow |
| 298 | E-6 | 4-methyl-5-CH₃-3-CONH₂-6-OH-1-(CH₂CH₂CH₂NH—)-2-oxo-pyridine | Cl | m-HN-C₆H₄-SO₃H | greenish yellow |
| 299 | E-6 | 2-amino-4-NH—-5-methyl-benzene-SO₃H | Cl | p-HN-C₆H₄-SO₃H | yellowish orange |
| 300 | E-6 | 2-amino-4-NH—-5-methyl-benzene-SO₃H | F | p-HN-C₆H₄-SO₃H | yellowish orange |
| 301 | E-7 | 2-amino-4-NH—-5-methyl-benzene-SO₃H | Cl | m-HN-C₆H₄-SO₃H | yellowish orange |
| 302 | E-6 | 8-NH—-1-OH-2-methyl-3,6-disulfo-naphthalene | Cl | m-HN-C₆H₄-SO₂C₂H₄OSO₃H | red |
| 303 | E-8 | 8-NH—-1-OH-2-methyl-3,6-disulfo-naphthalene | Cl | p-HN-C₆H₄-SO₂C₂H₄OSO₃H | red |
| 304 | E-7 | 8-NH—-1-OH-2-methyl-3,6-disulfo-naphthalene | Cl | p-HN-C₆H₄-SO₂-CH₂-CH=CH₂ | red |

TABLE 16-continued

E—N=N—K⟨triazine⟩X with R

| Example No. | E | K | X | R | Hue on cotton |
|---|---|---|---|---|---|
| 305 | E-6 | ![K group: 8-amino-1-hydroxy-2-methyl-naphthalene-6-sulfonic acid with HO₃S substituent] (OH, NH—, HO₃S, SO₃H, methyl) | Cl | NH-phenyl with CH₂SO₃H and SO₂C₂H₄Cl | red |
| 306 | E-6 | (same as 305) OH, NH—, HO₃S, SO₃H, methyl | F | NHCH₂CH₂SO₂—CH=CH₂ | red |
| 307 | E-6 | HN—C₆H₄—NH₂ (m-phenylenediamine) | Cl | NH—C₆H₄—SO₂C₂H₄OSO₃H | yellowish orange |

EXAMPLE 308

A neutral solution of 24.3 g of 4-(prop-2-ynylsulfonyl)aniline hydrochloride in 400 ml of water and 100 ml of acetone was admixed with a suspension of 19.3 g of cyanuric chloride in 250 ml of ice-water, and the mixture was stirred at from 0° to 5° C. for 2.5 hours, during which the pH of from 5 to 6 was maintained with sodium bicarbonate. AFter filtration, the suspension was added to a solution of 16.9 g of 1,3-diaminobenzene-4-sulfonic acid in 100 ml of water being stirred at 40° C. and pH 5–6, and the mixture was maintained at from 35° to 40° and pH 3–4 for 2 hours.

After the reaction had ended, the product was diazotized at from 0° to 5° C. with 30 ml of 3.33N aqueous sodium nitrite solution and 60 ml of 5N hydrochloric acid and coupled onto 27.6 g of 1,4-dimethyl-3-hydroxysulfonylmethyl-6-hydroxypyrid-2-one. The dye obtained was salted out with sodium chloride and gently dried under reduced pressure. It dyes cotton in a brilliant, fast, greenish yellow shade and conforms to the formula

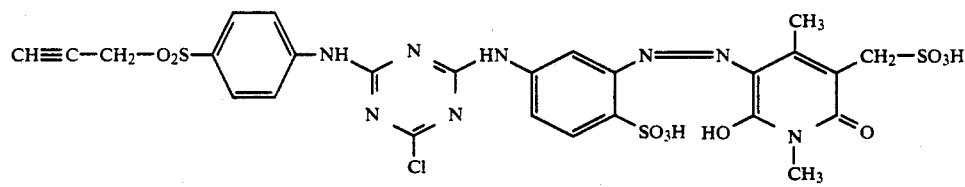

EXAMPLE 309

33 g of the sodium salt of the dye of formula

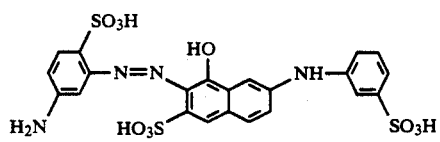

were dissolved in water at pH 6 and 40° C. and admixed with 17.1 g of the condensation product of cyanuric chloride and 4-(prop-2-ynylsulfonyl)aniline hydrochloride dissolved in 1,000 ml of water and the mixture was stirred at 40° C. for a further 2 hours during which the pH of from 5 to 6 was maintained with sodium bicarbonate. The dye was precipitated with potassium chloride and gently dried. It dyes cotton in a brown shade and conforms to the formula

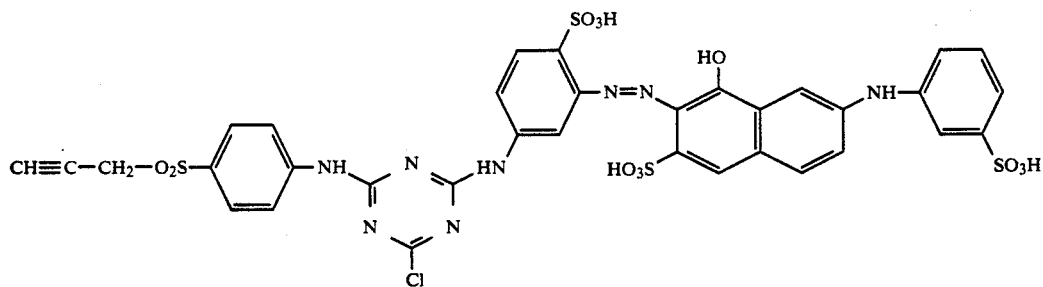

The dyes described in Table 17 are obtained in a similar manner.

TABLE 17

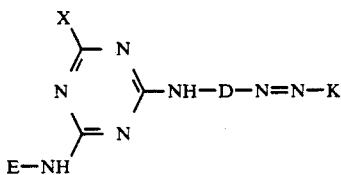

| Example No. | E | X | D | K | Hue on cotton |
|---|---|---|---|---|---|
| 310 | E-6 | Cl | 2,4-(SO₃H)-phenyl | 4-hydroxy-5-(NHCOC₆H₅)-3-methyl-7-SO₃H-naphthalene with SO₃H | red |
| 311 | E-6 | F | 2,4-(SO₃H)-phenyl | 4-hydroxy-5-(NHCOC₆H₅)-3-methyl-7-SO₃H-naphthalene with SO₃H | red |
| 312 | E-6 | Cl | 2,4-(SO₃H)-phenyl | 4-hydroxy-5-(NHCOCH₃)-3-methyl-6,8-(SO₃H)₂-naphthalene | red |
| 313 | E-7 | Cl | 2,4-(SO₃H)-phenyl | naphthalene substituted with OH, NH-triazine(Cl)-NH-phenyl-SO₂-C₂H₄OSO₃H, SO₃H, SO₃H | red |

TABLE 17-continued

| Example No. | E | X | D | K | Hue on cotton |
|---|---|---|---|---|---|
| 314 | E-6 | Cl | 2,4-dimethylbenzenesulfonic acid | 8-hydroxy-7-methyl-3,6-disulfonaphthyl-NH—(chlorotriazinyl)—NH-(2,5-disulfophenyl) | red |
| 315 | E-6 | Cl | 2,4-dimethylbenzenesulfonic acid | chlorotriazine with NH-(4-methyl-3-ureidophenyl) and NH-(4-(SO₂—C₂H₄OSO₃H)phenyl) | yellow |
| 316 | E-6 | Cl | 2,4-dimethylbenzenesulfonic acid | 8-hydroxy-7-methyl-3,6-disulfonaphthyl-NH—(chlorotriazinyl)—NH-(3-(SO₂—C₂H₄OSO₃H)phenyl) | red |
| 317 | E-7 | Cl | 2,4-dimethylbenzenesulfonic acid | pyrazolone (HO₂C, CH₃, OH) coupled to 2-chloro-5-sulfophenyl | yellow |
| 318 | E-8 | Cl | 2,4-dimethylbenzenesulfonic acid | pyrazolone (HO₂C, CH₃, OH) coupled to 2-methyl-4-sulfophenyl | yellow |
| 319 | E-10 | Cl | 2,4-dimethylbenzenesulfonic acid | pyrazolone (H₃C, CH₃, OH) coupled to 2,5-dichloro-4-sulfophenyl | yellow |

TABLE 17-continued
$$\begin{array}{c} X \\ | \\ \text{E—NH} \end{array} \underset{N}{\overset{N}{\bigtriangleup}} \text{NH—D—N}=\text{N—K}$$
| Example No. | E | X | D | K | Hue on cotton |
|---|---|---|---|---|---|
| 320 | E-6 | Cl | 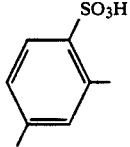 | 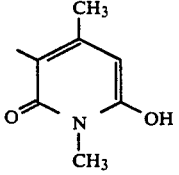 | greenish yellow |
| 321 | E-6 | Cl | 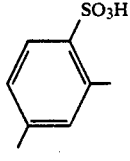 | 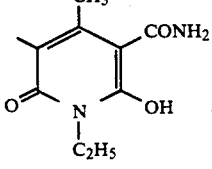 | greenish yellow |
| 322 | E-6 | Cl | 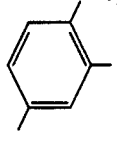 | 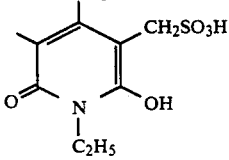 | greenish yellow |
| 323 | E-6 | Cl | 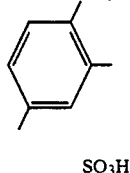 | 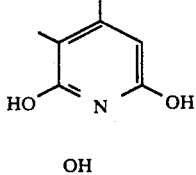 | greenish yellow |
| 324 | E-7 | Cl | 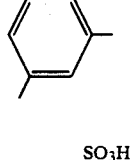 | 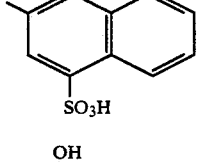 | reddish orange |
| 325 | E-6 | Cl | 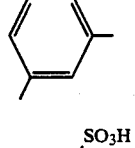 | 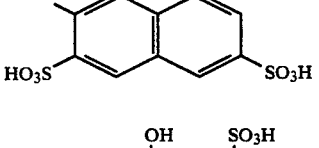 | orange |
| 326 | E-6 | F | 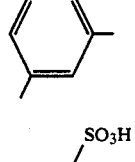 | 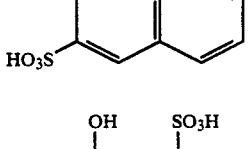 | orange |
| 327 | E-10 | Cl | 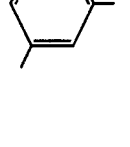 | 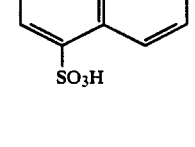 | reddish orange |

TABLE 17-continued

| Example No. | E | X | D | K | Hue on cotton |
|---|---|---|---|---|---|
| 328 | E-6 | Cl | 2-chloro-5-methyl benzenesulfonic acid (HO3S, Cl substituents) | 8-hydroxy-7-methyl-2-(phenylamino)naphthalene-6-sulfonic acid | brown |
| 329 | E-8 | Cl | 2,5-dimethylbenzenesulfonic acid | 7-[(4-carboxyphenyl)amino]-8-hydroxy-3-methylnaphthalene-6-sulfonic acid | brown |
| 330 | E-6 | Cl | 2,5-dimethylbenzene-1,4-disulfonic acid | 4-hydroxy-3-methylnaphthalene-1-sulfonic acid | reddish orange |
| 331 | E-6 | Cl | 2,5-dimethylbenzene-1,4-disulfonic acid | 1-(2-methyl-4-sulfophenyl)-3-methyl-5-hydroxy-pyrazole-4-carboxylic acid | yellowish orange |
| 332 | E-7 | Cl | 2,5-dimethylbenzenesulfonic acid | 1-(2-methyl-4-sulfophenyl)-3-methyl-5-hydroxy-pyrazole-4-carboxylic acid | yellowish orange |
| 333 | E-6 | Cl | 2,5-dimethylbenzenesulfonic acid | 5-hydroxy-6-methylnaphthalene-2,7-disulfonic acid | red |
| 334 | E-6 | Cl | 2,5-dimethylbenzenesulfonic acid | 4,6-dihydroxy-1-methyl-5-carbamoyl-3-methyl-pyridin-2(1H)-one | yellowish orange |
| 335 | E-7 | Cl | 2,5-dimethylbenzenesulfonic acid | 2,6-dihydroxy-4-methylpyridine-3-carboxylic acid | yellowish orange |

TABLE 17-continued

Structure:
$$E-NH-C(=N)-N=C(X)-N=C-NH-D-N=N-K$$ (triazine ring with E—NH, X, and NH—D—N=N—K substituents)

| Example No. | E | X | D | K | Hue on cotton |
|---|---|---|---|---|---|
| 336 | E-7 | Cl | 2,4-substituted benzene with SO₃H | 1-hydroxy-3-methyl-6-(NHCOCH₃)-7-SO₃H naphthalene | orange |
| 337 | E-8 | F | 2,4-substituted benzene with SO₃H | 1-hydroxy-3-methyl-6-(NHCOCH₃)-7-SO₃H naphthalene | orange |
| 338 | E-6 | Cl | 2,4-substituted benzene with SO₃H | 1-hydroxy-2-methyl-6-(NHCOCH₃)-7-SO₃H naphthalene (isomer) | orange |
| 339 | E-6 | Cl | 2,4-substituted benzene with SO₃H | 1-hydroxy-2-methyl-3-NH₂-6-(NH—CO—CH₂—CH₂—Cl) naphthalene | orange |
| 340 | E-9 | Cl | 2,5-substituted benzene with SO₃H | 1-hydroxy-3-methyl-6-(NHCOCH₃)-7-SO₃H naphthalene | red |
| 341 | E-7 | Cl | benzene with SO₃H and HO₃S (disulfo) | 1-hydroxy-3-methyl-6-(NHCOCH₃)-7-SO₃H naphthalene | red |
| 342 | E-6 | Cl | 2,4-substituted benzene with SO₃H | 1,4-dimethyl-3-CH₂SO₃H-6-hydroxy-2-oxo-N-methyl pyridone | greenish yellow |
| 343 | E-6 | Cl | naphthalene with SO₃H (1,5) and methyl (3,7) | 1-hydroxy-2-methyl-8-(NHCOCH₃)-3,6-disulfo naphthalene | bluish red |

TABLE 17-continued

General structure:

$$\text{E-NH}-\underset{N}{\overset{X}{\underset{\|}{\bigvee}}}-\text{NH}-D-N=N-K$$
(triazine with X, two NH groups to E and to D-N=N-K)

| Example No. | E | X | D | K | Hue on cotton |
|---|---|---|---|---|---|
| 344 | E-6 | Cl | 2,4-dimethylbenzene-SO₃H (SO₃H at position shown) | 8-hydroxy-7-methyl-3,6-disulfo-naphthalene with NH—CO—C₃H₆—SO₂—C₂H₄Cl at position 1 | bluish red |
| 345 | E-6 | Cl | 2,5-disulfobenzene (SO₃H, HO₃S) | 4-hydroxy-3-methyl-1-naphthalene-SO₃H | red |
| 346 | E-7 | Cl | benzene-SO₃H (dimethyl) | 8-hydroxy-6-sulfo-1-SO₃H-naphthalene | red |
| 347 | E-6 | Cl | benzene-SO₃H (dimethyl) | 8-hydroxy-1,5-disulfonaphthalene | red |

EXAMPLE 348

A neutral solution of 16.1 g of 1-amino-8-hydroxynaphthalene-3,6-disulfonic acid was admixed at 10° C. with a suspension 9.3 g of cyanuric chloride in 80 ml of ice-water while the pH was maintained at less than 2 with concentrated hydrochloric acid. This solution was added at from 0° to 5° C. to the hydrochloric acid diazotization product of 8.6 g of aniline-2-sulfonic acid in 100 ml of water. The coupling was completed at pH 4–4.5 with saturated sodium acetate solution. Then a solution of 11.6 g of 4-(prop-2-ynylsulfonyl)aniline hydrochloride in 200 ml of 1:1 v/v water/acetone, adjusted to pH 4.5, was then added, followed by 500 ml of water for dilution. To complete the reaction the mixture was heated at 40° to 50° C. for 45 hours, during which the pH was maintained at from 4 to 4.5 with sodium bicarbonate.

The dye formed dyes cotton in a fast brilliant red shade and has the structural formula

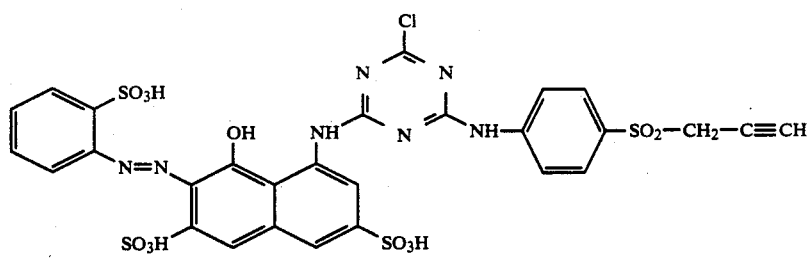

EXAMPLE 349

31.9 g (0.1 mol) of 1-amino-8-hydroxynaphthalene-3,6-disulfonic acid were dissolved in 150 g of water under neutral conditions and cooled down to 0°–5° C. At that temperature a suspension of 18.2 g (0.1 mol) of cyanuric cloride and 200 g of ice was added, and the mixture was stirred until the reaction had ended. Then 26.2 g (0.1 mol) of 2-methoxy-5-(prop-2-ynylsulfonyl) aniline hydrochloride, dissolved in 150 ml of 1:1 v/v water/acetone, were added, the pH was adjusted to 5.5–6 with 2N sodium hydroxide solution, and the temperature was raised to 20°-25° C. in the course of 2-3 hours.

After the reaction had ended, the reaction mixture was cooled down to 0°-10° C. and coupled to 17.3 g of diazotized aniline-2-sulfonic acid at pH 5.5. After the coupling had ended, the dye was isolated by salting out. It dyes cotton in a red shade and conforms to the formula for 1 hour. After cooling to 20° C., the dye obtained was salted out with sodium chloride and freeze dried. It dyes cotton in a fast brilliant red shade and conforms to the formula

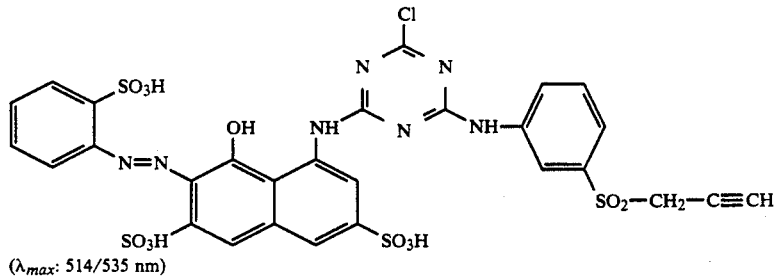

(λ$_{max}$: 514/535 nm)

EXAMPLE 351

32.8 g of the azo dye obtained by coupling diazotized 2-aminonaphthalene-3,6,8-trisulfonic acid with 3-aminophenylurea were dissolved in 150 ml of water under neutral conditions and admixed at from 15° to 20° C. with a suspension of 11.1 g of cyanuric chloride in 100 ml of ice water acidified with hydrochloric acid, and the pH was maintained at 7 with 20% strength by weight sodium hydroxide solution. After stirring at 20° C. for 1 hour, the mixture had added to it a solution of 11.7 g of 3-(prop-2-ynylsulfonyl)aniline hydrochloride in 200 ml of 1:1 v/v water/acetone and the pH was adjusted to 6.5 with 2N sodium hydroxide solution. To complete the reaction, the mixture was heated at 40° to 45° C. for 1.5 hours. The dye obtained was precipitated with potassium chloride and freeze dried. It dyes cotton in a yellowish orange shade having good fastness properties and conforms to the formula

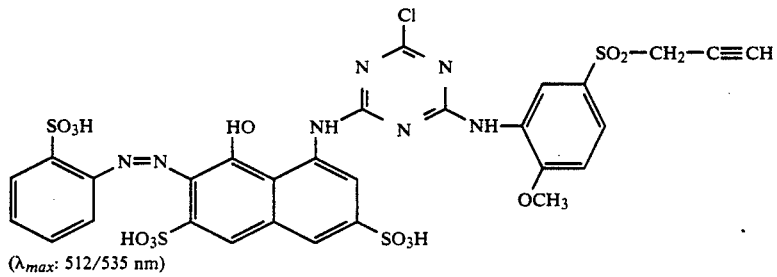

(λ$_{max}$: 512/535 nm)

EXAMPLE 350

To an aqueous solution, adjusted to pH 4.5, of 19.5 g of the azo dye of the formula

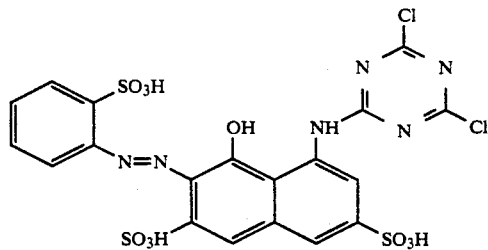

described in Example 348 was added at pH 4-4.5 a solution of 7 g of 3-(prop-2-ynylsulfonyl)aniline hydrochloride in 100 ml of 1:1 v/v water/acetone. To complete the reaction, the mixture was heated to 40°-50° C.

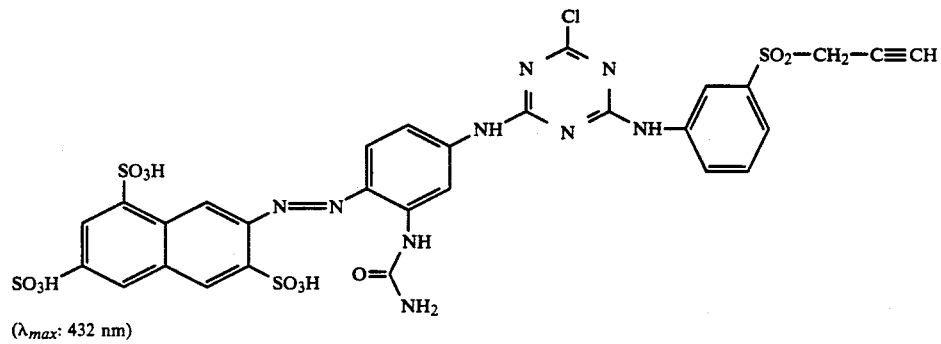

(λ$_{max}$: 432 nm)

EXAMPLE 352

28.6 g of 2-aminonaphthalene-1,5-disulfonic acid were diazotized in 400 ml of water at from 0° to 5° C.

with hydrochloric acid. Then a solution of 23.5 g of the condensation product of 1-amino-8-hydroxynaphthalene-3,6-disulfonic acid and cyanuric chloride described in Example 91, the solution having been acidified with hydrochloric acid, was added. The pH was brought to 4.5 with saturated sodium acetate solution, and the solution was subsequently stirred at 20° C. for 1 hour and then admixed with 11.7 g of 3-(prop-2-ynylsulfonyl)aniline hydrochloride, dissolved in 200 ml pf 1:1 v/v water/acetone. After stirring at pH 4.5 for 2 hours the reaction was complete. The dye obtained was then salted out with sodium chloride and freeze dried. It dyes cotton in a bluish red shade having good fastness properties and conforms to the formula.

dried. It dyes cotton in a bluish red shade having good fastness properties and has the formula

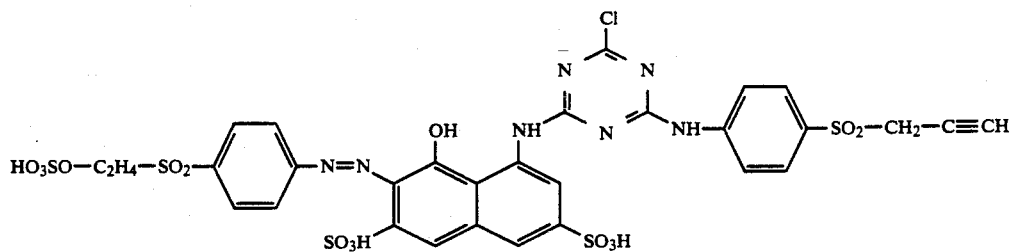

EXAMPLE 354

A neutral solution of 15.9 g of 1-amino-8-hydroxynaphthalene-3,6-disulfonic acid was admixed at 10° C. with a suspension of 9.3 g of cyanuric chloride in 80 ml of ice-water while the pH was maintained at less than 2 with concentrated hydrochloric acid. This solution was added at from 0° to 5° C. to the hydrochloric acid diazotization product of 9G of aniline-2-sulfonic acid in 100 of water. The coupling was completed with saturated sodium acetate solution at pH 4–4.5. A solution, adjusted to pH 4.5, of 13 g of 2-[4-(prop-2-ynylsulfonyl)-

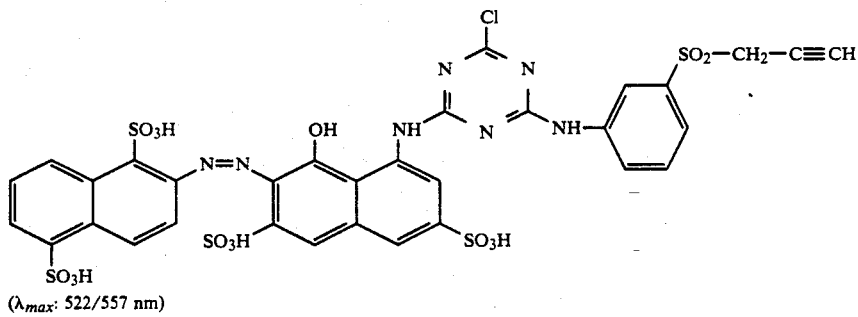

($\lambda_{max}$: 522/557 nm)

EXAMPLE 353

14.2 g of 4-(2-sulfatoethylsulfonyl)aniline were diazotized in 200 ml of water at from 0° to 5° C. with hydrochloric acid and then added to a solution, acidified with hydrochloric acid, of 23.5 g of the condensation product of 1-amino-8-hydroxynaphthalene-3,6-disulfonic acid and cyanuric chloride described in Example 19.

phenyl]ethylamine hydrochloride in 300 of 1:1 v/v water/acetone was added to the solution produced above. After dilution with 500 ml of water the reaction mixture was heated at from 40° to 50° C. for two hours to complete the reaction. The dye formed was salted out with sodium chloride and freeze dried. It dyes cotton in a fast brilliant red shade and has the structural formula

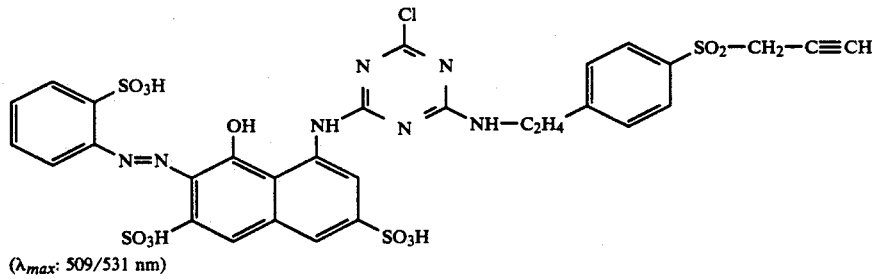

($\lambda_{max}$: 509/531 nm)

The pH was adjusted to 4.5 with saturated sodium acetate solution, and after 30 minutes' stirring at 30° C. a solution of 11.7 g of 4-(prop-2-ynylsulfonyl)aniline hydrochloride in 200 ml of 1:1 v/v water/acetone was added. To complete the reaction the solution was heated at from 40° to 45° C. for 45 hours. The dye formed was salted out with sodium chloride and freeze

EXAMPLE 355

14.2 g of 4-(2-sulfatoethylsulfonyl)aniline were diazotized in 200 ml of water at from 0° to 5° C. with hydrochloric acid and then added to a solution, acidified with hydrochloric acid, of 23.5 g of the condensation product of 1-amino-8-hydroxynaphthalene-3,6-disulfonic acid and cyanuric chloride described in Example 91. The pH was adjusted to 4.5 with saturated sodium acetate solution. Then a solution 13 g of 2-[4-(prop-2-ynyl-sulfonyl)phenyl]ethylamine hydrochloride in 300 ml of 1:1 v/v water/acetone was added. To complete the reaction the solution was heated at from 40° to 45° C.

for 2.5 hours. The dye formed was salted out with sodium chloride and freeze dried. It dyes cotton in a bluish red shade having good fastness properties and has the formula

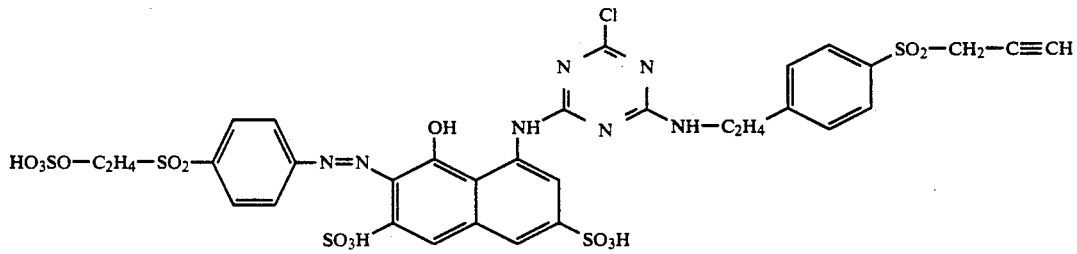

The dyes listed in Table 18 are obtained in a similar manner.

TABLE 18

D—N=N—K—[triazine with X, N—E—H substituents]

| Example No. | D | K | X | E | Hue on cotton |
|---|---|---|---|---|---|
| 356 | 2-SO₃H-phenyl | 1-OH-8-NH—, 2-methyl-3,6-disulfo naphthyl | F | E-8 | red |
| 357 | 2-SO₃H-phenyl | 1-OH-8-NH—, 2-methyl-3,6-disulfo naphthyl | F | E-6 | red |
| 358 | 5-H₃CO-2-SO₃H-phenyl | 1-OH-8-NH—, 2-methyl-3,6-disulfo naphthyl | Cl | E-6 | bordeaux |
| 359 | 5-H₃C-2-SO₃H-phenyl | 1-OH-8-NH—, 2-methyl-3,6-disulfo naphthyl | Cl | E-6 | bluish red |
| 360 | 4-HO₂C-phenyl | 1-OH-8-NH—, 2-methyl-3,6-disulfo naphthyl | Cl | E-6 | bluish red |
| 361 | 4-(CH₂=CH—CH₂—SO₂)-phenyl | 1-OH-8-NH—, 2-methyl-3,6-disulfo naphthyl | Cl | E-6 | red |

TABLE 18-continued

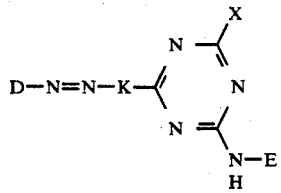

| Example No. | D | K | X | E | Hue on cotton |
|---|---|---|---|---|---|
| 362 | HO₃SO—CH₂—CH₂—SO₂—⟨phenyl⟩— | 8-amino-1-hydroxy-naphthalene-3,6-disulfonic acid (NH at 8, OH at 1, SO₃H at 3,6) | Cl | E-8 | red |
| 363 | HO₃SO—CH₂—CH₂—SO₂—⟨phenyl, meta⟩— | same as 362 | F | E-6 | red |
| 364 | 2-methyl-1,5-naphthalenedisulfonic acid | same as 362 | Cl | E-8 | bluish red |
| 365 | 2-methyl-1,5-naphthalenedisulfonic acid | same as 362 | Cl | E-10 | bluish red |
| 366 | benzenesulfonic acid (o-) | 4-amino-5-hydroxy-naphthalene-1,7-disulfonic (NH at 4, OH at 5, SO₃H at 1,7) | Cl | E-6 | red |
| 367 | benzenesulfonic acid (o-) | 6-amino-1-hydroxy-naphthalene-3-sulfonic acid | Cl | E-6 | orange |
| 368 | 4-methoxy-2-methyl-benzenesulfonic acid | same as 367 | Cl | E-6 | orange |
| 369 | 5-methyl-2,4-disulfo-phenyl | same as 367 | Cl | E-6 | orange |

TABLE 18-continued

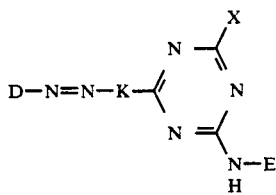

| Example No. | D | K | X | E | Hue on cotton |
|---|---|---|---|---|---|
| 370 | 2-methoxy-5-methyl-benzene-1,4-disulfonic acid (H3CO, SO3H, HO3S) | 4-hydroxy-3-methyl-7-amino-naphthalene-2-sulfonic acid | Cl | E-6 | orange |
| 371 | 2-methyl-naphthalene-1,5-disulfonic acid | 4-hydroxy-3-methyl-7-amino-naphthalene-2-sulfonic acid | Cl | E-6 | orange |
| 372 | 2-methyl-naphthalene-1,5-disulfonic acid | 4-hydroxy-3-methyl-7-amino-naphthalene-2-sulfonic acid | Cl | E-6 | yellowish red |
| 373 | 4-methyl-benzene-1,3-disulfonic acid | 4-hydroxy-3-methyl-7-amino-naphthalene-2-sulfonic acid | Cl | E-6 | yellowish red |
| 374 | 4-methoxy-benzene-1,3-disulfonic acid | 4-hydroxy-3-methyl-7-amino-naphthalene-2-sulfonic acid | Cl | E-6 | yellowish red |
| 375 | 5-acetylamino-2-methyl-benzenesulfonic acid | 4-hydroxy-3-methyl-7-amino-naphthalene-2-sulfonic acid | Cl | E-6 | red |
| 376 | 5-methylsulfonylamino-2-methyl-benzenesulfonic acid | 5-hydroxy-6-methyl-4-amino-naphthalene-2,7-disulfonic acid | Cl | E-6 | red |

TABLE 18-continued
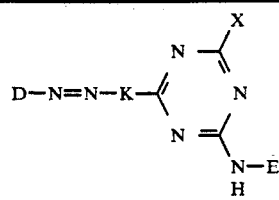
| Example No. | D | K | X | E | Hue on cotton |
|---|---|---|---|---|---|
| 377 | | | Cl | E-6 | red |
| 378 | | | Cl | E-6 | red |
| 379 | | | Cl | E-6 | red |
| 380 | | | Cl | E-6 | red |
| 381 | | | Cl | E-6 | red |

TABLE 18-continued
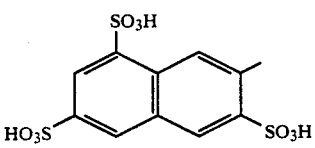
| Example No. | D | K | X | E | Hue on cotton |
|---|---|---|---|---|---|
| 382 | 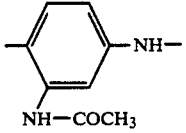 | 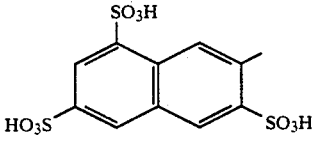 | Cl | E-6 | yellowish orange |
| 383 | 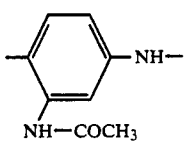 | 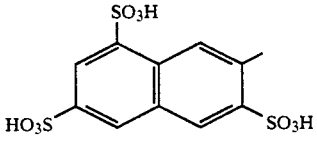 | F | E-6 | yellowish orange |
| 384 | 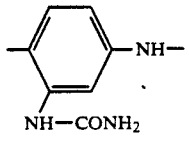 | 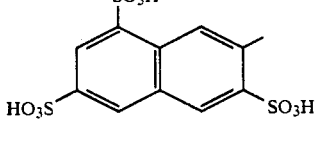 | F | E-6 | yellowish orange |
| 385 | 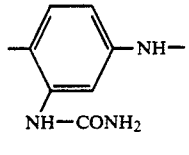 | 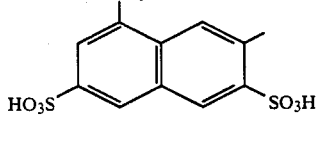 | Cl | E-10 | yellowish orange |
| 386 | 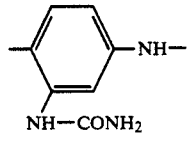 | 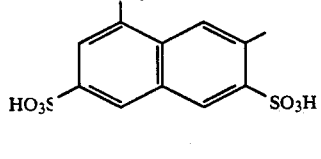 | Cl | E-8 | yellowish orange |
| 387 | 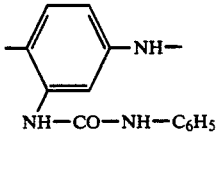 | 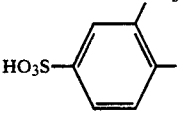 | Cl | E-6 | yellowish orange |
| 388 | 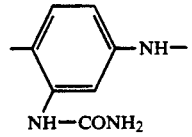 | 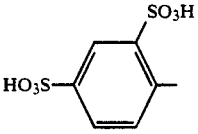 | Cl | E-6 | yellow |
| 389 | 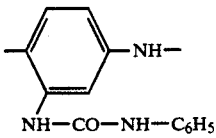 | | Cl | E-6 | yellow |

TABLE 18-continued

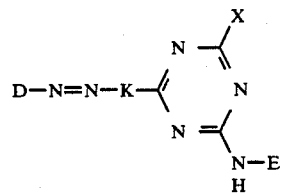

| Example No. | D | K | X | E | Hue on cotton |
|---|---|---|---|---|---|
| 390 | 2,4-disulfo-phenyl (SO₃H at 1,4; with methyl) | phenyl with NH— and NH—CO—NH—C₆H₅ | Cl | E-6 | yellow |
| 391 | 2,4-disulfo-phenyl | phenyl with OCH₃, NH—, NH—CO—CH₃ | Cl | E-6 | yellowish orange |
| 392 | sulfo-methyl-phenyl (HO₃S, SO₃H) | phenyl with OCH₃, NH—, H₃C | Cl | E-6 | yellowish orange |
| 393 | sulfo-phenyl with HO₃S and SO₃H | phenyl with OCH₃, NH—, NH—COCH₃ | Cl | E-6 | yellowish orange |
| 394 | naphthyl-1,5-disulfo | phenyl with NH—, NH—COCH₃ | Cl | E-6 | yellowish orange |
| 395 | naphthyl-1,5-disulfo | phenyl with NH—, NH—COCH₃ | F | E-6 | yellowish orange |
| 396 | naphthyl-1,5-disulfo | phenyl with OCH₃, NH—, NHCOCH₃ | Cl | E-9 | yellowish orange |

TABLE 18-continued

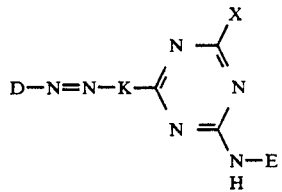

| Example No. | D | K | X | E | Hue on cotton |
|---|---|---|---|---|---|
| 397 | E-6 | (HO, NH—, HO₃S, SO₃H naphthalene) | Cl | E-7 | red |
| 398 | E-6 | (HO, HO₃S, NH— naphthalene) | Cl | E-6 | red |

EXAMPLE 399

15.9 g of 1-amino-8-hydroxynaphthalene-3,6-disulfonic acid were suspended at from 0° to 5° C. in 210 ml of 10% strength by weight hydrochloric acid and admixed over 35 minutes with a similarly ice-cooled solution of the hydrochloric acid diazotization product of 12.5 g of 4-(2-sulfatoethylsulfonyl)aniline. The solution was warmed to 25° C. over 14 hours with stirring and then admixed at 20° with a solution of the hydrochloric diazotization product of 11.6 g of 4-(prop-2-ynylsulfonyl)aniline hydrochloride. To complete the coupling, the pH was adjusted to 4.5. After stirring for 1 hour the dye formed was precipitated with isopropanol and dried. It dyes cotton in a navy shade having good fastness properties and conforms to the formula

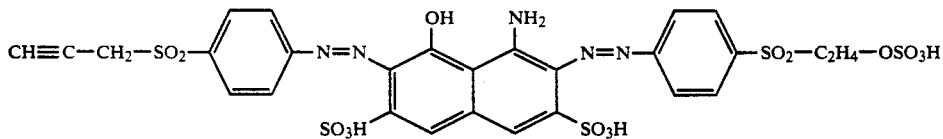

($\lambda_{max}$: 593 nm)

EXAMPLE 400

15.9 g of 1-amino-8-hydroxynaphthalene-3,6-disulfonic acid were suspended at from 0° to 5° C. in 210 ml of 10% strength by weight hydrochloric acid and admixed over 35 minutes with a similarly ice-cooled solution of the hydrochloric acid diazotization product of 11.6 g of 4-(prop-2-ynylsulfonyl)aniline hydrochloride. The mixture was stirred at room temperature until the reaction was complete, and was then admixed at 20° C. with a solution of the hydrochloric diazotization product of 14.5 g of 4-(2-sulfatoethylsulfonyl)aniline. To complete the coupling, the pH was adjusted to 4.5 with saturated sodium acetate solution. After stirring for 1 hour the reaction was complete and the dye formed was precipitated with isopropanol and dried. It dyes cotton in a navy shade having good fastness properties and conforms to the formula

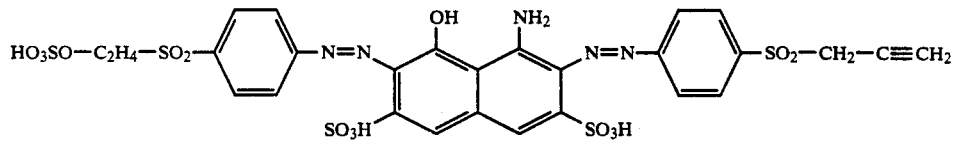

Further dyes according to the present invention are given in Table 19.

TABLE 19

[Structure: naphthalene with OH, NH₂, two N=N-D groups, and two SO₃H groups at indicated positions 3 and 4]

| Example No. | D¹ | D² | position 3 or 4 | Hue on cotton |
|---|---|---|---|---|
| 401 | 4-HO₃S-C₆H₄- | E-6 | 3 | navy |
| 402 | 2,5-disulfophenyl | E-7 | 3 | navy |
| 403 | naphthalene-1,5-disulfonic acid (2-yl) | E-6 | 4 | navy |
| 404 | E-6 | E-6 | 3 | navy |
| 405 | E-6 | E-7 | 3 | navy |
| 406 | E-6 | triazine with Cl, NH-(3-methyl-4-sulfophenyl), NH-(4-sulfophenyl) | 3 | navy |
| 407 | E-6 | 2,5,6-trichloropyrimidin-4-yl-NH-(3-methyl-4-sulfophenyl) | 3 | navy |
| 408 | E-6 | 2-(CH₂SO₃H)-5-methyl-(SO₂CH₂CH₂Cl)phenyl | 3 | navy |

TABLE 19-continued
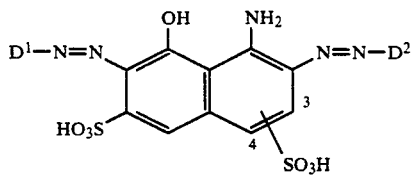
| Example No. | D¹ | D² | position 3 or 4 | Hue on cotton |
|---|---|---|---|---|
| 409 | E-6 | (3-methylphenyl bearing HO₃S, linked via NH to triazine with F and NH-phenyl-SO₃H) | 3 | navy |
| 410 | E-6 | 4-methylphenyl-SO₃H | 3 | navy |
| 411 | E-6 | 7-methylnaphthalene-1,5-disulfonic acid | 4 | navy |
| 412 | E-6 | 4-methylphenyl—SO₂—CH₂—CH=CH₂ | 3 | navy |
| 413 | E-7 | 4-methylphenyl—SO₂—C₂H₄—OSO₃H | 3 | navy |
| 414 | E-6 | 3-methylphenyl-(2,6-dichloropyrimidin-4-yl) | 3 | navy |

TABLE 19-continued

Structure: Naphthalene with OH, NH₂, two N=N-D groups (D¹ and D²), HO₃S, and SO₃H at position 3 or 4.

| Example No. | D¹ | D² | position 3 or 4 | Hue on cotton |
|---|---|---|---|---|
| 415 | E-7 | HO₃S-phenyl(CH₃)-NH-C(Cl)=C(F)-N=C(F)-N (pyrimidine with Cl, F, F) | 3 | navy |
| 416 | E-6 | HO₃S-phenyl(CH₃)-NH-CO-phenyl-N=N-(dichloropyridazinone) | 3 | navy |
| 417 | chloro-sulfo-methyl-phenyl with SO₃H (HO₃S, Cl, SO₃H substituted benzene) | E-6 | 3 | reddish navy |
| 418 | CH₂=CH—CH₂O₂S—phenyl— | E-6 | 3 | navy |
| 419 | HO₃SOH₄C₂O₂S—phenyl— | E-7 | 3 | navy |
| 420 | phenyl-SO₃H (ortho) | E-6 | 3 | navy |
| 421 | HO₃SOH₄C₂HNO₂S—phenyl— | E-6 | 3 | navy |
| 422 | E-6 | —phenyl—SO₂NHC₂H₄OSO₃H | 3 | navy |

TABLE 19-continued

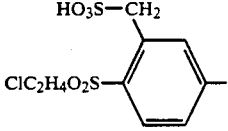

| Example No. | D$^1$ | D$^2$ | position 3 or 4 | Hue on cotton |
|---|---|---|---|---|
| 423 | HO$_3$S—CH$_2$ — [phenyl] — ClC$_2$H$_4$O$_2$S— | E-6 | 3 | navy |

EXAMPLE 424

8.7 g of sulfanilic acid were diazotized in 250 ml of water with hydrocloric acid. A suspension of 16 g of 1-amino-8-hydroxynaphthalene-3,6-disulfonic acid in 100 ml of water was added dropwise, and the mixture was stirred at room temperature and pH 1.5 for 12 hours. It was then cooled down to 10° C. and admixed with a diazo component obtained by hydrochloric acid diazotization of 24.7 of the secondary condensation product of 4-(prop-2-ynylsulfonyl)aniline, cyanuric chloride and 1,3-phenylenediamine-4-sulfonic acid in 750 ml of water.

The reaction was then completed overnight at pH 5.5-6 by addition of sodium bicarbonate. The dye was salted out with sodium chloride. It has the formula

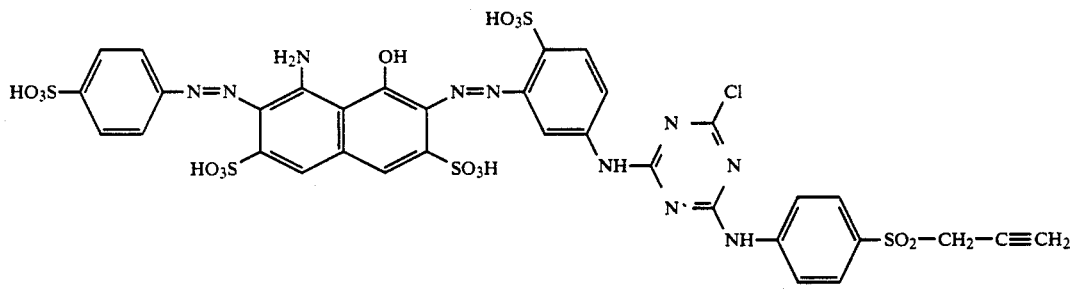

and dyes cotton in a fast navy shade.

EXAMPLE 425

Example 424 was repeated, except that 1-amino-8-hydroxynaphthalene-3,6-disulfonic acid was replaced by 1-amino-8-hydroxynaphthalene-4,6-disulfonic acid, affording a dye having similar properties.

Table 20 contains further examples of dyes obtained similarly to Example 424.

TABLE 20

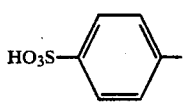

| Ex. No. | D$^1$ | Position 3/4 | D$^2$ | X | E | Hue on cotton |
|---|---|---|---|---|---|---|
| 426 | HO$_3$S—[phenyl]— | 3 | HO$_3$S—[phenyl]—NH— | F | E-6 | navy |

TABLE 20-continued

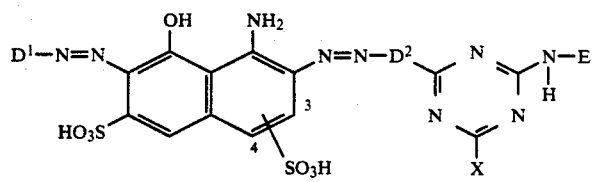

| Ex. No. | D¹ | Position 3/4 | D² | X | E | Hue on cotton |
|---|---|---|---|---|---|---|
| 427 | naphthalene with SO₃H, SO₃H | 3 | HO₃S-phenyl-NH- | Cl | E-6 | navy |
| 428 | CH₂=CH—CH₂—SO₂-phenyl- | 4 | HO₃S-phenyl-NH- | Cl | E-6 | navy |
| 429 | HO₃SO—CH₂CH₂—SO₂-phenyl- | 3 | HO₃S-phenyl-NH- | Cl | E-7 | navy |
| 430 | HO₃SO—CH₂CH₂—SO₂-phenyl- | 3 | HO₃S-phenyl-NH- | Cl | E-9 | navy |
| 431 | HO₃SH₂C, Cl—CH₂CH₂—SO₂-phenyl- | 3 | HO₃S-phenyl-NH- | Cl | E-6 | navy |
| 432 | HO₃SH₂C, Cl—CH₂CH₂—SO₂-phenyl- | 3 | HO₃S-phenyl-NH- | Cl | E-7 | navy |
| 433 | HO₃SO—CH₂—CH₂—SO₂-phenyl- | 3 | HO₃S-phenyl-NH- | Cl | E-6 | navy |

TABLE 20-continued

| Ex. No. | D¹ | Position 3/4 | D² | X | E | Hue on cotton |
|---|---|---|---|---|---|---|
| 434 | [4-SO₃H-phenyl with N=N-pyridazinone(3,4-dichloro)-benzamide-NH-] | 3 | [HO₃S-phenyl-NH-] | Cl | E-6 | navy |
| 435 | [4-SO₃H, 3-(CH₃-O₂S-NH)-phenyl] | 3 | [HO₃S-phenyl-NH-] | Cl | E-6 | navy |
| 436 | [4-HO₂C-phenyl] | 3 | [HO₃S-phenyl-NH-] | Cl | E-6 | navy |
| 437 | [2-SO₃H-phenyl] | 3 | [HO₃S-phenyl-NH-] | Cl | E-6 | navy |
| 438 | [3-HO₃S-phenyl] | 3 | [HO₃S-phenyl-NH-] | Cl | E-6 | navy |

EXAMPLE 439

To the solution of 24.7 g of the diazotized secondary condensation product of 1,3-phenylenediamine-4-sulfonic acid, cyanuric chloride and 4-(prop-2-ynylsulfonyl)aniline in 750 ml of water was added at from 0° to 5° C. 15.9 g of 1-amino-8-hydroxynaphthalene-3,6-disulfonic acid, suspended in 100 ml of water. A pH of 2.5–3 was maintained with sodium formate. The mixture was stirred at room temperature for 12 hours and then admixed at 10° C. With the hydrochloric diazotization product of 8.7 g of aniline-4-sulfonic acid, dissolved in 200 ml of water, and the pH was maintained at from 6 to 6.5 with sodium bicarbonate. The dye was salted out with sodium chloride. It has the formula

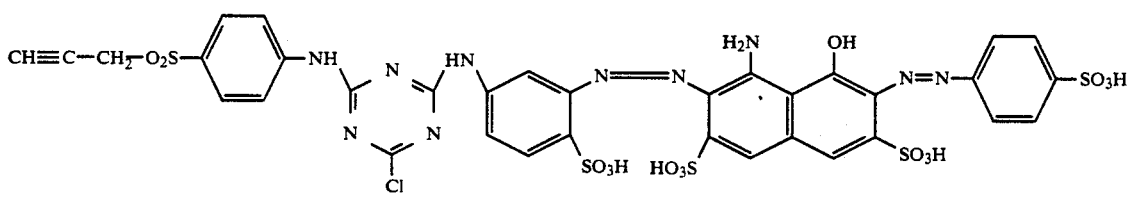

The dyes listed in Table 21 are obtained in a similar manner.
TABLE 21
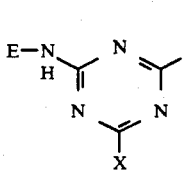
| Ex. No. | E | X | D¹ | Position 3/4 | D² | Hue on cotton |
|---|---|---|---|---|---|---|
| 440 | E-6 | Cl | 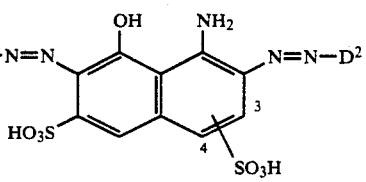 | 3 | 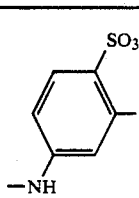 | navy |
| 441 | E-6 | Cl | 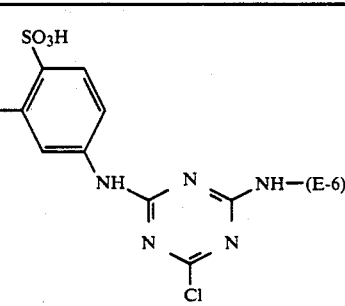 | 3 | 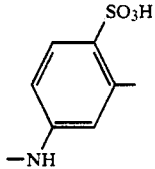 | navy |
| 442 | E-11 | Cl | 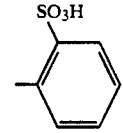 | 3 | 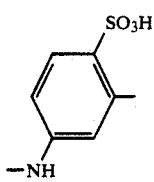 | navy |
| 443 | E-6 | Cl | 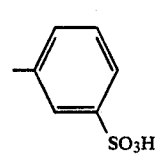 | 4 | 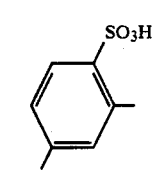 | navy |
| 444 | E-7 | Cl | | 3 | 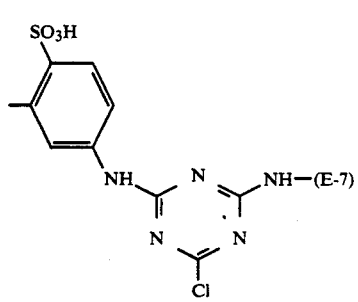 | navy |

TABLE 21-continued

Structure: E-NH-C(=N-)-N=C(-N=C(X)-N=)-D¹-N=N-[naphthalene with OH, NH₂, HO₃S, SO₃H at positions 3/4]-N=N-D²

| Ex. No. | E | X | D¹ | Position 3/4 | D² | Hue on cotton |
|---|---|---|---|---|---|---|
| 445 | E-6 | Cl | 4-SO₃H-3-methyl-phenyl-NH- | 3 | 4-SO₃H-3-methyl-phenyl-NH-C(=N)-N=C(Cl)-N=C(NH-phenyl-3-SO₂C₂H₄OSO₃H)-N= | navy |
| 446 | E-6 | Cl | 4-SO₃H-3-methyl-phenyl-NH- | 4 | —C₆H₄—SO₃H (para) | navy |
| 447 | E-6 | Cl | 4-SO₃H-3-methyl-phenyl-NH- | 3 | —C₆H₄—SO₂—CH₂—CH=CH₂ | navy |
| 448 | E-6 | Cl | 4-SO₃H-3-methyl-phenyl-NH- | 4 | —C₆H₄—SO₂—C₂H₄—OSO₃H | navy |
| 449 | E-6 | Cl | 4-SO₃H-3-methyl-phenyl-NH- | 3 | 2-(CH₂—SO₃H)-phenyl-SO₂—C₂H₄—Cl | navy |

EXAMPLE 450

38.6 f of the known dye of the formula

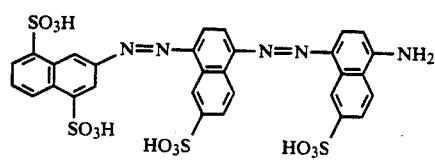

were introduced at pH 7 in 400 ml of water at 40° C. and admixed with 15.4 g of the primary condensation product of cyanuric chloride and 4-(prop-2-ynylsulfonyl)aniline hydrochloride prepared as described in Example 308 in 500 ml of water. The mixture was stirred at 40° C. and pH 5-6 until there were no longer any free amino groups detectable by this layer chromatogrphy. The dye obtained on salting out with potassium chloride conforms to the formula

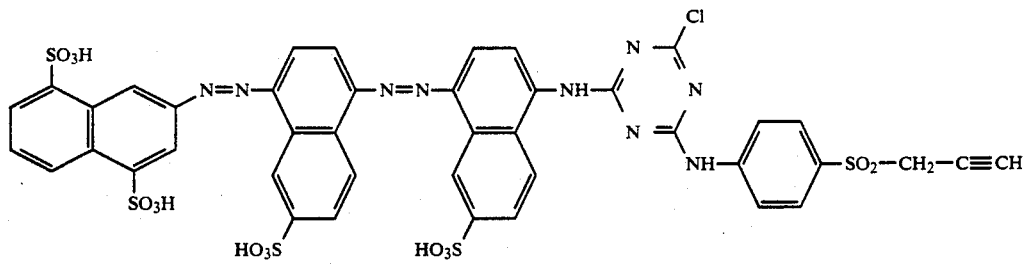
and dyes cotton in a reddish brown shade.
Table 22 contains dyes obtained in a similar manner.
TABLE 22
| Ex. No. | D | K¹ | K² | R | X | E | Hue on cotton |
|---|---|---|---|---|---|---|---|
| 451 | | | | H | Cl | E-6 | reddish brown |
| 452 | | | | H | Cl | E-6 | reddish brown |
| 453 | | | | H | Cl | E-6 | reddish brown |
| 454 | | | | H | Cl | E-6 | yellowish brown |

TABLE 22-continued $$D-N=N-K^1-N=N-K^2-NH-\underset{\underset{X}{\overset{N}{\parallel}}}{\overset{N}{\underset{\parallel}{\text{C}}}}\underset{N}{\overset{N}{\parallel}}\overset{N-E}{\underset{R}{}}$$

| Ex. No. | D | K¹ | K² | R | X | E | Hue on cotton |
|---|---|---|---|---|---|---|---|
| 455 | 7-methyl-1,5-naphthalenedisulfonic acid | 2,5-dimethyl | 8-sulfo-naphthyl | H | Cl | E-7 | yellowish brown |
| 456 | 7-methyl-1,5-naphthalenedisulfonic acid | 2,5-dimethyl | 8-sulfo-naphthyl | CH₃ | Cl | E-6 | yellowish brown |
| 457 | 7-methyl-1,5,7-naphthalenetrisulfonic acid | naphthyl | 2,5-dimethyl | H | F | E-6 | yellowish brown |
| 458 | 7-methyl-1,5,7-naphthalenetrisulfonic acid | naphthyl | sulfo-naphthyl | H | Cl | E-6 | reddish brown |
| 459 | E-6 | sulfo-naphthyl | sulfo-naphthyl | H | Cl | 4-sulfo-phenyl | reddish brown |
| 460 | 2-methyl-1,4-benzenedisulfonic acid | sulfo-naphthyl | sulfo-naphthyl | H | Cl | E-6 | reddish brown |

TABLE 22-continued

D—N=N—K¹—N=N—K²—NH—C(=N)—N—C(=N)—N(R)—E with N—C(X)—N ring

| Ex. No. | D | K¹ | K² | R | X | E | Hue on cotton |
|---|---|---|---|---|---|---|---|
| 461 | naphthalene with SO₃H and HO₃S | naphthalene-HO₃S | naphthalene-HO₃S | H | Cl | E-6 | reddish brown |
| 462 | benzene with SO₃H, CH₃SO₂NH | naphthalene-HO₃S | naphthalene-HO₃S | H | Cl | E-6 | reddish brown |

EXAMPLE 463

43.4 g of 88% strength 1-amino-4-bromoanthraquinone-2-sulfonic acid, 23.2 g of the hydrochloride of the formula Cl⁻ H₃N⁺—C₆H₄—SO₂—CH₂—C≡CH 1.5 g of copper powder, 0.75 g of cupric sulfate and 50.4 g of sodium bicarbonate were heated at from 65° to 70° C. for 48 hours. After the reaction had ended (thin layer chromatography), the mixture was filtered hot and the filtrate was adjusted to pH 1 with concentrated hydrochloric acid. The oily residue was crystallized at from 0° to 5° C. by stirring with 100 ml of ethanol, and the crystalline product was isolated, washed with ethanol and dried, giving a compound of the formula

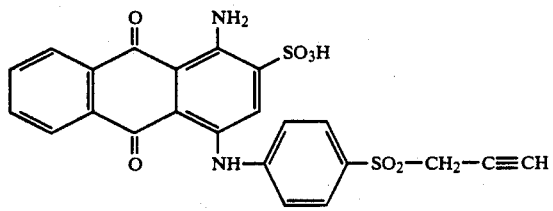

The compounds of the formula

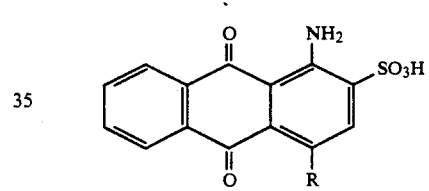

listed in Table 23 are obtained in a similar manner.

TABLE 23

| Example No. | R |
|---|---|
| 464 | HN—C₆H₄—SO₂—CH₂—C≡CH (meta) |
| 465 | HN—naphthalene—SO₂—CH₂—C≡CH |

EXAMPLE 466

24.1 g of 1-amino-4-(3-amino-4-hydroxysulfonylphenylamino)-2-hydroxysulfonylanthraquinone were stirred into 1,000 ml of water and a pH of 6.5 was set with sodium hydroxide solution. To this solution was added at from 0° to 5° C. a suspension of 9.2 g of cyanuric chloride in 100 g of ice-water. The mixture was stirred at from 0° to 5° C. and pH 6 until the reaction had ended, which took about 2 hours.

After the addition of 11.6 g of 3-(prop-2-ynylsulfonyl)aniline hydrochloride in 50 ml of water, the temperature was raised to 40° C. and the mixture was stirred at the temperature for 2 hours.

After cooling down to room temperature, the dye was salted out with 150 g of sodium chloride, filtered off with suction and dried.

It dyes cotton in a blue shade having body fastness properties and conforms to the formula

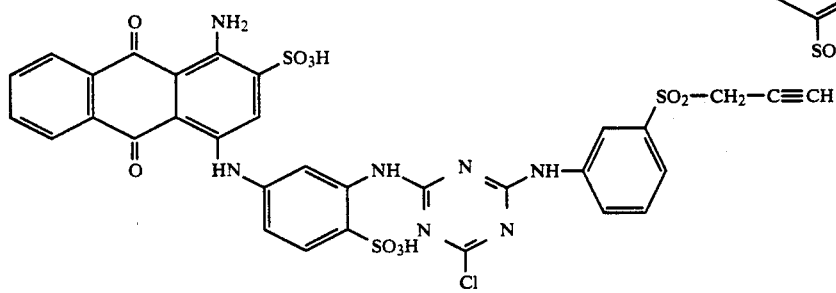

($\lambda_{max}$: 604 nm)

EXAMPLE 467

A dye having similar properties is obtained on replacing the 3(prop-2-ynylsulfonyl)aniline hydrochloride by 11.6 g of 4-(prop-2-ynylsulfonyl)aniline hydrochloride. Said dye conformans to the formula

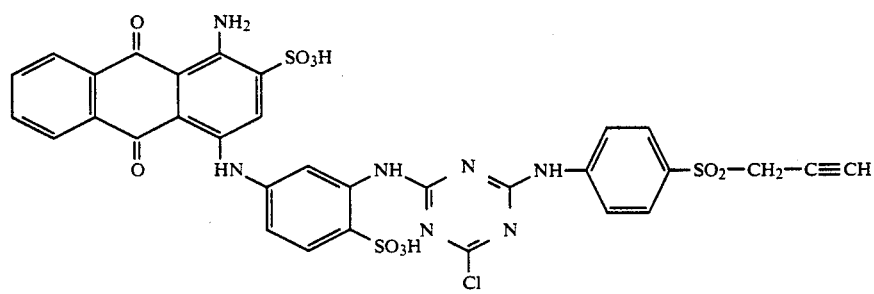

The compounds of the formula

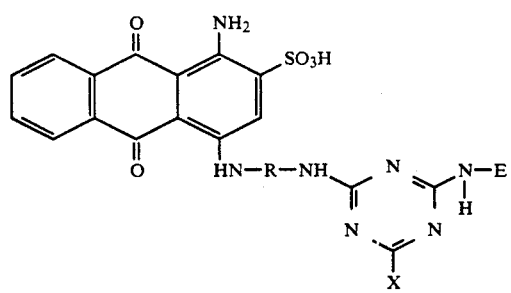

listed below in Table 24 are obtained in a similar manner.

TABLE 24

| Ex. No. | R | X | E |
|---|---|---|---|
| 468 | 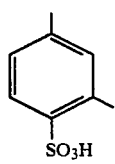 | Cl | E-7 |
| 469 | 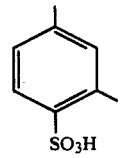 | F | E-6 |
| 470 | (same as 469) | F | E-8 |
| 471 | (2,4-dimethyl, SO3H) | Cl | E-9 |
| 472 | (2,4-dimethyl, SO3H) | Cl | E-10 |
| 473 | 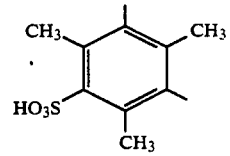 | Cl | E-6 |

TABLE 24-continued

| Ex. No. | R | X | E |
|---|---|---|---|
| 474 | 2,3,5,6-tetramethyl-4-sulfophenyl (CH3 at 2,3,5,6; HO3S at 4) | Cl | E-11 |
| 475 | 2,3,5,6-tetramethyl-4-sulfophenyl | F | E-8 |
| 476 | 2,3,5,6-tetramethyl-4-sulfophenyl | Cl | E-7 |

EXAMPLE 477

64.8 of the known chromophore of the formula

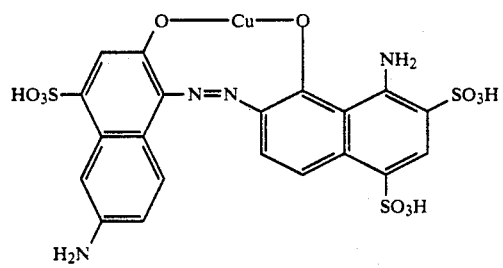

were suspended in 700 ml of water. 30.7 g of the primary condensation product of cyanuric chloride and 4-(2-prop-2-ynylsulfonyl)aniline hydrochloride described in Example 308 were added dissolved in 600 ml of water and 200 ml of acetone at pH 5.5–6 and 40° C. over 2 hours and the mixture was held at pH 5.5–6 and 40°–45° C. for a further 30 minutes. After the reaction had ended, the dye was salted out with sodium chloride, filtered off and dried under reduced pressure. It conforms to the formula

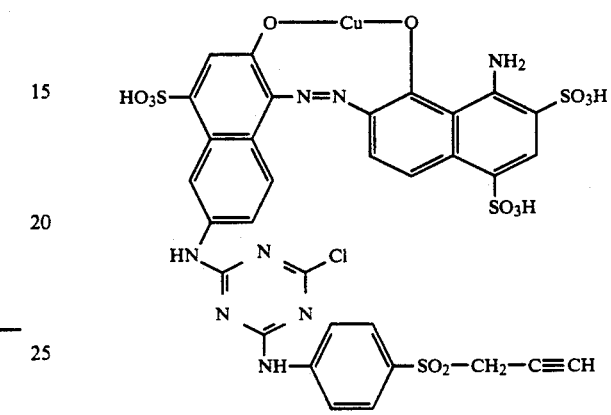

and dyes cotton in a fast blue shade.

Using the method of Example 477 it is possible, starting from known chromophores, to synthesize the following copper and nickel phthalocyanine and copper formazan dyes:

TABLE 25

| Example No. | Dye | Hue on cotton |
|---|---|---|
| 478 | CuPc–[(SO3H)1,5 / (SO2NH2)1,5 / SO2NH–C6H4–NH–C(=N)–NH–(triazine-Cl)–NH–C6H4–SO2CH2–C≡CH] | greenish blue |
| 479 | CuPc–[(SO3H)3 / SO2NHC2H4N=C(H)–NH–(triazine-Cl)–NH–C6H4–SO2CH2–C≡CH] | greenish blue |

TABLE 25-continued

| Example No. | Dye | Hue on cotton |
|---|---|---|
| 480 | [CuPc—(SO$_3$H)$_3$ / —SO$_2$NH—C$_6$H$_4$—SO$_2$CH$_2$—C≡CH] | greenish blue |
| 481 | [NiPc—(SO$_3$H / SO$_2$NH$_2$)$_{2,8}$ / —SO$_2$NH—C$_6$H$_4$—NH—(chloro-triazine)—NH—C$_6$H$_4$—SO$_2$CH$_2$—C≡CH] | greenish blue |
| 482 | [CuPc—(SO$_3$H)$_{1,5}$ / (SO$_2$NH$_2$)$_{1,5}$ / —SO$_2$NH—C$_6$H$_4$—NH—(chloro-triazine)—NH—CH$_2$—C$_6$H$_4$—SO$_2$CH$_2$—C≡CH] | greenish blue |
| 483 | HC≡C—CH$_2$—O$_2$S—C$_6$H$_4$—NH—(chloro-triazine)—NH—[Cu-complex azo dye with HO$_3$S and SO$_3$H substituents, phenyl] | blue |
| 484 | HC≡C—H$_2$C—O$_2$S—C$_6$H$_4$—NH—(chloro-triazine)—NH—[Cu-complex azo dye with HO$_3$S and SO$_3$H substituents, phenyl] | blue |

TABLE 25-continued

| Example No. | Dye | Hue on cotton |
|---|---|---|
| 485 | | blue |
| 486 | | blue |

EXAMPLE 487

19.1 g of the compound of the formula

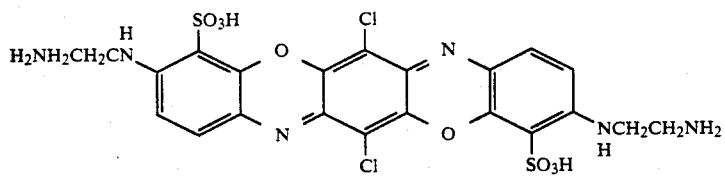

were stirred into 1,000 g of water and adjusted to pH 10 with sodium hydroxide solution. This solution was added dropwise to a 40°-50° C. solution adjusted to pH 6-8 of the condensation product of 11.1 g of cyanuric chloride with 13.9 g of 3-(prop-2-ynylsulfonyl)aniline hydrochloride. The mixture was stirred at a pH maintained at from 6.5 to 7 at 60° C. until the reaction had ended, which took about 2 hours. After cooling down to room temperature, the dye was salted out with 500 g of sodium chloride, filtered off with suction and dried. It dyes cotton in a brilliant blue shade having good fastness properties and conforms to the formula

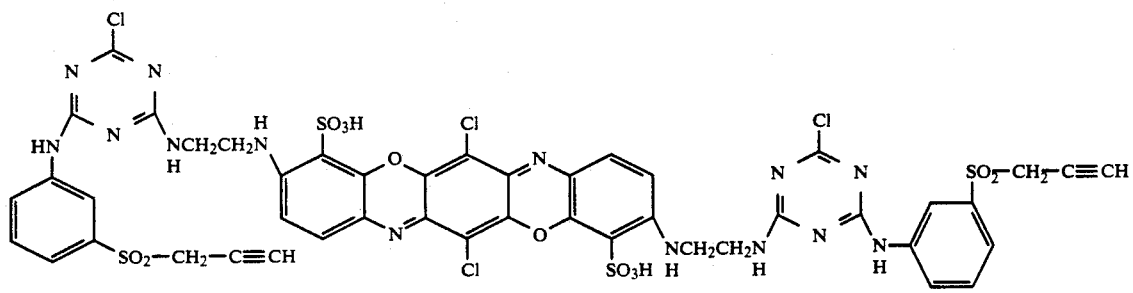

($\lambda_{max}$: 627 nm)

Further dyes which are obtained in a similar manner are listed in Table 26.

TABLE 26

[Structure shown at top of table]

| Ex. No. | Y | R | E | Hue on cotton |
|---|---|---|---|---|
| 488 | HN-CH2-CH(CH3)-NH | Cl | E-6 | blue |
| 489 | HN-CH2CH2-NH | F | E-6 | blue |
| 490 | HN-(CH2)3-NH | Cl | E-6 | blue |
| 491 | HN-C6H4-NH | Cl | E-6 | blue |
| 492 | O-CH2CH2-NH | Cl | E-6 | red |
| 493 | O-C6H4-NH | Cl | E-6 | red |
| 494 | HN-CH2CH2-NH | Cl | E-7 | blue |
| 495 | HN-CH2CH2-NH | F | E-6 | blue |
| 496 | HN-CH2-CH(CH3)-NH | Cl | E-7 | blue |
| 497 | HN-(CH2)3-NH | Cl | E-7 | blue |
| 498 | HN-(CH2)3-NH | Cl | E-11 | blue |
| 499 | HN-C6H4-NH | Cl | E-7 | blue |
| 500 | O-CH2CH2-NH | Cl | E-7 | red |
| 501 | O-C6H4-NH | Cl | E-7 | red |
| 502 | HN-CH2CH2-NH | Cl | E-8 | blue |
| 503 | HN-CH2CH2-NH | F | E-8 | blue |
| 504 | HN-CH2-CH(CH3)-NH | Cl | E-8 | blue |
| 505 | HN-(CH2)3-NH | Cl | E-8 | blue |

TABLE 26-continued

| Ex. No. | Y | R | E | Hue on cotton |
|---|---|---|---|---|
| 506 | 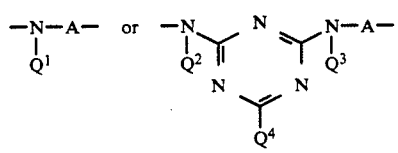 | Cl | E-8 | blue |

We claim:

1. A reactive dye of the formula

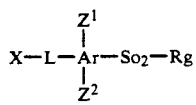

where
Rg is a radical of the formula

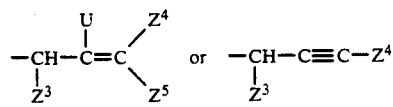

Ar is the radical of a benzene or naphthalene ring,
$Z^1$ and $Z^2$ are identical or different and each is independently of the other hydrogen, unsubstituted or amino- or $C_1$-$C_4$-alkanoylamino-substituted $C_1$-$C_4$-alkyl, unsubstituted or halogen-, $C_1$-$C_4$-alkyl-, or $C_1$-$C_4$-alkoxy-substituted phenyl, $C_1$-$C_4$-alkoxy, carboxyl, $C_1$-$C_4$-alkoxycarbonyl, cyano, halogen or hydroxysulfonyl,
$Z^3$, $z^4$ and $Z^5$ are identical or different and each is independently of the others hydrogen, unsubstituted or hydroxyl- or $C_1$-$C_4$-alkoxy-substituted $C_1$-$C_4$-alkyl or unsubstituted or halogen-, $C_1$-$C_4$-alkyl-, or $C_1$-$C_4$-alkoxy-substituted phenyl,
U is a group which is detachable under alkaline reaction conditions,
X is in case a) a metallized or nonmetallized monoazo or disazo dye, a triphendioxazine, an anthraquinone, a metallized formazan or a metallized phthalocyanine chromophore, or in case b) a radical of a coupling component which does not have attached thereto an azo bridge of formula (—N=N—), or a radical of a coupling component which has an attached azo bridge which is also attached to a radical of a diazo component and which may have additional fiber-reactive groups, and
L is in case a) a bridge member of the formula

where $Q^1$ is hydrogen or $C_1$-$C_4$-alkyl, $Z^2$ and $Q^3$ are identical or different and each is independently of the other hydrogen or $C_1$-$C_4$-alkyl, $Q^4$ is a leaving group, and A is a chemical bond or $C_1$-$C_4$-alkylene, or in case b) an azo bridge of formula (—N=N—).

2. A reactive dye as claimed in claim 1 of formula

X—L—$E^1$ ps where X and L are each as defined in claim 1 and $E^1$ is a radical of formula

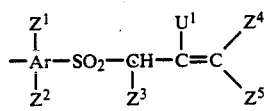

where $U^1$ is halogen and Ar, $Z^1$, $Z^2$, $Z^3$, $Z^4$ and $Z^5$ are each as defined in claim 1.

3. A reactive dye as claimed in claim 1 of formula

X—L—$E^1$ where X and L are each as defined in claim 1 and $E^1$ is a radical of formula

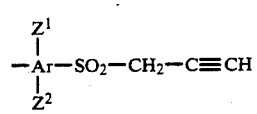

where Ar, $Z^1$ and $Z^2$ are each as defined in claim 1.

4. A reactive dye as claimed in claim 1 which conforms to formula

X—L—$E^1$ where X and L are each as defined in claim 1 and $E^1$ is a radical of formula

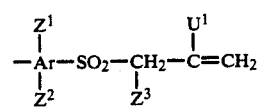

where $U^1$ is halogen and Ar, $Z^1$, $Z^2$ and $Z^3$ are each as defined in claim 1.

5. A method of using a reactive dye as claimed in claim for dyeing or printing hydroxyl- or nitrogen containing substrates. the mixture

* * * * *

UNITED STATES PATENT AND TRADEMARK OFFICE
CERTIFICATE OF CORRECTION

PATENT NO. : 5,231,171

DATED : July 27, 1993

INVENTOR(S) : Claus Marschner et al.

It is certified that error appears in the above-identified patent and that said Letters Patent is hereby corrected as shown below:

On the title page, item [54] and column 1, line 3, change "PROPARGYLESULFONYL" to --PROPARGYLSULFONYL--.

Signed and Sealed this

Fifteenth Day of February, 1994

Attest:

BRUCE LEHMAN

Attesting Officer

Commissioner of Patents and Trademarks